US007640139B2

(12) United States Patent
Sahara et al.

(10) Patent No.: US 7,640,139 B2
(45) Date of Patent: Dec. 29, 2009

(54) ABNORMALITY DIAGNOSING SYSTEM FOR MECHANICAL EQUIPMENT

(75) Inventors: Juntaro Sahara, Kanagawa (JP); Yasushi Mutoh, Kanagawa (JP); Takanori Miyasaka, Kanagawa (JP); Masanobu Yamazoe, Kanagawa (JP)

(73) Assignee: NSK Ltd., Tokyo (JP)

(*) Notice: Subject to any disclaimer, the term of this patent is extended or adjusted under 35 U.S.C. 154(b) by 233 days.

(21) Appl. No.: 11/579,198

(22) PCT Filed: Oct. 17, 2005

(86) PCT No.: PCT/JP2005/019045

§ 371 (c)(1),
(2), (4) Date: Oct. 30, 2006

(87) PCT Pub. No.: WO2006/043511

PCT Pub. Date: Apr. 27, 2006

(65) Prior Publication Data

US 2008/0033695 A1    Feb. 7, 2008

(30) Foreign Application Priority Data

| Oct. 18, 2004 | (JP) | 2004-302804 |
| Oct. 18, 2004 | (JP) | 2004-302871 |
| Oct. 28, 2004 | (JP) | 2004-313875 |
| Jan. 11, 2005 | (JP) | 2005-004268 |
| Aug. 31, 2005 | (JP) | 2005-251910 |
| Sep. 30, 2005 | (JP) | 2005-289152 |
| Oct. 6, 2005  | (JP) | 2005-293796 |

(51) Int. Cl.
*G06F 11/30* (2006.01)
*G06F 17/40* (2006.01)
*G21C 17/00* (2006.01)
*G01R 23/16* (2006.01)
*G01H 1/08* (2006.01)
*G01M 13/04* (2006.01)
*G01N 29/00* (2006.01)

(52) U.S. Cl. .................. 702/183; 702/33; 702/56; 702/77; 702/182; 73/593; 73/602; 73/659; 73/660

(58) Field of Classification Search ............... 702/183, 702/33, 56, 77, 182; 73/593, 602, 659, 660
See application file for complete search history.

(56) References Cited

U.S. PATENT DOCUMENTS 5,251,151 A * 10/1993 Demjanenko et al. ......... 702/56

(Continued)

FOREIGN PATENT DOCUMENTS

JP    2-25778 A    1/1990

(Continued)

*Primary Examiner*—Eliseo Ramos Feliciano
*Assistant Examiner*—Janet L Suglo
(74) *Attorney, Agent, or Firm*—Sughrue Mion, PLLC

(57) ABSTRACT

Provided are an envelope processor 103, for obtaining an envelope for a detected signal; a FFT unit 104, for converting the envelope into a frequency spectrum; a peak detector 105, for smoothing the frequency spectrum by calculating a moving average, for further performing smoothing and differentiation for the spectrum, and detecting, as peaks, frequency points at which a sign of a differential coefficient is changed from positive to negative, for extracting peaks having a predetermined threshold value or greater, and for sorting the extracted peaks and detecting upper peaks; and a diagnosis processor T, for diagnosing an abnormality based on the detected peaks.

30 Claims, 51 Drawing Sheets

U.S. PATENT DOCUMENTS

| | | | | |
|---|---|---|---|---|
| 5,365,787 A * | 11/1994 | Hernandez et al. | | 73/660 |
| 6,020,701 A * | 2/2000 | Ishida | | 318/362 |
| 6,215,408 B1 * | 4/2001 | Leonard et al. | | 340/644 |
| 6,694,285 B1 * | 2/2004 | Choe et al. | | 702/182 |
| 6,747,592 B2 * | 6/2004 | Nakamura | | 342/70 |
| 6,766,339 B2 * | 7/2004 | Wiener | | 708/313 |
| 2005/0096873 A1 * | 5/2005 | Klein | | 702/184 |

FOREIGN PATENT DOCUMENTS

| | | |
|---|---|---|
| JP | 2-99368 U | 8/1990 |
| JP | 4-52526 A | 2/1992 |
| JP | 4-148839 A | 5/1992 |
| JP | 4-235327 A | 8/1992 |
| JP | 5-142033 A | 6/1993 |
| JP | 7-137509 A | 5/1995 |
| JP | 8-77683 A | 3/1996 |
| JP | 8-179826 A | 7/1996 |
| JP | 9-500452 A | 1/1997 |
| JP | 9-113416 A | 5/1997 |
| JP | 2002-22617 A | 1/2002 |
| JP | 2002-71447 A | 3/2002 |
| JP | 2003-106946 A | 4/2003 |
| JP | 2003-130763 A | 5/2003 |
| JP | 2003-202276 A | 7/2003 |
| JP | 2003-232674 A | 8/2003 |
| JP | 2003-535755 A | 12/2003 |
| JP | 2004-117092 A | 4/2004 |
| JP | 2004-257836 A | 9/2004 |
| JP | 2005-196156 | 7/2005 |

* cited by examiner

SPECTRUM OF ENVELOPE FOR WHICH DECIMATION PROCESS HAS BEEN PERFORMED

COMPOSITION EXAMPLE: SAMPLING FREQUENCY OF 25 kHz
FFT 16384 POINTS

COMPARISON OF S/N RATIO

A: SAMPLING FREQUENCY OF 25 kHz, FFT 16384 POINTS

B: AFTER PERFORMING SUB-SAMPLING AT SAMPLING FREQUENCY OF 5 kHz, THEN, FFT 4096 POINTS

C: AFTER DIGITAL LOW-PASS FILTERING AT fc 1 kHz, AND PERFORMING SUB-SAMPLING AT SAMPLING FREQUENCY OF 5 kHz, THEN, FFT 4096 POINTS

SET REFERENCE FOR DUTY RATIO SO
AS TO INCLUDE NOISE COMPONENT

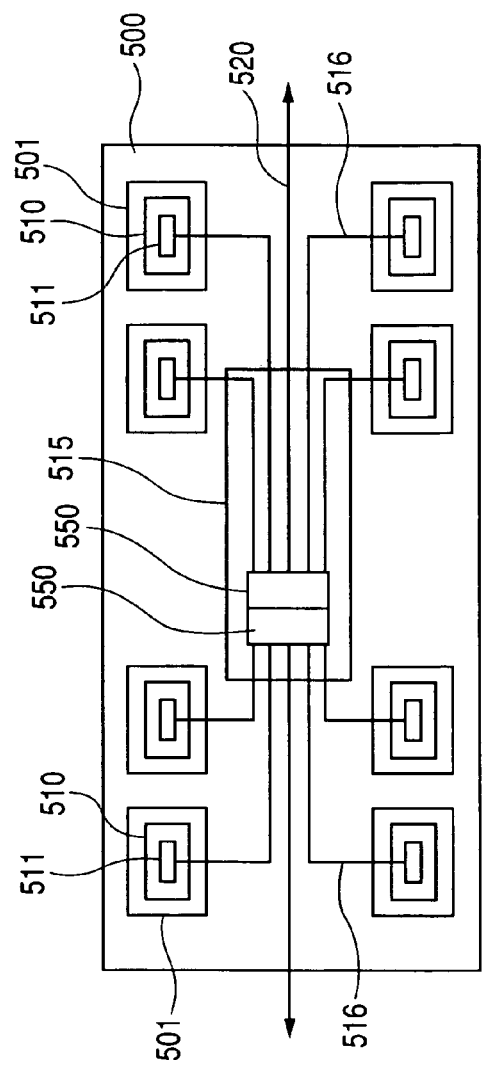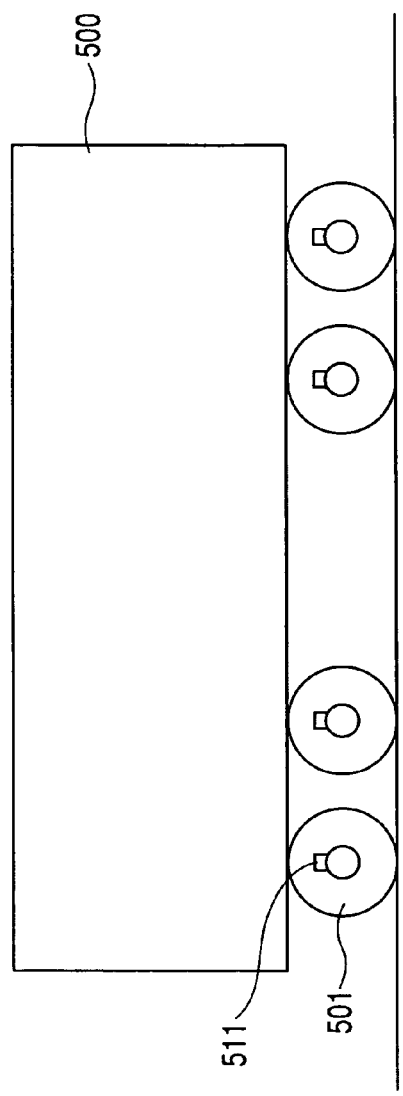
FIG. 40(a)
FIG. 40(b)

FIG. 45

| ELEMENT OF BEARING | FREQUENCY CORRESPONDS TO ELEMENTS |
|---|---|
| INNER RING (Si) | $Zfi = \dfrac{fr}{2}\left(1 + \dfrac{Da}{dm} \cdot \cos\alpha\right) Z$ |
| OUTER RING (So) | $Zfc = \dfrac{fr}{2}\left(1 - \dfrac{Da}{dm} \cdot \cos\alpha\right) Z$ |
| ROLLING ELEMENT (Sb) | $2fb = fr\left(1 - \dfrac{Da^2}{dm^2} \cdot \cos^2\alpha\right) \dfrac{dm}{Da}$ |
| CAGE (Sc) | $fc = \dfrac{fr}{2}\left(1 - \dfrac{Da \cdot \cos\alpha}{dm}\right)$ | fr: INNER RING (OUTER RING) ROTATION SPEED [Hz]
fc: CAGE ROTATION SPEED [Hz]
fb: ROLLING ELEMENT ROTATION SPEED [Hz]
dm: ROLLING ELEMENT PITCH CIRCLE DIAMETER [mm]
Z: NUMBER OF ROLLING ELEMENTS
fi: fr-fc
Da: ROLLING ELEMENT DIAMETER [mm]
$\alpha$: CONTACT ANGLE [rad]

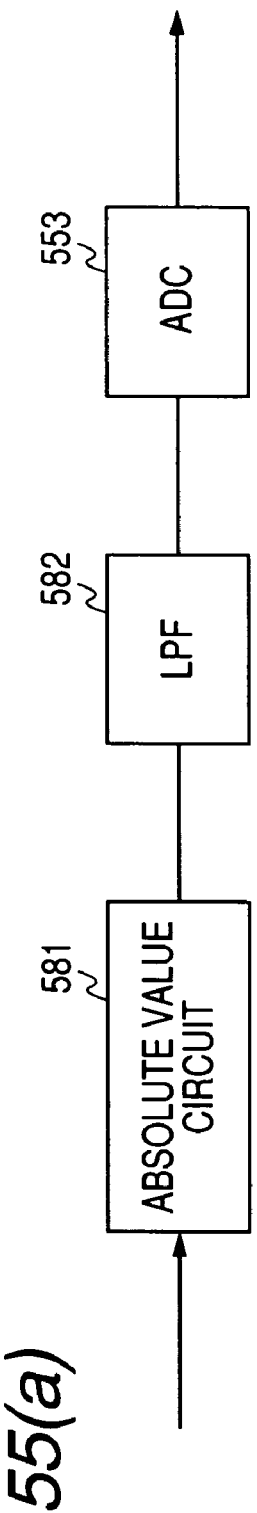
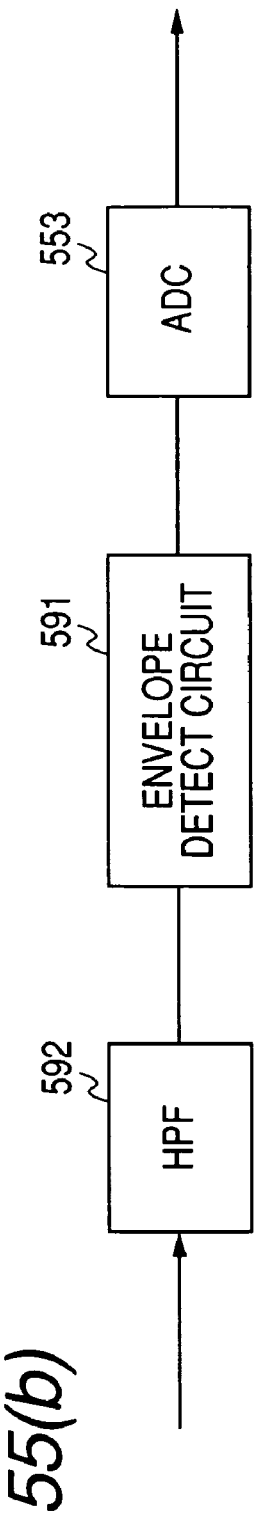
FIG. 55(a)
FIG. 55(b)

ABNORMALITY DIAGNOSING SYSTEM FOR MECHANICAL EQUIPMENT

TECHNICAL FIELD

The present invention relates to an abnormality diagnosing technique for mechanical equipment that includes bearings, such as a railway vehicle, an aircraft machine, a wind power generation machine, a machine tool, an automobile, an ironmaking machine, a papermaking machine and a rotary machine. More in detail, the present invention relates to an abnormality diagnosing technique, for analyzing sounds or vibrations generated by mechanical equipment and for diagnosing abnormalities of bearings or bearing related members of the mechanical equipment.

BACKGROUND ART

Conventionally, as this type of abnormality diagnosing technique, one is known that detecting a signal that represents sounds or a vibration generated by a sliding-rolling member or a sliding-rolling member related member of mechanical equipment; obtaining a frequency spectrum for the detected signal or an envelope signal thereof; extracting, from the frequency spectrum, only a frequency component that causes the abnormality of the sliding-rolling member of the mechanical equipment or the sliding-rolling member related member of the mechanical equipment; and employing the level of the extracted frequency component to diagnose the occurrence of the abnormality in the sliding-rolling member that is used in the mechanical equipment (see patent document 1).

Further, a technique is also known that detecting a sounds or a vibration generated by a rotary member or a rotary member related member; extracting, from the detected signal, a signal in a frequency band required for diagnosis; obtaining an envelope for the extracted signal; analyzing the frequency for the obtained envelope to obtain the level of the basic frequency component of a frequency, which causes the rotary member or the rotary member related member abnormality, and the natural number of times for the level of the frequency component; comparing the level of the basic frequency component with the level of the frequency component that is the natural number of times; and employing the comparison results as a reference for determining the mechanical equipment abnormality (see patent document 2).

Furthermore, a technique is known that an analog signal that indicates sounds or a vibration generated by mechanical equipment is converted into a digital signal through A/D (analog/digital) conversion, and actual digital data are generated; analysis processes, such as frequency analysis and envelope analysis, are performed for the actual digital data to generate actual frequency spectrum data; and the occurrence of the mechanical equipment abnormality is determined by examining whether a peak in the actual frequency spectrum data is present at the primary value (fundamental value), the secondary value and the quartic value of the frequency component that causes the mechanical equipment abnormality (see patent document 3).

Moreover, a technique is known that the envelope waveform of vibration acceleration is converted into a digital signal, and a vibration spectrum distribution is obtained digital vibration data per determined time, and at the same time, the rotational speed of a rolling bearing is obtained through the measurement of vibration; and when the time transient pattern of the rotational speed matches the time transient pattern of the frequency of the peak spectrum in the vibration spectral distribution, and when the frequency of the peak spectrum at an arbitrary time matches a characteristic frequency that is obtained based on the rotational speed of the rolling bearing and the geometric size of the rolling bearing and that causes the damage to the rolling bearing, it is assumed that damage to a specific portion of the rolling bearing has occurred (see patent document 4).

A method for detecting the peak of a frequency indicating an abnormality is not clearly described in these patent documents. However, when an abnormality, such as flaking of a bearing or eccentric displacement of the rotary shaft of a machine, has occurred, the peak of the frequency of a signal (abnormal signal) indicating this abnormality can be easily obtained by averaging the frequency spectrum. The averaging is a method that is regarded as effective for removing random noise and is used in the frequency analysis field, such as a Fast Fourier Transform (FFT) analysis.

Further, in these conventional techniques, the process (the envelope process) for obtaining an envelope signal is an analog process or a digital process, but the fast Fourier transform (FFT) process, which is a digital process, is employed for the frequency analysis. In order to perform the FFT operation, an A/D conversion is performed before or after the envelope process. And in either conventional technique, the FFT operation is performed immediately after the envelope process.

According to a system for performing the envelope process in a digital manner, an envelope process unit is required. Therefore, in order to reduce the cost and the size of the system, it is advantageous that the envelope process is performed in a digital manner.

For a system that performs the envelope process in a digital manner, an improvement of the efficiency of the FFT operation can be employed as a method for increasing the abnormality diagnosis efficiency. The improvement of the efficiency of the FFT operation can be achieved by reducing the number of points of the FFT operation.

Furthermore, an abnormality diagnosis apparatus that employs vibrations (including acoustic vibrations) is used to detect damage to an axle bearing or the wheels of a railway vehicle. Conventionally, in this type of abnormality diagnosis apparatus, a vibration sensor is provided for individual axle boxes, and damage to the axle boxes and the wheels is detected (see patent documents 5 and 6.

Conventionally, after a railway vehicle has been employed for a specific period of time, rotary parts, such as an axle bearing, are periodically inspected to determine whether an abnormality, such as a damage or abrasion, has occurred. This periodical inspection is performed by disassembling a mechanical device wherein rotary parts are assembled, so that, through visual inspection, a worker can find the damage and abrasion on the rotary parts. In the case of bearings, the main defects found during an inspection are, for example, indentations that bit a foreign substance, etc., flaking due to rolling contact fatigue and another abrasion; in the case of gears, example defects are fractures and abrasion of teeth; and in the case of wheels, example defects are abrasion, such as wheel flat. In any case, when roughness, abrasion, etc., which are not present with new parts, are found, the parts are exchanged for new ones.

However, the method that the entire mechanical equipment device is disassembled and a worker performs an inspection wither his or her eyes has the following problems. A great amount of labor is required for a disassembly operation for removing a rotary member and a sliding-rolling member from an apparatus, and an assembly operation for reassembling, with the apparatus, the rotary member and the sliding-rolling member that have been inspected, and maintenance costs for the apparatus would be considerably increased.

Further, during the reassembly process, the inspection could cause a defect in the rotary member or the sliding-rolling member, e.g., indentations that are not present before the inspection may be made in the rotary member or the sliding-rolling member. Furthermore, since multiple bearings are visually inspected within a limited period of time, defects may be missed. In addition, there are variations between individuals who judge a defect, and since parts are exchanged even though no defect found, an unnecessary cost is required.

Therefore, various methods that a rotary part abnormality can be diagnosed in an actual operating state while a mechanical apparatus in which rotary parts are mounted need not be disassembled have been proposed, (e.g., patent documents 1, 7 and 8). As the most common method, a method, as described in patent document 1, is that the vibration acceleration level of a bearing portion is measured by an accelerometer located at the bearing portion, and a FFT (Fast Fourier Transform) process is performed for the obtained signal to extract a signal that includes a frequency component at which a vibration is generated, so as to perform a diagnosis.

Moreover, for the rolling faces of the wheels of a railway vehicle, various methods have been proposed for detecting portions called flats. The flats are caused by friction or abrasion when the locking or skidding of wheels, relative to rails, has occurred due to an erroneous operation of the brakes, etc. (see, for example, patent documents 6, 9 and 10). Especially in patent document 6, an apparatus is proposed that employs a vibration sensor, a rotation measurement device, etc., to detect a defective state of the wheels of a railway vehicle and the rails along which trains pass.

Patent Document 1: JP-A-2003-202276
Patent Document 2: JP-A-2003-232674
Patent Document 3: JP-A-2003-130763
Patent Document 4: JP-A-09-113416
Patent Document 5: JP-A-4-235327
Patent Document 6: JP-A-9-500452
Patent Document 7: JP-A-2002-22617
Patent Document 8: JP-A-2004-257836
Patent Document 9: JP-A-4-148839
Patent Document 10: JP-A-2003-535755

However, since shock produced sounds and friction produced sounds tend to externally affect a vibration sensor and an acoustic sensor, and since acceleration due to turning motion affects a mobile member, abnormalities tend to be erroneously detected that are due to these unsteadying disturbances. Therefore, when the averaging calculation is frequently performed, in some cases, the frequency peak detection method using an averaging is not effective because the sensor is easily affected by a change in the speed and an external shocking sound, etc.

Furthermore, in a case where an abnormality has occurred for example, due to a small scratch, flaking, or rusting before the life has expired, the power of a signal output by a vibration sensor or an acoustic sensor is frequently so small that it is masked by mechanical noise or electrical noise. Therefore, at the abnormality prediction stage, before the life has expired, in many cases, a method for setting a threshold value and for extracting only a signal having a power greater than the threshold value can not be employed. The most difficult problem for a prediction of an abnormality is that when an S/N ratio of an abnormality signal, or a signal (abnormality prediction signal) that indicates a sign of an abnormality, to a noise signal is small, the noise signal may erroneously be regarded as an abnormality signal or an abnormality prediction signal. A procedure for avoiding the possibility an extremely small abnormality signal or an abnormality prediction signal will be missed can effectively increase the precision of an abnormality prediction for bearings, etc. However, when it is possible a noise signal will be erroneously determined to be an abnormality signal or an abnormality prediction signal, accordingly, the mechanical equipment must be frequently halted and inspected, so that the operating costs would be increased.

In addition, when reducing the number of points for the FFT operation in order to increase the calculation efficiency, the frequency resolution would be reduced, and the accuracy of an abnormality diagnosis would be deteriorated.

Further, for a system that performs the envelope process in a digital manner, an increase in the efficiency of a FFT operation can be employed as a method for improving the abnormality diagnostic efficiency, since an improvement in the efficiency of a FFT operation can be achieved by reducing the number of points for the FFT operation. However, were the efficiency of a calculation to be increased by reducing the number of points for a FFT operation, the frequency resolution would be reduced and the accuracy of an abnormality diagnosis would be deteriorated.

Small size and small power consumption are preferable for an operating device when it is mounted on a rotary machine, in order to diagnose abnormalities that are caused by bearing defects, etc. Further, from the viewpoint of calculation accuracy and from the viewpoint of memory capacity, it is desired that a FFT operation be performed by using only a small number of operation points. On the contrary, as described above, the accuracy of an abnormality diagnosis is reduced, to a degree, when the frequency resolution is not high enough. But when the frequency level at which a raw waveform can be recovered must be set as 10 kHz (so that the sampling frequency is equal to or higher than 20 kHz), in the long run, the upper limit for the defective frequency of a bearing will be equal to or lower than 1 kHz.

However, for a conventional abnormality diagnosis apparatus, since a vibration sensor must be provided for each axle box, there are the following problems. The number of sensors to be installed must be increased for each vehicle, the number of input circuits and the number of lines must be increased for a signal processor that processes sensor signals, and the structure of the circuit becomes complicated.

However, as one problem for the defective state detection apparatus described in patent document 6, abnormal vibrations can not be identified to determine whether they are caused by flat wheels, by axle bearings, by abnormalities along the rails or by other abnormalities.

DISCLOSURE OF THE INVENTION

Subjects that the Invention is to Achieve

The present invention is provided while taking the above described situations into account, and one objective of the invention is to provide a abnormality diagnosing system for a mechanical equipment that can perform an abnormality diagnosis at a high accuracy, without erroneously detecting a noise signal as an abnormality signal or as an abnormality prediction signal, under a condition wherein the S/N ratio of the abnormality signal or the abnormality prediction signal to the noise signal is small.

The present invention is provided while taking the above described situations into account, and one objective of the invention is to provide a abnormality diagnosing system for a mechanical equipment that can increase both the frequency resolution of a signal output by mechanical equipment and the efficiency of a FFT operation, and can accurately and efficiently perform an abnormality diagnosis.

The present invention is provided while taking the above described situations into account, and one objective of the invention is to provide a abnormality diagnosing system for a mechanical equipment that can perform a FFT, at an arbitrary frequency resolution, for a detected signal from a diagnosis target, and can accurately perform an abnormality diagnosis.

The present invention is provided while taking the above described situations into account, and one objective of the invention is to provide an abnormality diagnosis apparatus for which only one vibration sensor must be provided for each vehicle, so that, based on a waveform signal output by the single vibration sensor, abnormalities, such as the flaking of bearings and wheel flat, can be detected for the pertinent vehicle.

The present invention is provided while taking the above described situations into account, and one objective of the invention is to provide an abnormality diagnosis apparatus that can detect abnormal vibrations of axle bearings and wheels based on a signal output by a vibration sensor that detects the vibrations of the axle bearings or the wheels, and can determine whether the abnormal vibrations are caused by wheel flat or axle bearings.

Means for Achieving the Subjects

To achieve the objectives, a abnormality diagnosing system for a mechanical equipment according to the present invention has characteristics (1) to (31).

(1) An abnormality diagnosing system, which detects sounds or vibrations generated by mechanical equipment, analyzes a detected signal for the sounds or vibrations and diagnoses an abnormality for a bearing or a bearing related member in the mechanical equipment, comprising:

an envelope processor, for obtaining an envelope for the detected signal;

a FFT unit, for transforming the envelope obtained by the envelope processor into a frequency spectrum;

a peak detector, for smoothing the frequency spectrum obtained by the FFT unit during a moving average calculation process, and for detecting peaks in the frequency spectrum; and a diagnosis processor, for diagnosing an abnormality based on the peaks in the frequency spectrum detected by the peak detector.

(2) The abnormality diagnosing system having the above arrangement (1), wherein the peak detector includes:

a smooth differential peak extraction unit, for performing a smoothing and differential process for the frequency spectrum obtained by the FFT unit, and for extracting, as peaks in the frequency spectrum, frequency points at which a sign for an obtained differential value is changed.

(3) The abnormality diagnosing system having the above arrangement (1) or (2), wherein a weighting coefficient used in the moving average calculation process is bilaterally symmetrical (longitudinally symmetrical with the current time employed as a reference).

(4) The abnormality diagnosing system having the above arrangement (2) or (3), wherein the peak detector includes:

a first selector, for selecting a peak that is extracted by the smooth differential peak extraction unit and that is equal to or greater than a threshold value.

(5) The abnormality diagnosing system having the above arrangement (4), wherein the peak detector includes:

a second selector, for selecting, from among the peaks selected by the first selector, a predetermined number of peaks beginning with a peak having a large amplitude level.

(6) The abnormality diagnosing system having one of the above arrangements (1) to (5), wherein the diagnosis processor calculates a coincidence degree between a peak in the frequency spectrum that is detected by the peak detector and that corresponds to a main component (fundamental component) of a vibration, or that corresponds to a main component and a high-order component (harmonics component) of a vibration, and a frequency that indicates an abnormality of a diagnosis target, and evaluates results obtained by accumulating the coincidence degree multiple times.

(7) An abnormality diagnosing system, which detects sounds or vibrations generated by mechanical equipment, analyzes a detected signal, and diagnoses an abnormality of a bearing or a bearing related member of the mechanical equipment, comprising:

a filter processor, for extracting a signal in a frequency band required for a diagnosis from the detected signal;

an envelope processor, for obtaining an envelope signal for the signal extracted by the filter processor;

a decimation processor, for performing decimation for the envelope signal obtained by the envelope processor;

a FFT operation processor, for analyzing a frequency of the envelope signal obtained by the decimation processor through decimation; and a diagnosis processor, for diagnosing an abnormality based on analysis results obtained by the FFT operation processor.

(8) An abnormality diagnosing system, which detects sounds or vibrations generated by mechanical equipment, analyzes a detected signal, and diagnoses an abnormality of a bearing or of a bearing related member of the mechanical equipment, comprising:

a sampling processor, for sampling the detected signal at a sampling frequency that is higher than a sampling frequency regarded in advance as necessary;

a filter processor, for extracting, from the signal obtained by the sampling processor, a signal in a frequency band required for a diagnosis;

a decimation processor, for performing decimation for the signal extracted by the filter processor;

an envelope processor, for obtaining an envelope signal for the signal obtained by the decimation processor through decimation;

a FFT operation processor, for analyzing a frequency for the envelope signal obtained by the envelope processor; and a diagnosis processor, for diagnosing an abnormality based on the analysis results obtained by the FFT operation processor.

(9) An abnormality diagnosing system having the above arrangement (7) or (8), further comprising:

a digital filter processor, for lowering a frequency band for the envelope signal.

(10) An abnormality diagnosing system having the above arrangement (7), (8) or (9), wherein the FFT operation processor is provided as a DSP, and the number of data sets storable in a memory of the DSP is to be input to the FFT operation processor.

(11) An abnormality diagnosing system, which detects sounds or vibrations generated by mechanical equipment, analyzes a signal indicating the sounds or the vibrations, and diagnoses an abnormality of a bearing or of a bearing related member of the mechanical equipment, comprising:

an A/D converter, for transforming the signal into a digital signal;

a digital filter processor, for extracting, from the digital signal obtained by the A/D converter, a signal in a frequency band required for a diagnosis;

an envelope processor, for obtaining an envelope signal for the signal extracted by the digital filter processor;

an interpolation processor, for performing zero-padding interpolation in order to perform a fast Fourier transform, at an arbitrary frequency resolution, for the envelope obtained by the envelope processor;

a FFT unit, for performing a FFT for a signal obtained by the interpolation processor through the zero-padding interpolation; and a diagnosis processor, for diagnosing an abnormality based on a frequency spectrum obtained by the FFT unit.

(12) The abnormality diagnosing system for a mechanical equipment having the above arrangement (11), wherein the interpolation processor performs zero-padding interpolation, so that a sampling frequency used by the FFT unit are hertz of the Nth power of two, or hertz of a multiple of the Nth power of two.

(13) The abnormality diagnosing system for a mechanical equipment having the above arrangement (11) or (12), further comprising:

a peak detector, for detecting peaks in the frequency spectrum obtained by the FFT unit, wherein the diagnosis processor calculates a coincidence degree between a peak in the frequency spectrum that is detected by the peak detector and that corresponds to a main component of a vibration, or that corresponds to a main component (fundamental component) and a high-order component (harmonic component) of a vibration, and a frequency that indicates an abnormality of a diagnosis target, and evaluates results obtained by accumulating the coincidence degree multiple times.

(14) An abnormality diagnosis apparatus, which diagnoses an abnormality while a vehicle is moving, comprising:

a vibration sensor, for detecting vibrations of the vehicle;

a parameter value detection circuit, for employing a waveform signal output by the vibration sensor to obtain one of dimensionless parameter values, i.e., a crest factor, a impulse factor, a shape factor and a kurtosis; and a comparison circuit, for outputting a first voltage signal indicating that a dimensionless parameter value output by the parameter value detection circuit exceeds a predetermined reference, or a second voltage signal indicating that the dimensionless parameter value is equal to or lower than the predetermined reference, wherein an abnormality is detected based on the output of the comparison circuit.

(15) An abnormality diagnosis apparatus, which diagnoses an abnormality while a vehicle is moving, comprising:

a vibration sensor, for detecting vibrations of the vehicle;

an operation circuit, for employing a waveform signal output by the vibration sensor to obtain one of parameter values, either an RMS (a root mean square) or an absolute value average;

a peak detection circuit, for obtaining a peak value for the waveform signal; and a comparison circuit, for comparing a value that is a constant times the parameter value, with the peak value output by the peak detection circuit, and for, in accordance with the comparison results, outputting a first voltage signal, which indicates that a dimensionless parameter value obtained as a ratio of the peak value to the parameter value exceeds a predetermined reference, or outputting a second voltage signal, which indicates that the dimensionless parameter is equal to or lower than the predetermined reference, wherein an abnormality is detected based on the output of the comparison circuit.

(16) The abnormality diagnosis apparatus having the above arrangement (15), further comprising:

a peak/reference value comparison circuit, for comparing the peak value output by the peak detection circuit with a predetermined reference value, wherein, when the peak value is greater than the reference value as a result of the comparison by the peak/reference value comparison circuit, the output of the comparison circuit is regarded as invalid.

(17) The abnormality diagnosis apparatus having one of the above arrangements (14) to (16), wherein an abnormality is detected based on a duty ratio of the first voltage signal.

(18) The abnormality diagnosis apparatus having one of the above arrangements (15) to (17), further comprising:

a filter circuit, so as to transmit, to the parameter value detection circuit and the peak detection circuit, a signal, only in a predetermined band, among signals output by the vibration sensor.

(19) The abnormality diagnosis apparatus having one of the above arrangements (14) to (18), wherein the vehicle is a railway vehicle.

(20) An abnormality diagnosis apparatus, for a mechanical apparatus that includes a plurality of parts having different vibration properties, characterized by comprising:

a sensor signal processor, for sampling a signal output by a vibration sensor that detects vibrations of the mechanical apparatus; and a diagnosis processor, for performing an abnormality diagnosis based on vibration data obtained by the sensor signal processor through sampling, wherein the diagnosis processor sequentially samples vibration data from the sensor signal processor and divides the vibration data into intervals for predetermined cycles; processes vibration data for one interval as vibration data for a diagnosis of parts having a first vibration property; and processes, as vibration data for a diagnosis of parts having a second vibration property, data that is obtained by adding, to the head of vibration data for one interval, data for the preceding interval equivalent to the last predetermined period of time.

(21) An abnormality diagnosis apparatus, for axle bearings and wheels of a railway vehicle, characterized by comprising:

a sensor signal processor, for sampling a signal output by a vibration sensor that detects vibrations of axle bearings and wheels; and a diagnosis processor, for performing abnormality diagnoses for the axle bearings and wheels based on vibration data obtained by the sensor signal processing through sampling, wherein the diagnosis processor sequentially samples vibration data from the sensor signal processor and divides the vibration data into intervals for predetermined cycles; processes vibration data for one interval as vibration data for a bearing diagnosis; and processes, as vibration data for a wheel diagnosis, data that is obtained by adding to the head of vibration data, for one interval, data for the preceding interval equivalent to the last predetermined period of time.

(22) The abnormality diagnosis apparatus in (21), wherein:

the diagnosis processor detects an abnormality of an axle bearing based on a rotation speed of the axle bearing and a frequency peak obtained by processing an envelope waveform for vibrations; detects an abnormality of wheels based on a frequency at which a level of vibrations that are generated in synchronization with rotation of the wheels exceeds a threshold value; and performs an abnormality diagnosis based on the abnormality detection results.

(23) The abnormality diagnosis apparatus in (21) or (22), wherein the signal processing unit performs sampling by changing, by one channel, signals output by a plurality of vibration sensors.

(24) The abnormality diagnosis apparatus in (22) or (23, wherein vibration data are obtained by sampling and averaging, in synchronization with rotation of the wheels, signals that are output by the vibration sensors, and based on the vibration data, abnormality diagnoses are performed for the axle bearings and the wheels.

(25) An abnormality diagnosis apparatus, for a mechanical apparatus that includes a plurality of parts having different vibration properties, characterized by comprising:

a sensor signal processor, for sampling a signal output by a vibration sensor that detects vibrations of the mechanical apparatus; and a diagnosis processor, for performing an abnormality diagnosis based on vibration data obtained by the sensor signal processor through sampling, wherein the diagnosis processor sequentially samples the vibration data from the sensor signal processor, and converts the vibration data into data having two different sampling frequencies or two different sampling lengths, one for a diagnosis of parts having a first vibration property, and the other for a diagnosis of parts having a second vibration property.

(26) An abnormality diagnosis apparatus, for axle bearings and wheels of a railway vehicle, characterized by comprising:

a sensor signal processor, for sampling a signal output by a vibration sensor that detects vibrations of the axle bearings and wheels of a railway vehicle; and a diagnosis processor, for performing an abnormality diagnosis based on vibration data obtained by the sensor signal processor through sampling, wherein the diagnosis processor sequentially samples the vibration data from the sensor signal processor, and converts the vibration data into data having two different sampling frequencies or two different sampling lengths, one for an axle bearing diagnosis and the other for a wheel diagnosis.

(27) An abnormality diagnosis apparatus in (22), (23), (24) or (26), wherein multiple times of detections of an abnormality are performed for the axle bearings and the wheels, and abnormality diagnoses are statistically performed based on collected values for the multiple times of detections.

(28) An abnormality diagnosis apparatus in one of (20) to (27), characterized by including a function for storing data used for detecting an abnormality.

(29) An abnormality diagnosis apparatus, for a mechanical apparatus that includes rotary or sliding parts, characterized by comprising:

an AD converter, for transforming, into a digital signal, an analog signal output by a vibration sensor that detects vibrations of the mechanical apparatus; and a diagnosis processor, for performing a Fourier transform for the digital signal obtained by the AD converter, and for performing an abnormality diagnosis based on the results, wherein, during in the Fourier transform process, the diagnosis processor extends a data bit width of the digital signal obtained by the AD converter more than a resolution of the AD converter.

(30) An abnormality diagnosis apparatus, for a mechanical apparatus that includes rotary or sliding parts, characterized by comprising:

an AD converter, for transforming, into a digital signal, an analog signal output by a vibration sensor that detects vibrations of the mechanical apparatus; and a diagnosis processor, for performing a Fourier transform for the digital signal obtained by the AD converter, and for performing an abnormality diagnosis based on the results, wherein, during the Fourier transform process, the diagnosis processor regards, as one bit, the resolution of the AD converter, and extends the resolution to a predetermined data bit width equal to or greater than two bits.

(31) An abnormality diagnosis apparatus, for a mechanical apparatus that includes rotary or sliding parts, characterized by comprising:

a comparator, for comparing, with a reference voltage, a voltage of an analog signal received from a vibration sensor that detects vibrations of the mechanical apparatus, and for outputting a two-valued signal indicating that the voltage of the analog signal is either higher or lower than the reference voltage, wherein the diagnosis processor extends the signal of the comparator to a predetermined data bit width, and performs a Fourier transform process.

Advantages of the Invention

According to the abnormality diagnosing system having the arrangement (1), sounds or vibrations generated by the mechanical equipment are detected; the envelope of the detected signal is obtained and is converted into a frequency spectrum; and the obtained frequency spectrum is smoothed by calculating the moving average and the peaks of the frequency spectrum are detected; and an abnormality is diagnosed based on the detected peaks. Therefore, under a condition wherein the S/N ratio of an abnormality signal, or an abnormality prediction signal, to a noise signal is small, the noise signal is not erroneously detected as the abnormality signal or the abnormality prediction signal, and an abnormality diagnosis can be accurately detected.

According to the abnormality diagnosing system having the arrangement (2), the smooth differential process (i.e., the acquisition of a difference in a plurality of intervals and the addition of interval lengths while the same point is employed as the center) is performed for the frequency spectrum, and the frequency points where the sign of the differential value is changed are extracted as the peaks of the frequency spectrum. Therefore, the peaks of the frequency spectrum that are covered by noise can be accurately detected.

According to the abnormality diagnosing system having the arrangement (3), since the weighting coefficient used for the moving average calculation process is bilaterally symmetrical, the noise signal can be prevented from being erroneously detected as the abnormality signal or the abnormality prediction signal.

According to the abnormality diagnosing system having the arrangement (4), of the extracted peaks, peaks, the amplitude level of which is equal to or greater than the threshold value, are selected. Therefore, the peaks of the frequency spectrum that are covered by peak noise can be more accurately detected.

According to the abnormality diagnosing system having the arrangement (5), from among the peaks the amplitude level of which is equal to or greater than the threshold value, a predetermined number of peaks are selected, beginning with a peak having the largest root mean square at the amplitude level. Therefore, peaks can be narrowed down to those effective for performing abnormality diagnoses, so that abnormality diagnoses can be accurately and efficiently performed.

According to the abnormality diagnosing system having the arrangement (6), from among the detected peaks of the frequency spectrum, a coincidence degree is calculated between the peak that corresponds to the main component (fundamental component) of the vibration, or that corresponds to the main component (fundamental component) and the high-order component (harmonic component) of the vibration, and the frequency that indicates an abnormality for a diagnosis target. Then, a plurality of results for the accumulation of the coincidence degrees are evaluated to diagnose an abnormality. Therefore, the abnormality diagnosis can be accurately performed.

According to the abnormality diagnosing system having the arrangement (7), the signal decimation process is performed after the envelope process, and the number of points for the FFT operation for analyzing the envelope waveform is reduced. Therefore, both the frequency resolution of a detected signal and the efficiency of the FFT operation can be increased, and the abnormality diagnosis for bearings can be accurately and efficiently performed.

According to the abnormality diagnosing system having the arrangement (8), a high sampling rate is set for A/D conversion of a detected signal before the frequency band is limited and the decimation process is performed. Thus, the anti-aliasing filter can be eliminated. Further, since the signal decimation process is performed after the envelope process, and the number of points is reduced for the FFT operation for analyzing the envelope waveform, both the frequency resolution of the detected signal and the efficiency of the FFT operation can be increased. Therefore, the abnormality diagnosis of the bearings can be accurately and efficiently performed.

According to the abnormality diagnosing system having the arrangement (9), since the digital filter process is performed to lower the frequency band of the envelope signal, the FFT operation in a low band can be stably performed while an affect, such as aliasing, can be suppressed.

According to the abnormality diagnosing system having the arrangement (10), the fast FFT process using a DSP is enabled.

According to the abnormality diagnosing system having the arrangement (11), sounds or vibrations generated by the mechanical equipment are detected, and the detected signal is converted into a digital signal; a signal in a frequency band required for a diagnosis is extracted from the digital signal, and an envelope is obtained; zero-padding interpolation is performed for the envelope, so that the FFT can be performed at an arbitrary frequency resolution; and an abnormality is diagnosed based on a frequency spectrum obtained by the FFT. Thus, an abnormality diagnosis can be performed accurately.

According to the abnormality diagnosing system having the arrangement (12), zero-padding interpolation is performed, so that the sampling frequency used by the FFT unit are hertz of the Nth power of two (e.g., N=8 to 12) or hertz of a multiple of the Nth power of two. Thus, the frequency resolution in the FFT operation can be set to a 1.0 Hz reference, and an arbitrary resolution can be designated.

According to the abnormality diagnosing system having the arrangement (13), from among detected peaks of the frequency spectrum, a coincidence degree is calculated between the peak that corresponds to the main component (fundamental component) of the vibration or that corresponds to the main component and the high-order component (harmonic component) of the vibration, and the frequency that indicates an abnormality for a diagnosis target. Then, a plurality of the results of the accumulation of the coincidence degrees are evaluated to diagnose an abnormality. Therefore, the abnormality diagnosis can be accurately performed.

According to the abnormality diagnostic apparatus having the arrangement (14), the comparison circuit is provided that employs a waveform signal output by the vibration sensor, and outputs the first voltage signal, which indicates one of dimensionless parameter values, i.e., a crest factor, a impulse factor, a shape factor and a kurtosis, exceeds the predetermined reference, or outputs the second voltage signal, which indicates the dimensionless parameter value is equal to or lower than the predetermined reference. And the abnormality is detected based on the output of the comparison circuit. Therefore, only one vibration sensor need be arranged for one vehicle, so that, based on a waveform signal from the single vibration sensor, an abnormality, such as flaking of a bearing or wheel flat, for the pertinent vehicle can be detected.

The abnormality diagnosis apparatus having the arrangement (15) comprises:

the operation circuit, for employing a waveform signal output by the vibration sensor to obtain one of the parameter values, either an RMS (a root mean square) or an absolute value average;

the peak detection circuit, for obtaining a peak value for the waveform signal; and the comparison circuit, for comparing a value that is a constant times (e.g., in "Best Modes for Carrying Out the Invention" that will be described later, since the magnification rate is determined by an analog circuit, generally, this is not an integer times, and is a predetermined value times or a fixed value times) the parameter value with the peak value output by the peak detection circuit, and for, in accordance with the comparison results, outputting a first voltage signal, which indicates that a dimensionless parameter value, obtained as a ratio of the peak value to the parameter value (i.e., the dimensionless parameter value), exceeds a predetermined reference, or outputting a second voltage signal, which indicates that the dimensionless parameter is equal to or lower than the predetermined reference. And the abnormality can be detected based on the output of the comparison circuit. Thus, only one vibration sensor must be provided for each vehicle, so that based on a waveform signal from the single vibration sensor, an abnormality, such as flaking of a bearing or wheel flat, can be detected for the pertinent vehicle. Furthermore, according to the abnormality diagnosis apparatus having the arrangement (15), an abnormality diagnosis can be performed by a comparatively simple circuit structure.

According to the abnormality diagnosis apparatus having the arrangement (16), the peak value is compared with the predetermined reference value, and when the peak value is greater than the reference value, the first and the second voltage signals are invalidated for detecting an abnormality. Thus, the output of a sensor unit can be prevented from becoming saturated by a signal having a very large magnitude that is due to noise.

According to the abnormality diagnosis apparatus having the arrangement (17), the abnormality is detected based on the duty ratio of the first voltage signal indicating that the parameter value exceeds the predetermined reference value. Thus, an abnormality diagnosis can be performed while an affect produced by noise is avoided.

According to the abnormality diagnosis apparatus having the arrangement (18), an abnormality diagnosis can be performed by catching a signal only in a predetermined band of the signals output by the vibration sensor.

According to the abnormality diagnosis apparatus having the arrangement (19), since the abnormality of a railway vehicle can be detected, the reliability of the railway vehicle can be improved.

According to the abnormality diagnosis apparatus having the arrangements (20) to (28), the following effects (I) to (IV) are obtained.

(I) Vibration data are sampled sequentially sampled and divided into intervals for predetermined cycles; vibration data for one interval is processed as vibration data for a diagnosis of parts having a first vibration property; and data is obtained by adding to the head of vibration data for one interval data for the preceding interval, equivalent to the last predetermined period of time, and is processed as vibration data for a diagnosis of parts having a second vibration property. Thus, based on the signal output by the vibration sensor that detects the vibrations of parts having these two vibration properties, the abnormal vibrations are detected in real time for the parts having these vibration properties, and whether the abnormal vibrations are due to the abnormality of the parts having the first vibration property or the abnormality of the parts having the second vibration property.

(II) Vibration data are sampled sequentially sampled and divided into intervals for predetermined cycles; vibration data for one interval is processed as vibration data for a bearing diagnosis; and data is obtained by adding to the head of vibration data for one interval, data for the preceding interval, equivalent to the last predetermined period of time, and is processed as vibration data for wheel diagnosis. Thus, based on the signal output by the vibration sensor that detects the vibrations of axle bearings and wheels, the abnormal vibrations are detected in real time for the axle bearings and wheels, and whether the abnormal vibrations are due to the wheel flat or due to the axle bearings.

(III) Vibration data are sequentially sampled, and are converted into two data sets having different sampling frequencies or sampling lengths, i.e., one for the diagnosis of parts having the first vibration property and the other for the diagnosis of parts having the second vibration property. Thus, based on the signal output by the vibration sensor that detects the vibrations of parts having these two vibration properties, the abnormal vibrations are detected in real time for the parts having these vibration properties, and whether the abnormal vibrations are due to abnormalities of the parts having the first vibration property, or abnormalities of the parts having the second vibration property.

(IV) Vibration data are sampled sequentially sampled, and are converted into two data sets having different sampling frequencies or sampling lengths, i.e., one for an axle bearing diagnosis and the other for a wheel diagnosis. Thus, based on the signal output by the vibration sensor that detects the vibrations of axle bearings and wheels, the abnormal vibrations are detected in real time for the axle bearings and wheels, and whether the abnormal vibrations are due to the flat of wheels or due to the axle bearings.

<Advantages of the Invention>

According to the invention, under a condition wherein the S/N ratio of an abnormality signal, or an abnormality prediction signal, to a noise signal is small, the noise signal is not erroneously detected as an abnormality signal or an abnormality prediction signal, and an abnormality diagnosis can be accurately performed. According to the abnormality diagnosing system of the invention, an abnormality diagnosis can be accurately and efficiently performed for bearings or bearing related members in mechanical equipment. According to the invention, at an arbitrary frequency resolution, the FFT process can be performed for a signal detected for a diagnosis target, and an abnormality diagnosis can be accurately performed. According to the abnormality diagnosis apparatus of the invention, a vibration sensor need only be provided for each vehicle, so that, based on a waveform signal output by a single vibration sensor, an abnormality, such as flaking of a bearing or wheel flat, can be detected for the pertinent vehicle. Thus, the abnormality diagnosing system can be constructed at a low cost.

According to the abnormality diagnosis apparatus of the invention, the cost and space for a circuit can be reduced by employing an AD converter having a low resolution and a simple comparator, and an abnormality diagnosis is enabled without a reduction in accuracy.

BRIEF DESCRIPTION OF THE DRAWINGS

FIG. 40(a) is a schematic plan view of a railway vehicle on which an abnormality diagnosis apparatus according to a fourteenth embodiment is mounted, and (b) is a schematic side view of the railway vehicle;

FIG. 45 is a diagram showing relations between the positions of scratches on axle bearings and vibration generation frequencies that oscillate due to the scratches;

FIGS. 55(a) and (b) are partial block diagrams showing a diagnosis processor according to a twenty-first embodiment;

BEST MODES FOR CARRYING OUT THE INVENTION

An explanation will be given for the best modes for carrying out the invention, by employing a case wherein mechanical equipment that includes a rolling bearing is employed as a target, and wherein the presence or absence of an abnormality such as a scratch on the rolling bearing in the mechanical equipment is to be determined.

Figure 1:
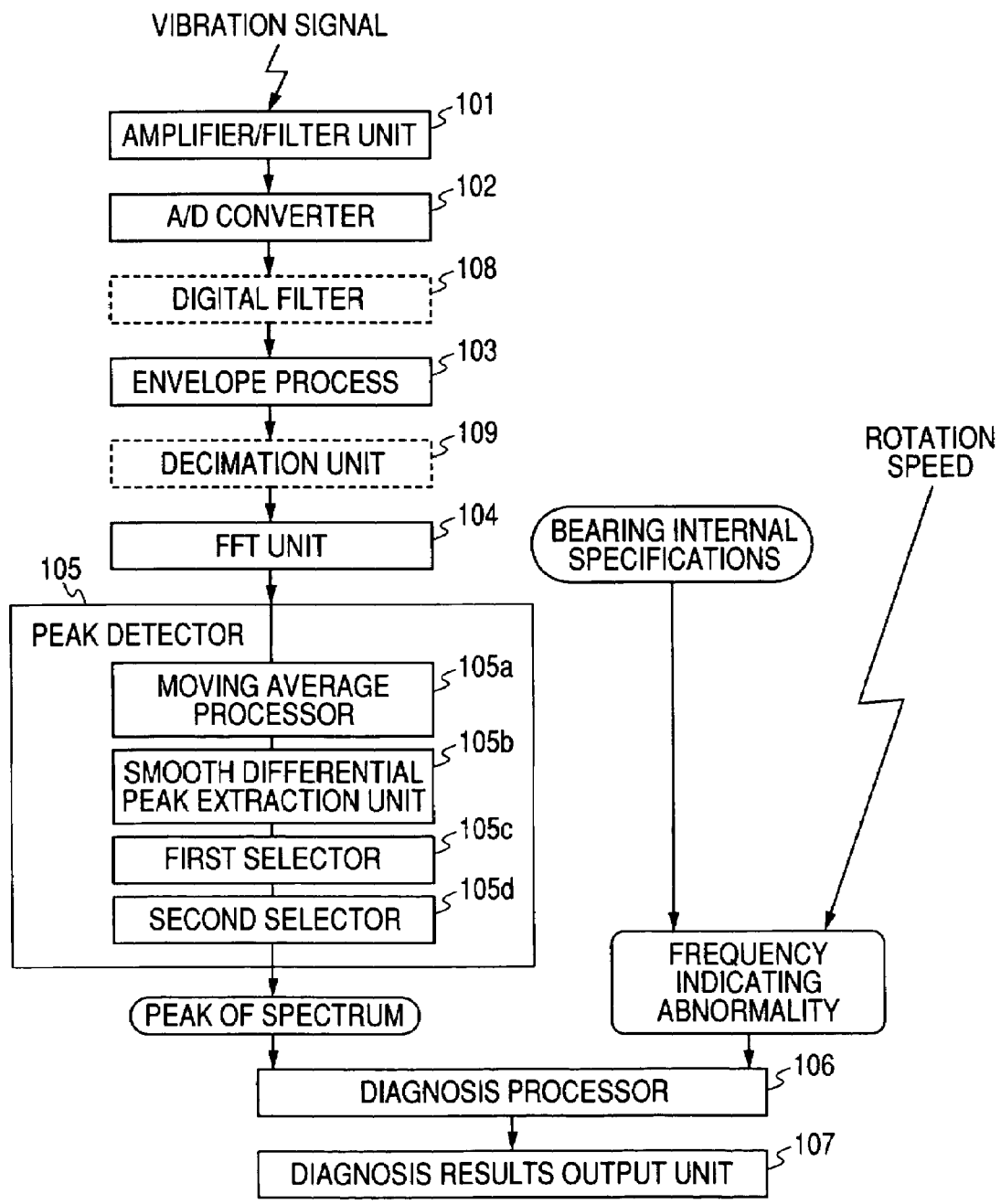
FIG. 1 is a block diagram showing a first embodiment configuration for an abnormality diagnosing system according to the present invention.

FIG. 1 is a block diagram showing an abnormality diagnosing system according to first embodiment of the present invention. As shown in FIG. 1, the abnormality diagnosing system of the invention comprises: an amplifier/filter (filter processor) 101, an A/D converter 102, an envelope processor 103, a FFT unit 104, a peak detector 105, a diagnosis processor 106 and a diagnosis results output unit 107.

The amplifier/filter 101 receives a signal detected by a sensor (a vibration sensor, an acoustic sensor or etc.) that detects sounds or vibrations generated by mechanical equipment to be diagnosed. The amplifier/filter 101 amplifies the input signal using a predetermined gain, and blocks a signal having a predetermined frequency or higher.

The A/D converter 102 samples, at a predetermined sampling frequency, an analog signal that passes through the amplifier/filter 101, and converts the analog signal into a digital signal.

The envelope processor 103 obtains the envelope (envelope waveform) of the digital signal generated by the A/D converter 102. The FFT unit 104 performs a discrete Fourier transform for the envelope obtained by the envelope processor 103 and converts the results to provide a frequency spectrum. The peak detector 105 detects peaks in the frequency spectrum obtained by the FFT unit 104. The diagnosis processor 106 compares a characteristic frequency with the peaks obtained by the peak detector 105 and evaluates degree of their coincidence. The characteristic frequency is determined by a rotational speed which is detected by a rotation sensor (not shown) provided on a rolling bearing and an internal specifications of the bearing. In this manner, an abnormality is diagnosed. The diagnosis results output unit 107 outputs the diagnosis results obtained by the diagnosis processor 106. The peak detector 105 includes a moving average processor 105a, a smooth differential peak extraction unit 105b, a first selector 105c and a second selector 105d. The moving average processor 105a weights, in the bilaterally symmetrical manner, the frequency spectrum (discrete data in a frequency area) obtained by the FFT unit 104, and calculates a moving average. For example, to obtain a moving average of five points, the following operation is performed for a frequency spectrum obtained by the FFT unit 104:

[Equation 1]

$$\tilde{x}_i = \frac{1}{w}\{ax_i + b(x_{i+1} + x_{i-1}) + c(x_{i+2} + x_{i-2})\}$$

$$a > b, \quad a > c$$

Generally, following formula (1) is calculated

[Equation 2]

$$\tilde{x}_i = \sum_{j=-m}^{m} (x_{i+j} w_j) \quad (1)$$

In this manner, the frequency spectrum is smoothed to reduce noise. After the moving average processing has been performed by the moving average processor 105a, the smooth differential peak extraction unit 105b further smoothes the resultant spectrum to obtain a differential value, and extracts, as peaks in the frequency spectrum, frequency points where the sign of a differential coefficient is changed. That is, the smooth differential peak extraction unit 105b regards as peak choices in the frequency spectrum frequency points where the value (smooth differential coefficient yj) in following formula (2) is changed from positive to negative.

[Equation 3]

$$y_j = \sum_{i=1}^{m} (x_{j+i} - x_{j-i})i \quad (2)$$

As is apparent from this formula (2), it can be understood that weighting is greater for the inclination between points located at a distance from each other than for data adjacent to each other. The peak detector 105 includes the smooth differential peak extraction unit 105b that performs for the frequency spectrum obtained by the FFT unit 104, as is apparent from formula (2), the smooth differential process during which a differential process, for a plurality of intervals, and the multiplication and addition of the lengths of the intervals are performed, with a point j being employed as the center, and that extracts peaks in the frequency spectrum as frequency points at which the sign of the obtained differential value is changed.

Therefore, according to formula (2), detection of peaks buried in noise is enabled even without using formula (1). However, formulas (1) and (2) may be employed together.

From among the peaks extracted by the smooth differential peak extraction unit 105b, the first selector 105c selects a peak, the amplitude level of which is equal to or greater than a threshold value. As the threshold value, a relative value is employed that is determined in accordance with the power average value of peaks extracted by the smooth differential peak extraction unit 105b, or in accordance with the root mean square of an overall signal. The absolute threshold value is effective when a relative noise level is low, but is not always effective when a noise level is high.

From among the peaks selected by the first selector 105c, the second selector 105d selects a predetermined number of peaks, beginning with a peak having a high amplitude level. The simplest method can, for example, be a method whereby a plurality of peaks are sorted in the descending order of levels or in the ascending order by using a well known sorting algorithm, and the peaks are selected beginning with the highest, i.e., the greatest value.

Figure 2:
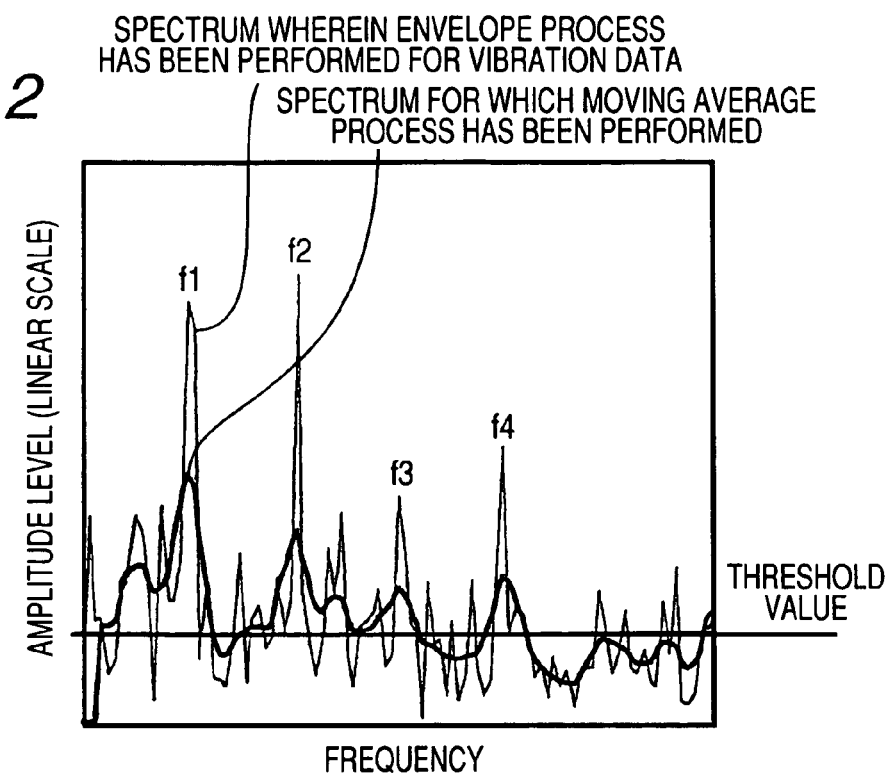
FIG. 2 is a diagram showing an example frequency spectrum and example moving average processing results.

An example frequency spectrum is shown in FIG. 2. In this example, a spectrum obtained after the envelope process has been performed for vibration data due to the presence of a scratch, and a spectrum after the moving average process has been performed are shown. The moving average is obtained for seven points indicated by the following formula.

[Equation 4]

$$\tilde{x}_i = \sum_{j=-3}^{3} (x_{i+j} w_j)$$

$$w_0 = 4, \ w_1 = w_{-1} = 3, \ w_2 = w_{-2} = 2, \ w_3 = w_{-3} = 1$$

A weight coefficient w is not limited to the above described values; however, it is preferable that a condition wherein the weight coefficient is symmetrical to j=0, and becomes greatest at j=0, be established. In the example in FIG. 2, since the S/N ratio is comparatively satisfactory, a fundamental wave component f1 and higher harmonic components f2, f3 and f4, due to a scratch in the outer ring of a bearing, seem noticeable before and after the moving average process. However, after the moving average process has been performed, it is found that false peaks caused by noise are extremely few.

The moving average processor 105a performs the smoothing and differential process for the spectrum obtained by the moving average process shown in FIG. 2, and the smooth differential peak extraction unit 105b detects, as peaks, frequency points at which the sign of the differential coefficient is changed from positive to negative. Then, the first selector 105c extracts peaks indicating values equal to or greater than the threshold value, and the second selector 105d sorts the extracted peaks and extracts the upper five peaks to obtain peak frequencies f1, f2, f3 and f4. At this time, the smooth differential coefficient yi is represented by the following formula when a discrete frequency spectrum is denoted by xi.

[Equation 5]
$$y_i = \sum_{j=1}^{4} (x_{i+j} - x_{i-j})j$$

Unlike the normal numerical differentiation, in this equation, great weighting is performed for a difference between points located at a distance in order to provide smoothing effects. Thus, differentiation is enabled only by integer calculation, and division is not required. Therefore, even a floating-point processing unit (FPU) or a micro computer that does not include a division command can perform the calculation without any problem.

Data for the peaks of the frequency spectrum (envelope frequency distribution) obtained by the second selector 105d in the above described manner is transmitted to the diagnosis processor 106.

The diagnosis processor 106 compares, with a frequency that indicates the abnormality of the diagnosis target, a peak, from among those in the input frequency spectrum, that corresponds to the main (fundamental wave) vibration component, or that corresponds to the main component and a higher order component of vibration, and obtains the degree of coincidence. Then, the diagnosis processor 106 provides points for the obtained coincidence degree and accumulates these points, so that a reliable diagnosis is performed. For example, three components, i.e., the main (fundamental wave), the secondary and the quartic components, are compared with a frequency indicating an abnormality. When the main (fundamental wave) component and the other components are detected, it is assumed that a scratch may have occurred, and the pertinent points in a predetermined point table are added. An example point table 1 is shown below. In the example shown in FIG. 2, the three components, i.e., the main (the fundamental), the secondary and the quartic components, are detected, and four points are added.

TABLE 1

| Detected components | Points |
|---|---|
| Fundamental wave, secondary and quartic components | 4 |
| Fundamental wave and secondary components | 2 |
| Fundamental wave and quartic components | 1 |

Figure 3:
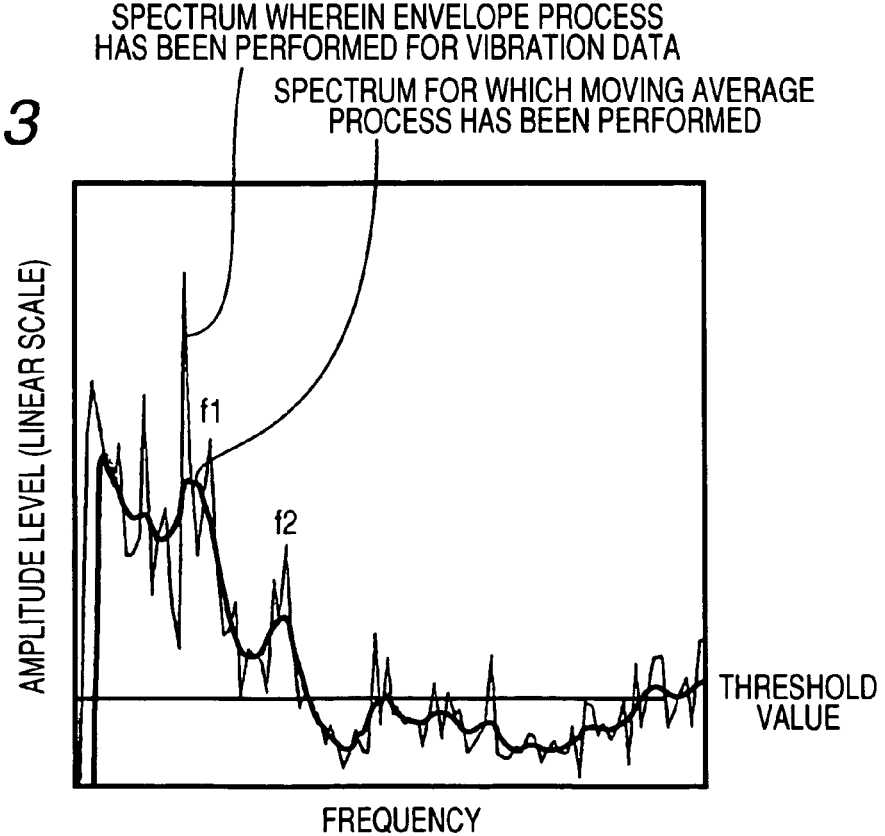
FIG. 3 is a diagram showing an example frequency spectrum and example moving average processing results.

According to an example frequency spectrum waveform shown in FIG. 3, the peaks of the frequency due to the scratch in the outer ring of the bearing are extracted, while noise caused by an external shock is received. In the same manner as in FIG. 2, the smooth differential process and the peak detection are performed, peaks indicating values equal to or greater than the threshold value are sorted, and the upper five values are extracted as peaks. As a result, the main (fundamental wave) component and the secondary component are detected. In this case, the points to be added are two.

Figure 4:
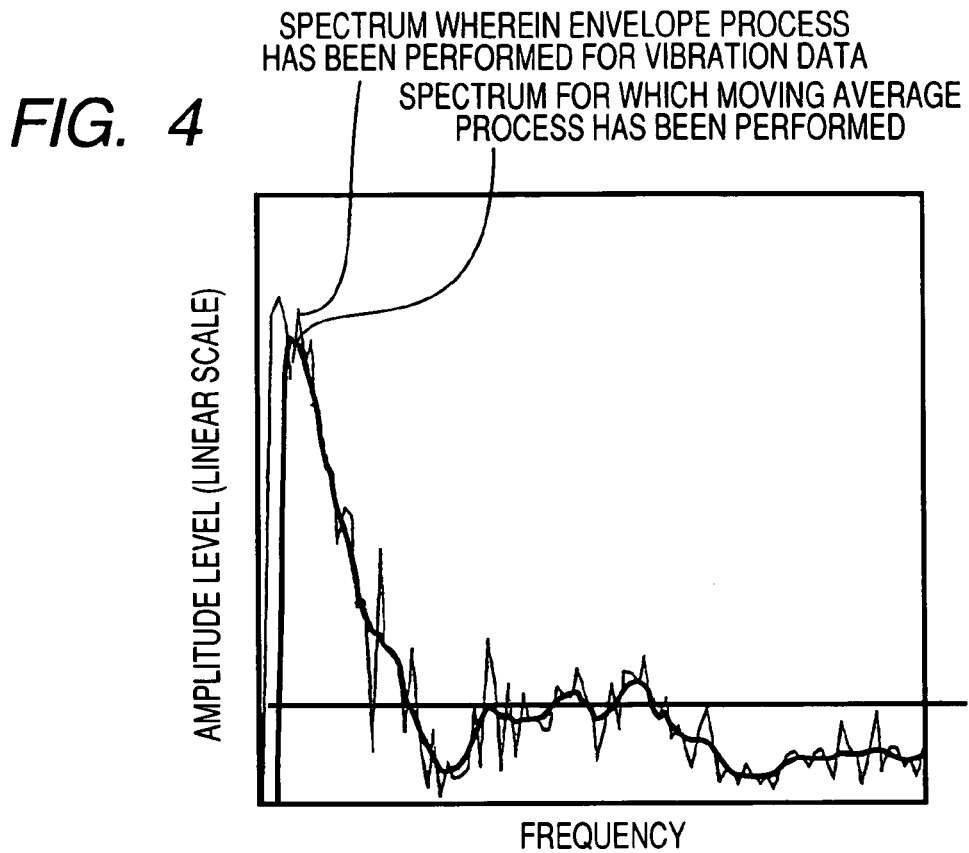
FIG. 4 is a diagram showing an example frequency spectrum and example moving average processing results.

According to an example frequency spectrum shown in FIG. 4, peaks are not detected because too great a noise is received due to an external shock. In this case, the points to be added are 0.

Figure 5:
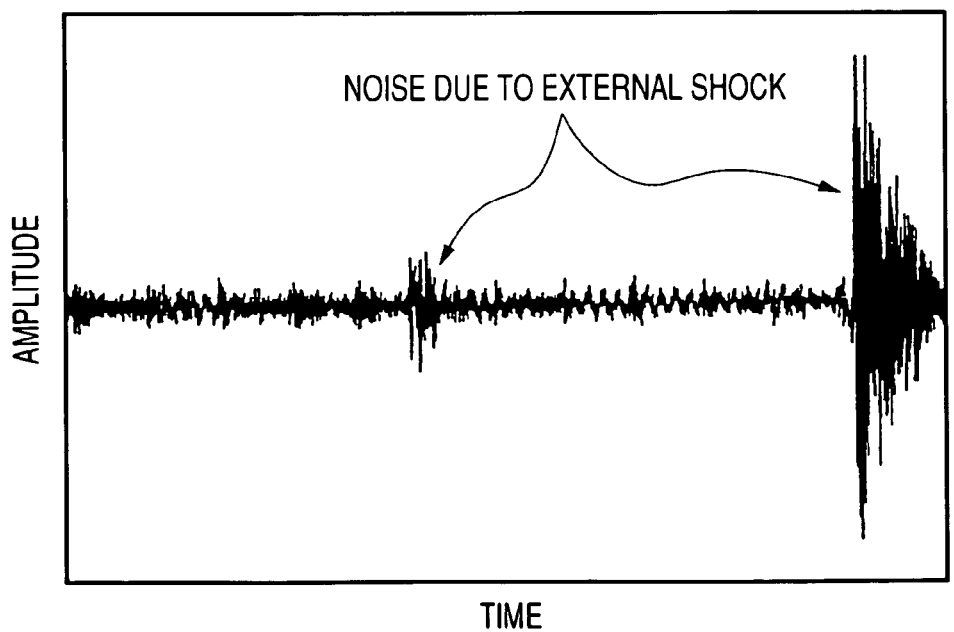
FIG. 5 is an example vibration waveform when shock noise has entered.

An example in FIG. 5 shows a vibration waveform when impulsive noise has entered. When the frequency analysis is performed for the envelope of the vibration waveform in which such a sudden impulsive noise having a large amplitude has entered, a low frequency side near the DC (direct current) component is high, and the peak of a vibration caused by a small scratch is hidden, as shown in the example in FIG. 4. In this case, the process for detecting a signal component due to the scratch is not to be performed forcibly.

Figure 6:
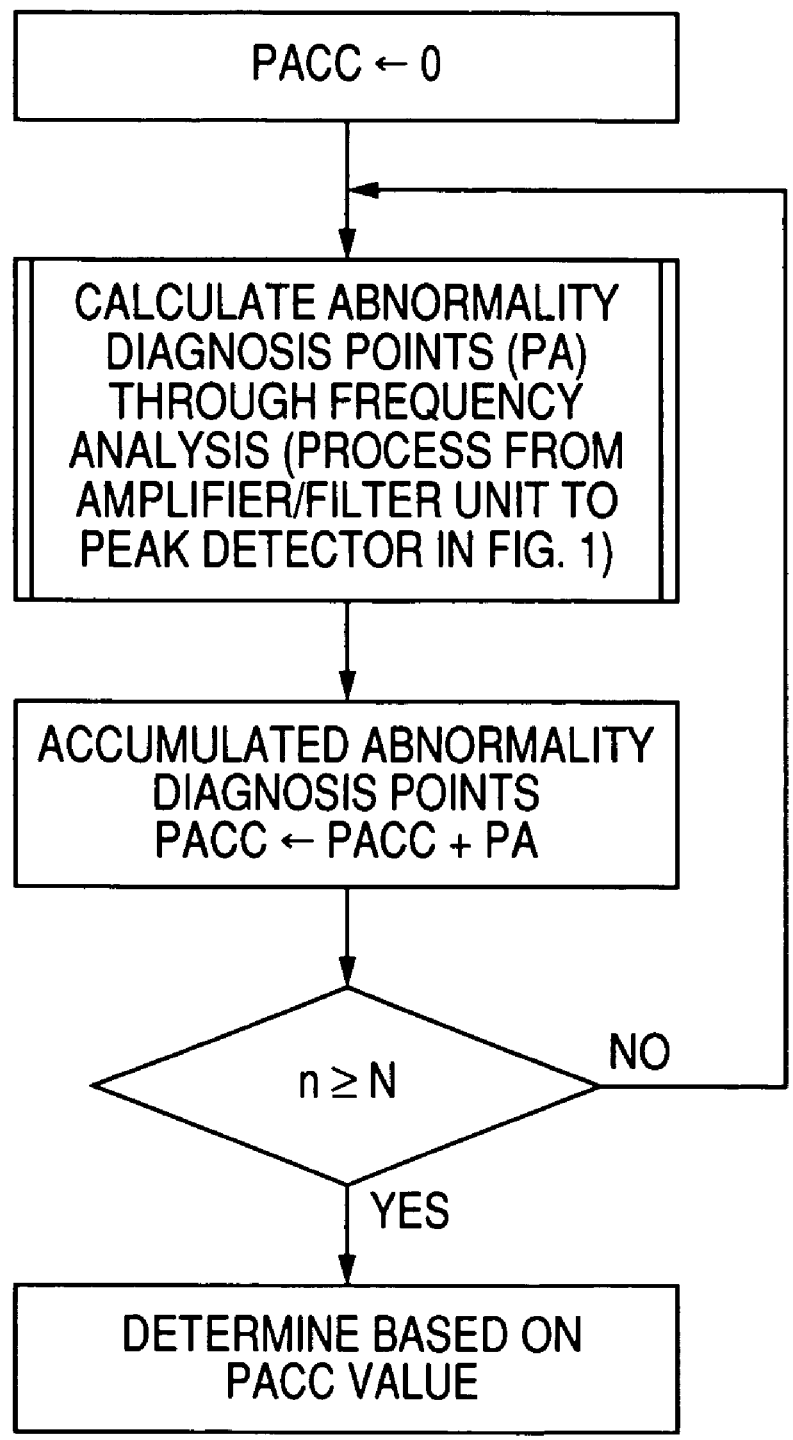
FIG. 6 is a flowchart showing an example abnormality diagnostic operation for the abnormality diagnosing system shown in FIG. 1.

As shown in FIG. 6, this abnormality diagnosing system repeats, predetermined times N (e.g., 30 times), the process sequence from the above described detection of a vibration signal to the determination of the number of abnormal points, and accumulates the number of points and performs an abnormality diagnosis in accordance with the accumulated points. In FIG. 6, n denotes the current number of times, PA denotes a diagnosis point for one spectrum measurement, and PACC denotes an accumulated PA value. About one second is required for sampling, at one time, the individual frequency spectrum shown in FIGS. 2, 3 and 4, and for performing an abnormality diagnosis for them. Therefore, when about 40 to 60 seconds is permitted for obtaining the diagnosis results, it is possible for the diagnosis to be repeated about 40 to 60 times, and the above points are then accumulated and employed to perform the abnormality diagnosis. For an abnormality diagnosis based on only one sampling, the kind of spectrum that is to be obtained is unknown, as shown in FIGS. 2 to 4. However, when the frequency peak detection is repeated, diagnosis points are added each time, and the accumulated point value can be evaluated, the affect of the variance in the spectrum can be reduced, and the abnormality diagnosis can be accurately performed.

Figure 7:
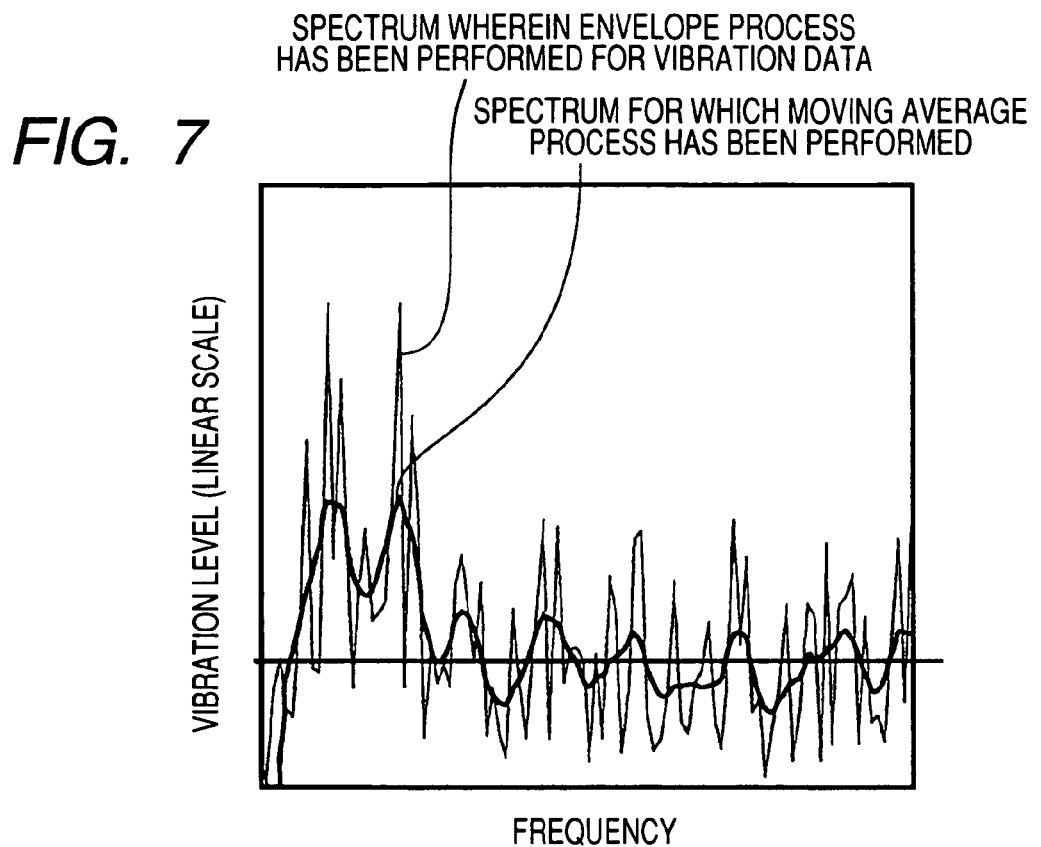
FIG. 7 is a diagram showing an example frequency spectrum and example moving average processing results.

A diagnosis spectrum, for a normal bearing having no scratch, is shown in FIG. 7, and the actual results indicate that frequency components for a vibration due to a scratch were not detected through peak detection. It appears that the frequency analysis results obtained by the moving average process have a specific characteristic; however, since through selection using the threshold value and sorting, the frequency analysis results are not related to a frequency component due to an abnormality of the bearing, the abnormality diagnosis points in Table 1 are not added.

Figure 8:
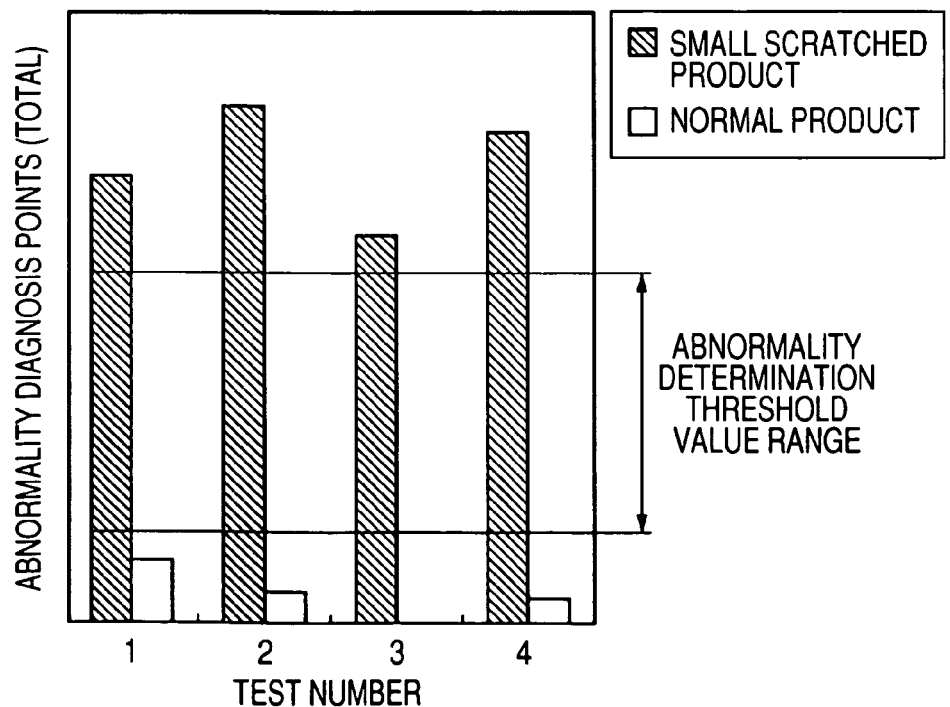
FIG. 8 is a diagram showing abnormality diagnosis results for a small scratched bearing and a normal bearing.

FIG. 8 is a column graph showing the accumulated values of diagnosis points obtained by repeating, 40 times, the abnormality diagnosis for a bearing having a small scratch and for a normal bearing. Since there is a great difference in the accumulated points between the product having the small scratch and the normal product, it is found that the abnormality diagnosis for the bearings can be precisely performed by accumulating the points forty times. Further, since a great difference from the normal product is produced, even though the scratch is small, the range of a threshold value is widely obtained as shown in FIG. 8. Therefore, it is also possible, by using this range as a gray zone, for an alarm to be generated step by step.

As described above, according to the abnormality diagnosing system of this embodiment, sounds or vibrations generated by mechanical equipment are detected; the envelope of a detected signal is obtained and converted into a frequency spectrum and the moving average is calculated for the obtained frequency spectrum; a smoothing and differentiation process is performed for the frequency spectrum to extract, as peaks, the frequency points at which the sign of the differential coefficient is changed from positive to negative; the peaks equal to or greater than a threshold value are extracted and are sorted, and a predetermined number of upper peaks are extracted; the degree of coincidence is calculated between the peak, from among the extracted peaks, that corresponds to the main (fundamental wave) component of a vibration, or that corresponds to the main (fundamental wave) component and the higher order component of a vibration, and a frequency that indicates an abnormality of a diagnosis target; points are provided for the degree of coincidence and the points are accumulated a plurality of times; and an accumulated point value is evaluated to diagnose the abnormality. Therefore, under a condition where the S/N ratio of an abnormality signal, or an abnormality prediction signal, to a noise signal is small, the noise signal will not be erroneously detected as an abnormality signal or an abnormality prediction signal, and the abnormality diagnosis can be extremely accurately and efficiently performed.

It should be noted that the present invention is not limited to the above described embodiment. For example, as denoted by a broken line block in FIG. 1, it is preferable that a digital filter (LPF/HPF) 108 be arranged between the A/D converter ADC 102 and the envelope processor 103 to remove a noise component in a high band and a DC offset. Further, a decimation processor 109 may be located in front of the FFT unit 104 to perform a decimation process in consonance with a required frequency. When the signal decimation process is performed after the envelope process, and the number of points for the FFT operation is reduced to analyze the envelope waveform, both the frequency resolution of the detected signal and the efficiency of the FFT operation can be increased. Thus, the abnormality diagnosis of the bearing can be accurately and efficiently performed.

Second Embodiment

Figure 9:
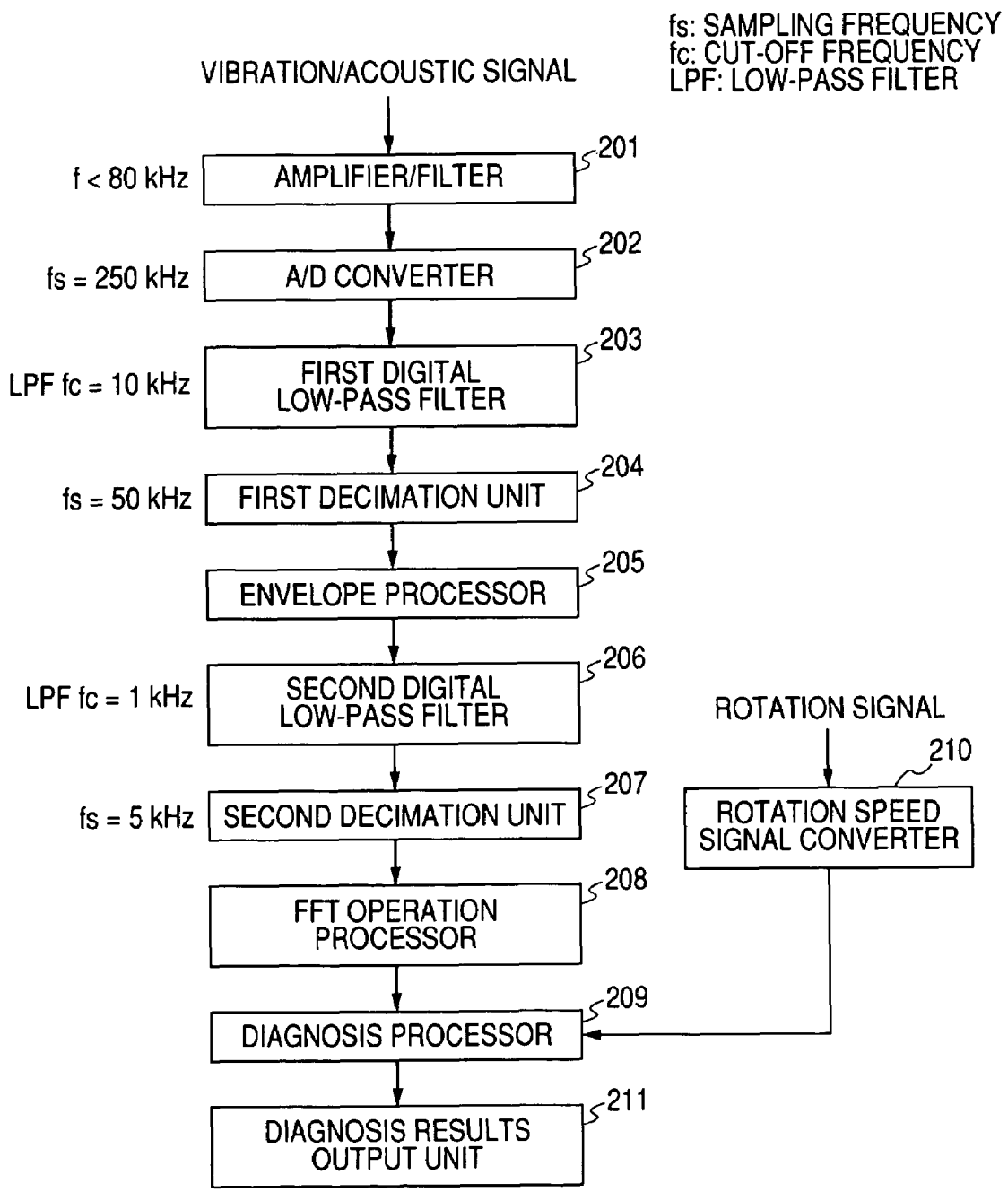
FIG. 9 is a block diagram showing an abnormality diagnosing system according to a second embodiment of the present invention.
Figure 10:
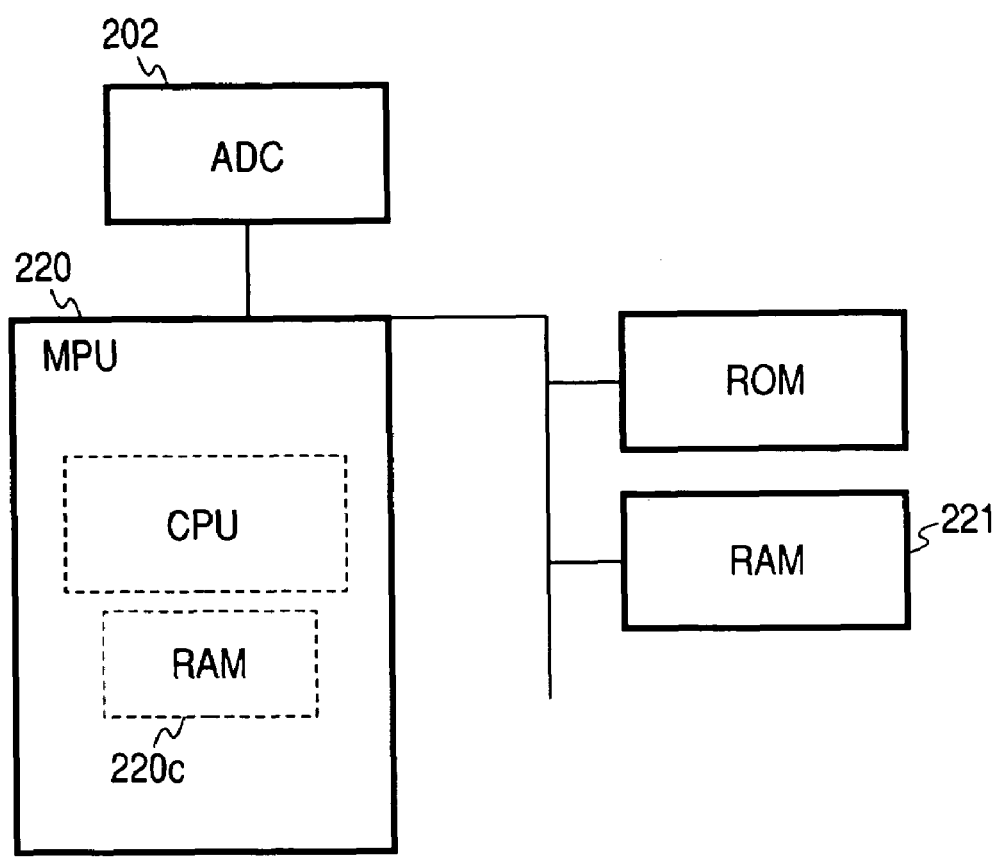
FIG. 10 is a block diagram showing an example arrangement for a micro computer and its peripheral circuit that constitute the abnormality diagnosing system according to the present invention.

FIG. 9 is a block diagram showing an abnormality diagnosing system according to a second embodiment of the present invention. FIG. 10 is a block diagram showing a micro computer (MPU) and its peripheral circuit that are specific components of the abnormality diagnosing system of this embodiment of the invention.

As shown in FIG. 9, the abnormality diagnosing system of the invention includes: an amplifier/filter (filter processor) 201, an A/D converter 202, a first digital low-pass filter 203, a first decimation processor 204, an envelope processor 205, a second digital low pass filter 206, a second decimation processor 207, a FFT operation processor 208, a diagnosis processor 209, a rotation speed signal converter 210 and a diagnosis results output unit 211.

The amplifier/filter 201 receives a signal detected by a sensor (a vibration sensor, an acoustic sensor, etc.) that detects sounds or vibrations, generated by mechanical equipment, to be diagnosed. The amplifier/filter 201 amplifies the input signal with a predetermined gain, and blocks a signal having a predetermined frequency (80 kHz in this case) or higher.

The A/D converter 202 samples an analog signal that passes through the amplifier/filter 201 at a predetermined sampling frequency (250 kHz in this case), and converts the analog signal into a digital signal. Points to be sampled are defined as about 200,000, and the data length is 16 bits. As shown in FIG. 10, this system employs a micro computer 220 as a signal processing circuit, and since an external RAM 221 is included, acquisition of a variable area this size is easy. The micro computer 220 does not include a floating-point unit (FPU).

Figure 11:
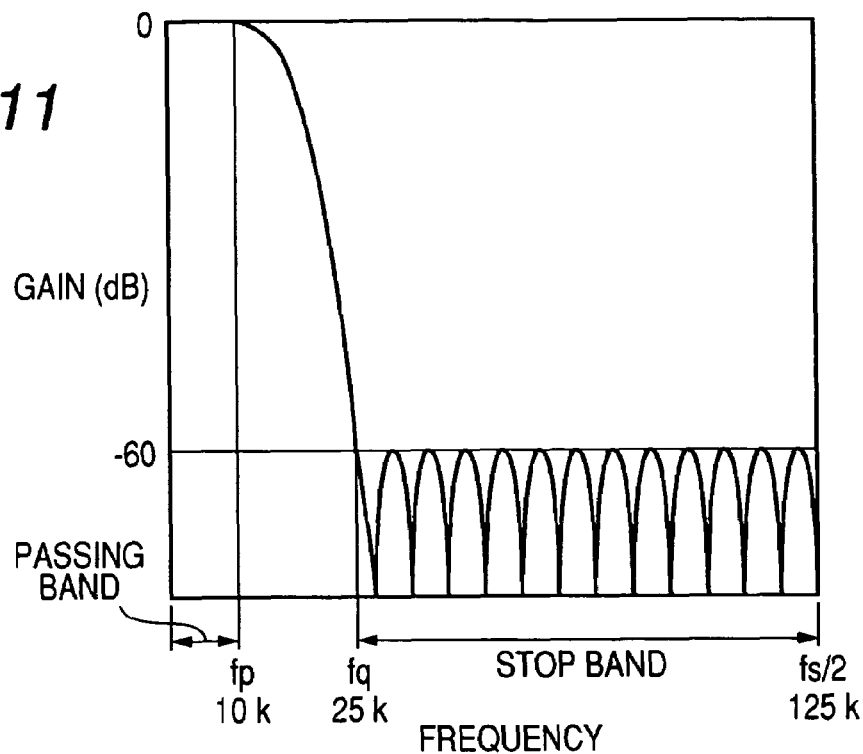
FIG. 11 is a diagram showing an example frequency-gain characteristic of a first digital low-pass filter in FIG. 9.

The first digital low-pass filter 203 passes only a signal equal to or lower than a predetermined frequency (10 kHz in this case) from among digital signals generated by the A/D converter 202, and is constituted by a 55-order FIR filter. In FIG. 11, the frequency property of the first digital low-pass filter 203 is shown. For this filter 203, attenuation does not occur at equal to or lower than 10 kHz (fp). The attenuation rate is increased from 10 kHz (fp) to 25 kHz (fq), and at 25 kHz or higher, reaches 60 dB. As for a waveform in the frequency band that reaches the stop band at 25 kHz (fq), a sampling frequency of at least 50 kHz is satisfactory.

The first decimation processor 204 performs the decimation process by sampling, at a predetermined sampling frequency (50 kHz in this case), a signal passed through the first digital low-pass filter 203. Since the sampling frequency used by the A/D converter 202 is 250 kHz, the number of sampling points (the number of data sets) is decimated to ⅕. Thus, data consisting of 200,000 points is reduced to data consisting of 40960 points. The envelope processor 205 obtains an envelope signal for a signal obtained by the first decimation processor 204.

Figure 12:
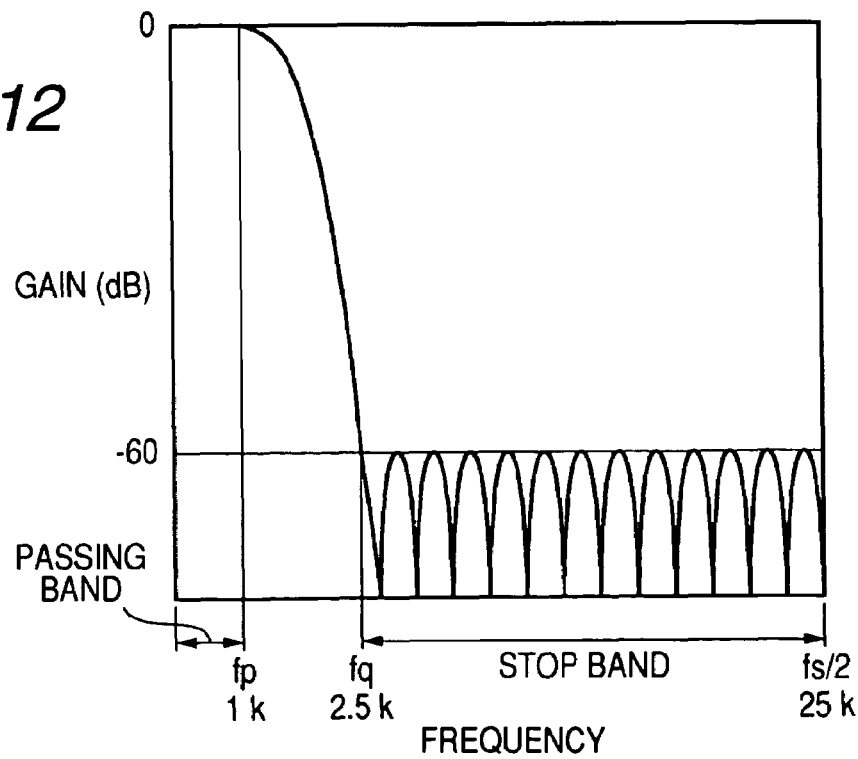
FIG. 12 is a diagram showing an example frequency-gain characteristic of a second digital low-pass filter in FIG. 9.

The second digital low-pass filter 206 is a filter that passes only a signal having a predetermined frequency (1 kHz in this case) or lower of envelope signals obtained by the envelope processor 205, and is constituted by 110-order FIR filter. In FIG. 12, the characteristic waveform of the second digital low-pass filter 206 is shown. This filter 206 performs the filtering process in consonance with a characteristic frequency that indicates an abnormality in a bearing. Attenuation does not appear at 1 kHz (fp) or lower, and the attenuation rate is increased from 1 kHz to 2.5 kHz, and reaches 60 dB at 2.5 kHz (fq) or higher.

The second decimation processor 207 performs the decimation process by sampling, at a predetermined sampling frequency (5 kHz in this case), a signal that is passed through the second digital low-pass filter 206. Since the sampling frequency (fs) used by the first decimation processor 204 is 50 kHz, the number of sampling points is decimated to ¹⁄₁₀. As for the waveform of a frequency that reaches the stop band at 2.5 kHz, a sampling frequency of at least 5 kHz is satisfactory. During the decimation process, data consisting of 40960 points is reduced to data consisting of 4096 points.

The FFT operation processor 208 performs a frequency analysis for the envelope signal obtained by the second decimation processor 207 through decimation. In this example, by using data of 4096 points, the frequency analysis is performed for the envelope of a detected signal. Thus, at a resolution of 5000/4096=1.22 Hz, the frequency analysis is performed.

The diagnosis processor 209 compares the fundamental frequency component and the high frequency components (harmonics components) of a frequency, for peaks obtained by the FFT operation processor 208 through the frequency analysis, that are due to the rolling bearing, with a frequency that is obtained based on determination reference data (rotation speed) provided by the rotation speed signal converter 210 and the specifications for a bearing and that indicates an abnormality of the bearing. Then, based on the comparison results, the diagnosis processor 209 diagnoses an abnormality of the rolling bearing.

The rotation speed signal converter 210 generates determination reference data in accordance with a rotation signal received from a rotation sensor (not shown) provided for a rolling bearing, and transmits the determination reference data to the diagnosis processor 209.

The diagnosis results output unit 211 outputs the diagnosis results obtained by the diagnosis processor 209.

Figure 13A:
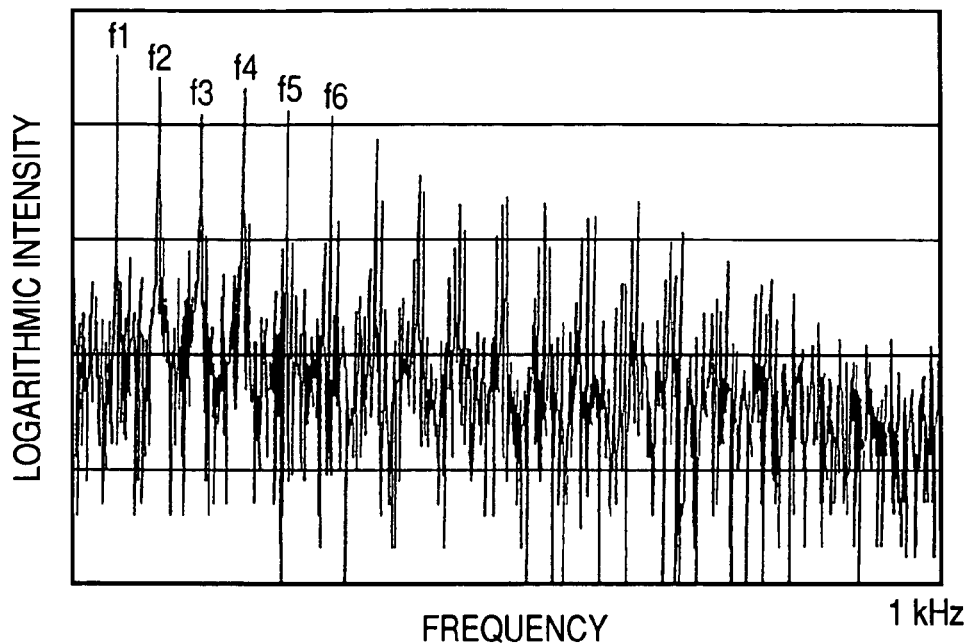
FIG. 13(a) is a diagram showing a FFT spectrum when a decimation process is performed, and (b) is a diagram showing a FFT spectrum when a decimation process is omitted.

In FIG. 13(a), a spectrum is shown for an envelope that is obtained by the FFT operation processor 208 by the operation. This is obtained by capturing the component of an outer ring scratch on a rolling bearing, and the fundamental frequency component (f1) and the high frequency components (f2 to f6, etc.) are clearly shown. In this case, the diagnosis processor 209 calculates a frequency indicating the bearing abnormality that is obtained based on the rotation speed, which is obtained from the rotation speed signal converter 210, and the specifications for the bearing, and compares the fundamental frequency in FIG. 13(a) with the higher harmonic components up to the sixth-order component. As a result, since they match the frequency components that are caused by an outer ring defect, the diagnosis results indicating that an abnormality is present in the outer ring are output.

Figure 13B:
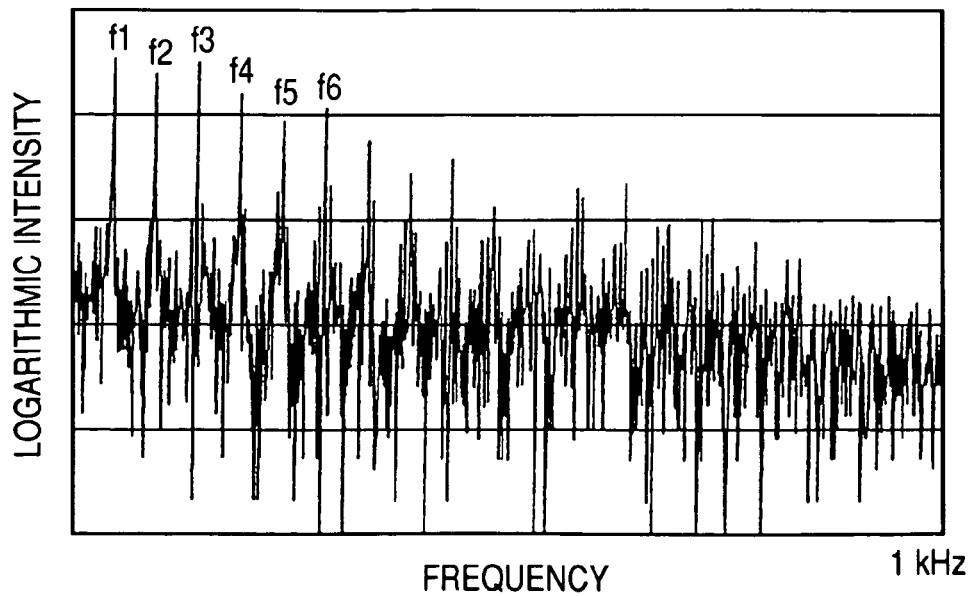

As a comparison example, shown in FIG. 13(b) is a spectrum waveform that is obtained in such a manner that the envelope process is performed for a waveform obtained under the same condition as the above example, i.e., wherein the sampling frequency fs is 25 kHz and the cutoff frequency fc is 10 kHz, and the FFT operation is thereafter performed. Since the number of points for the FFT operation is 16384, the frequency resolution in this comparison example is 25000/16384=1.526 Hz. According to the embodiment of this invention (FIG. 13(a)), relative to the comparison example (FIG. 13(b)), the number of points for the FFT operation is reduced from 16384 to 4096, which is ¼, and the resolution is improved from about 1.53 Hz to 1.22 Hz. These effects are provided because the decimation process is performed before and after the envelope process.

Figure 14:
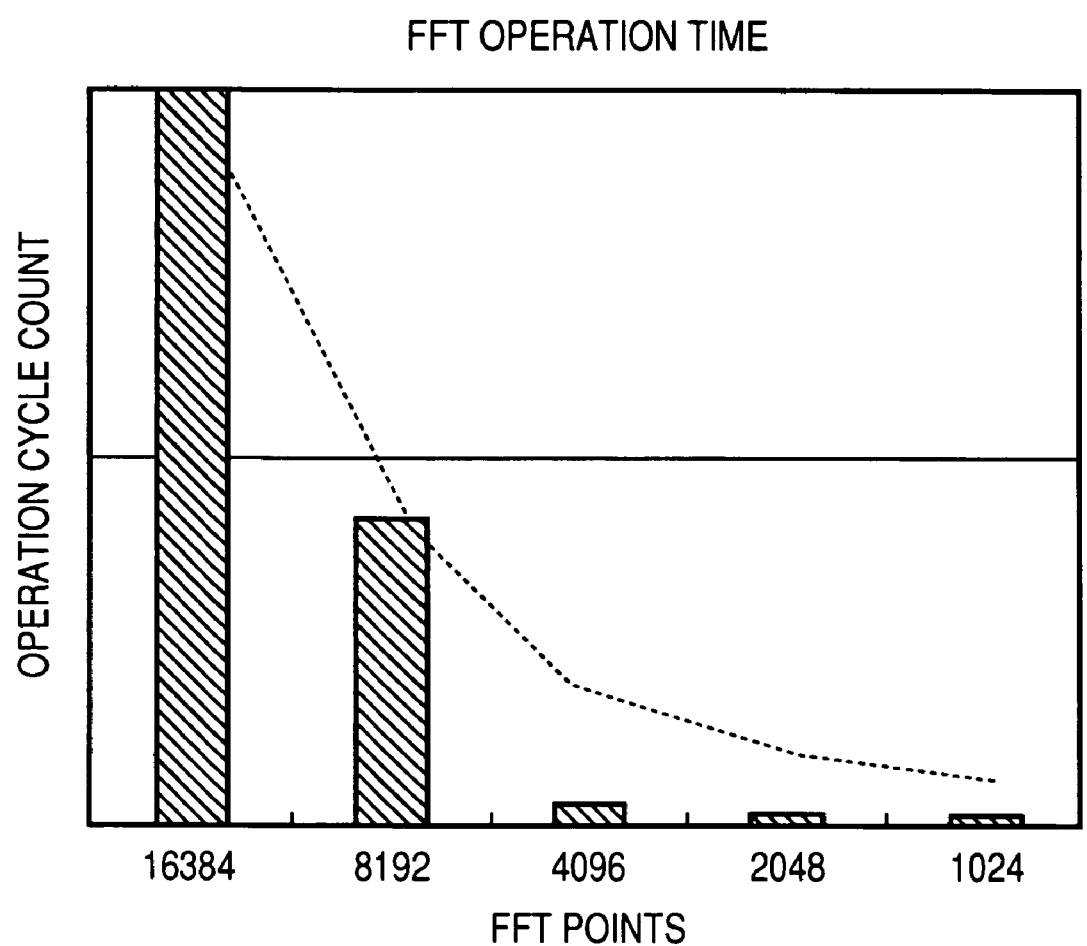
FIG. 14 is a graph showing the effects of a reduction in the time required for the FFT operation obtained by reducing the number of points for the FFT operation.

In FIG. 14 are shown the effects of the reduction of the FFT operation time that are provided by reducing the number of points for the FFT operation. According to this embodiment, as shown in FIG. 10, the micro computer 220 that includes a fast RAM 220c is employed as hardware to perform the FFT operation. FFT data up to 4096 points can be stored in the fast RAM 220 of the micro computer 220. As a result, the calculation can overwhelmingly more rapidly be performed than when FFT data for 8192 points or more are stored. For a system that does not include such a fast RAM 220c, the effects provided by the reduction in the number of operation cycles (FFT operation time), indicated by a broken line in FIG. 14, can still be obtained. Since the FFT should perform the calculation using a power of two as the number of points, in this case, the sampling and the decimation are performed so as to finally obtain 4096 points, in this case. However, if there is a shortage in the 4096 points, data equivalent to the shortage need only be omitted, or data values of 0 need only be added before or after the pertinent data.

Figure 15:
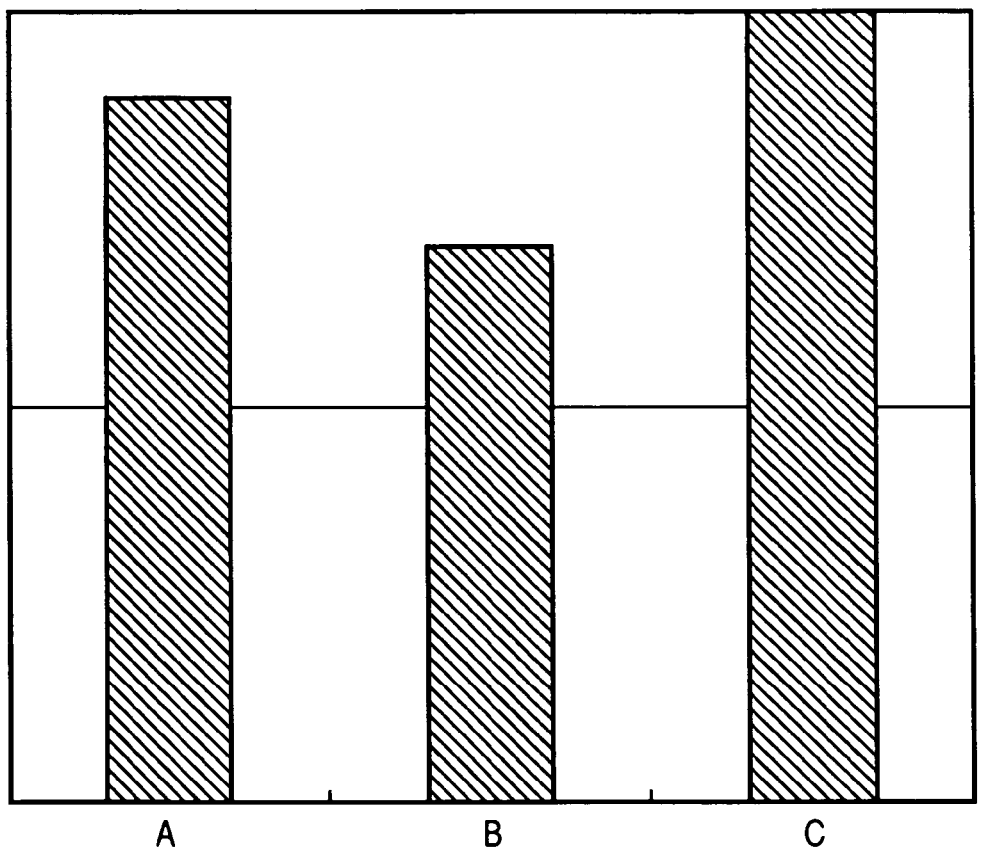
FIG. 15 is a graph showing, as a comparison using an S/N ratio, a plurality of results obtained by performing diagnoses under different conditions.

FIG. 15 is a graph showing an absolute comparison of the S/N ratio for the outer ring diagnosis of the rolling bearing. The S/N ratio is employed to represent the ratio of the fundamental wave and high harmonic components up to the sixth order to components up to 1 kHz, except for these components. A in FIG. 15 corresponds to the comparison example, and C corresponds to the embodiment. B is an S/N ratio for when the second digital low-pass filter 206 is omitted. When A and C are compared, there is no big difference in the S/N ratios of the two, and still the S/N ratio for C is a little superior. Although the number of points for the FFT operation for C is smaller than that for A, the S/N ratio is improved because of the effect obtained a band limitation provided by the second digital low-pass filter 206.

As described above, according to the abnormality diagnosing system of this embodiment, the signal decimation process is performed before and after the envelope process in order to reduce the number of points for the FFT operation for the analysis of the envelope waveform of a signal detected by the sensor. Therefore, both the frequency resolution of the signal and the efficiency of the FFT operation can be increased, and the abnormality diagnosis for the bearing can be accurately and efficiently performed.

Furthermore, for the abnormality diagnosing system, since a high sampling rate is designated for the A/D conversion of a signal detected by the sensor before the frequency band limitation and the decimation process are performed. Thus, the anti-aliasing filter can be omitted. That is, since the first digital low-pass filter 203 cuts a signal at ½ (Nyquist frequency fs/2) of a sampling frequency fs (250 kHz) or higher used by the A/D converter 202, generally, the anti-aliasing filter must be inserted. However, in this case, while the frequency band of the amplifier/filter 201 is lower than 80 kHz, the sampling frequency of the A/D converter 202 is 250 kHz, so that the sampling theorem is satisfied and the anti-aliasing filter is not necessary. Therefore, the cost of the abnormality diagnosing system can be reduced.

Third Embodiment

Figure 16:
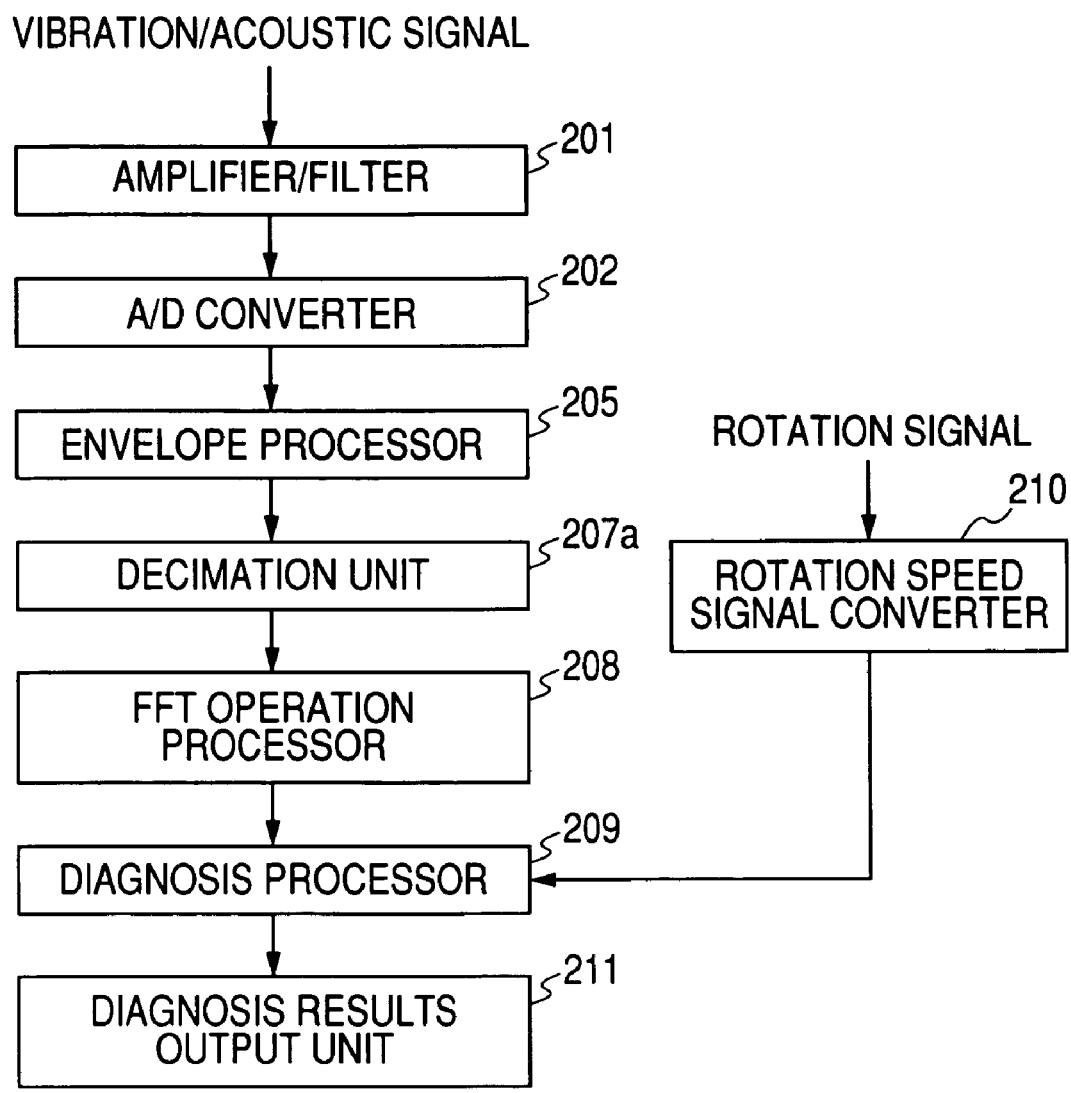
FIG. 16 is a block diagram showing an abnormality diagnosing system according to a third embodiment of the present invention.

FIG. 16 is a block diagram showing an abnormality diagnosing system according to a third embodiment of the invention. According to the third embodiment, the digital low-pass filters 203 and 206 arranged before and after the envelope processor 205 in the second embodiment and the decimation processor 204 located before the envelope processor 205 are not provided. This configuration can be applied for a case wherein, while the S/N ratio is deteriorated a little, the frequency resolution for the envelope waveform analysis can be increased during the FFT operation that employs a small number of points.

The decimation process for which a digital low-pass filter is not employed is affected by aliasing, but this functions as a low-pass filter process. Further, since the envelope process also serves as a low-pass filter process, in the long run, it is assumed that there are many cases in which the digital low-pass filter 206 can be omitted before the decimation processor 207. In a case wherein, because of the frequency property of an amplifier located at the preceding stage or on a transmission path it is understood that aliasing will not occur, no problem is encountered when the decimation process is performed without a digital low-pass filter.

It should be noted that the efficiency feature of the operation of the digital filter differs slightly from that of the FFT operation. For since a collective operation is performed for the FFT, the speed increases as the number of data sets is reduced. On the other hand, since basically, processing is performed sequentially for the digital filter, the number of degrees to be allocated for the filter is a problem. However, in this embodiment only 100 to 200 filter order, it is estimated, are needed for the second digital low-pass filter 206 employed after the envelope process 205. Filter order of about this many do not cause any problem for the process performed in the fast memory 210a of a common micro computer 210.

Further, in the second and third embodiments, since the micro computer 220 does not include an FPU (floating-point processing unit), an appropriate FIR filter for fixed-point calculation has been employed. For a system that employs an FPU, an IIR filter can be employed as a digital low-pass filter, so that the filter order can be reduced without likewise reducing the calculation accuracy.

Fourth Embodiment

Figure 17:
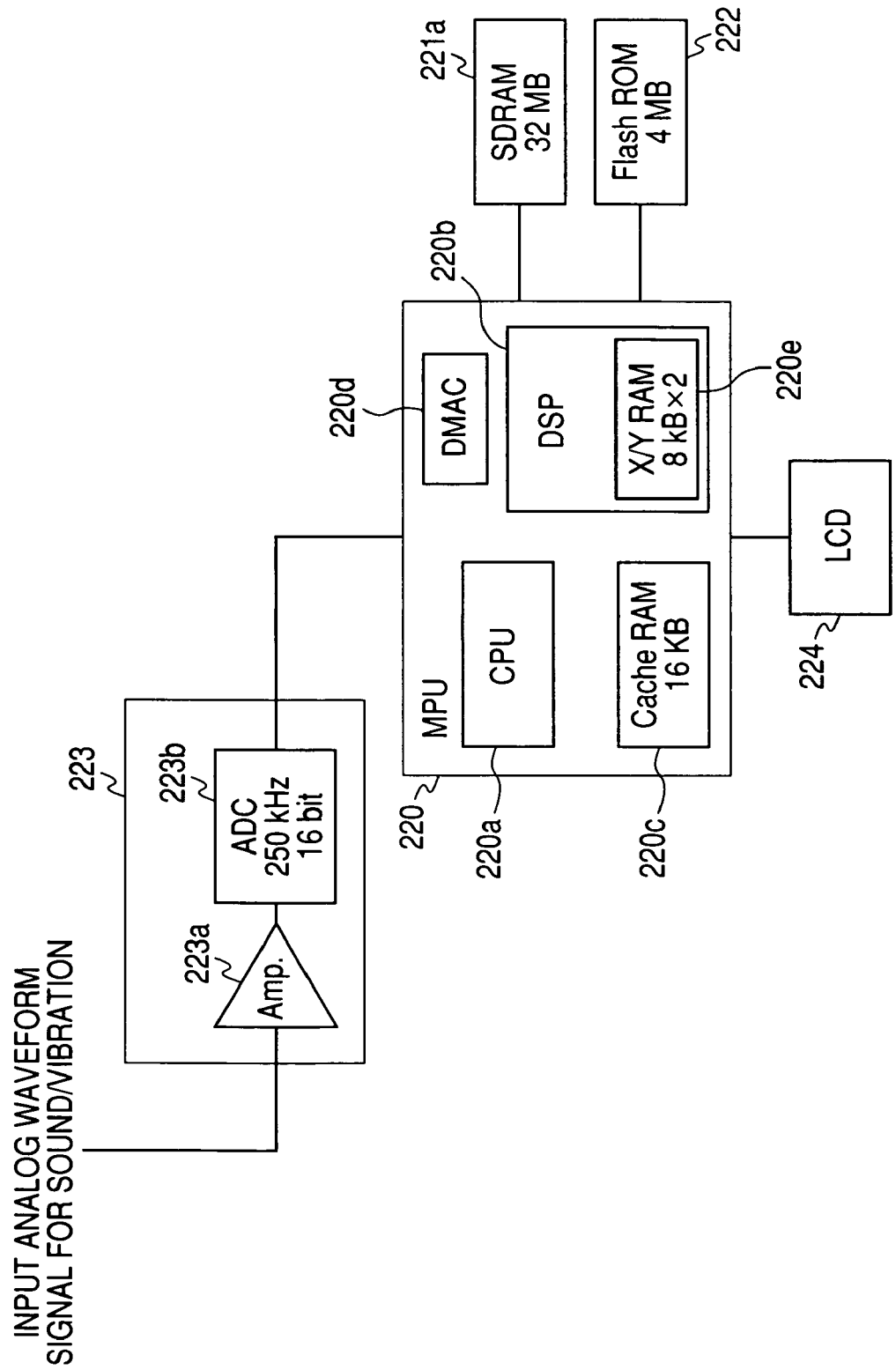
FIG. 17 is a block diagram showing an abnormality diagnosing system according to a fourth embodiment of the present invention.
Figure 18:
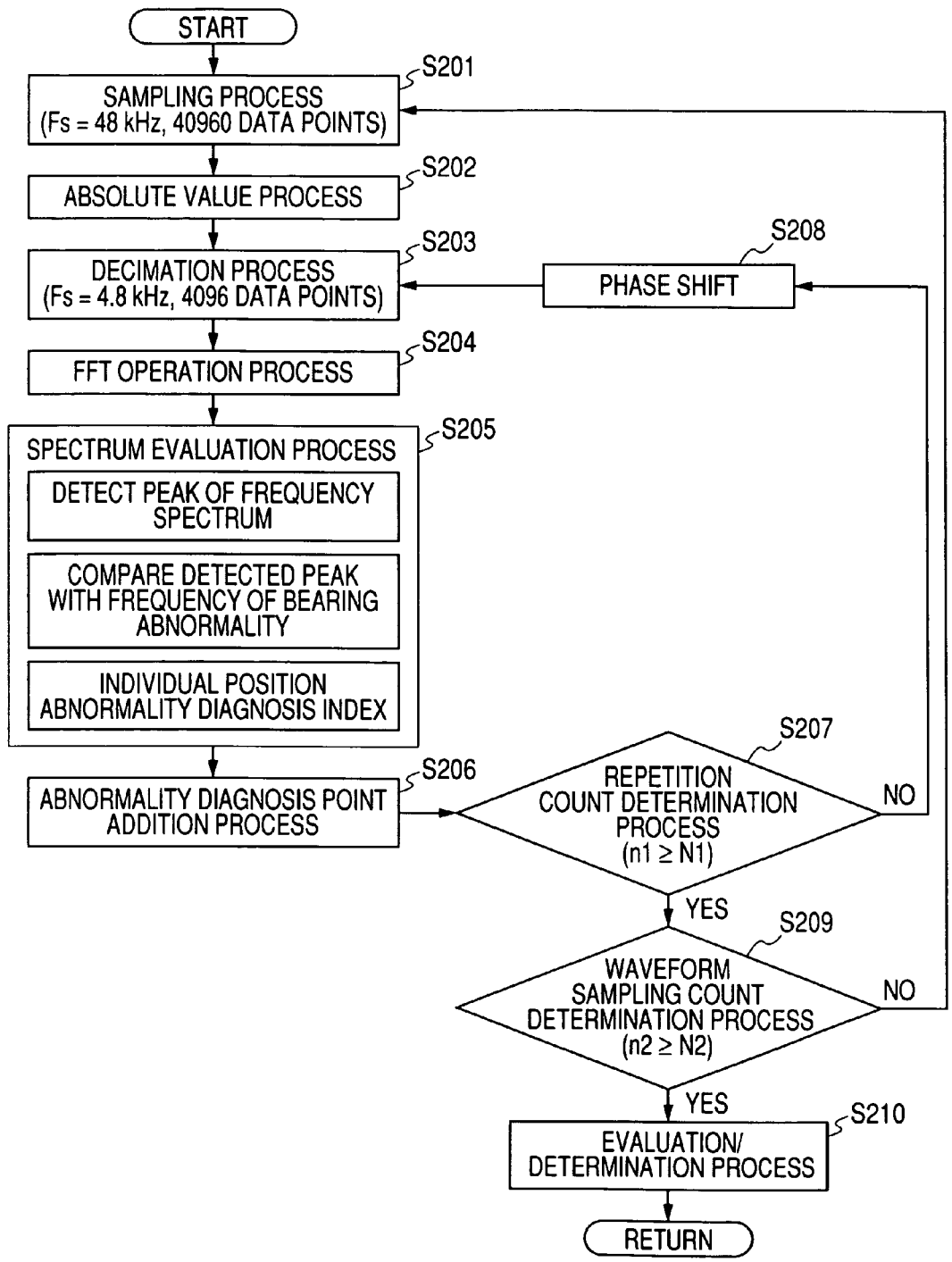
FIG. 18 is a flowchart showing the processing sequence performed by the abnormality diagnosing system according to the fourth embodiment.

FIG. 17 is a block diagram (hardware configuration diagram) showing an abnormality diagnosing system according to a fourth embodiment of the present invention. FIG. 18 is a flowchart showing the processing sequence performed by the abnormality diagnosing system of the fourth embodiment. A synchronous DRAM (SDRAM) 221a, a flash memory 222, an amplifier/filter (filter processor) 223 and a liquid crystal display unit (LCD) 224 are connected to a micro computer 220.

The micro computer 220 includes a CPU 220a, a DSP 220b and a cache RAM 220c.

The DSP 220b incorporates an X/Y-RAM 220e, formed of an X-RAM and a Y-RAM connected by exclusive buses, so that, in accordance with a special instruction, multiplication and accumulation can be performed during a single cycle. The capacities of the X-RAM and the Y-RAM are eight kbytes each. The DSP 220b can access three buses, including a instruction bus, at the same time, and can execute a plurality of instructions at the same time. The X/Y-RAM is also called a dual port RAM, a dual access RAM or a multi-port RAM, etc.

The synchronous DRAM 221a, the flash memory 222 and the amplifier/filter 223 are connected to the external bus of the CPU 220a. The synchronous DRAM 221a is a 32 MB (mega byte) memory that serves as a main memory. The flash memory 222 is a 4 MB memory that serves as a program storage area. A program that performs a processing sequence shown in FIG. 18 is stored in the flash memory 222. The amplifier/filter 223 includes an amplifier 223a, which amplifies a signal received from a sensor; and an A/D converter 223b having a resolution of 16 bits, which samples, at a predetermined sampling frequency (250 kHz in this case), a signal obtained by the amplifier 223a, and converts the resultant signal into a digital signal.

Since the operating speed of the synchronous DRAM 221a and the flash memory 222 is lower than that of the CPU 220a, a cache memory is indispensable to the effective utilization of the rapid operation capability of the CPU 220a. Therefore, the cache RAM 220c, of a data/instruction coexisting type, is incorporated in the micro computer 220.

The DMAC 220d performs a DMA operation to transmit, without using the CPU 220a, data obtained by the A/D converter 223a to the synchronous DRAM 221a. The liquid crystal display unit 224 is an output device for displaying diagnosis information.

Of the digital processing included in the processing sequence in FIG. 18, the FFT operation process (S204) handles the largest amount of data. In order to permit the DSP 220b to perform the FFT operation process (S204), data used for the FFT operation process (S204) must be stored in the X/Y-RAM 220e.

For the detection of a scratch through an analysis of the vibrations of a bearing, the vibrations must be detected in a frequency band of about 10 kHz, and the passing frequency for the rolling elements of the bearing, in order to capture a scratch, is generally equal to or lower than 1 kHz. In this example, it should be noted that the frequency at which the rolling elements of the bearing to be diagnosed pass is a low frequency equal to or lower than 100 Hz.

When the rolling elements passing frequency is low, as described above, the waveform sampling must be performed for a comparatively extended period of time to exactly diagnose an abnormality of the bearing.

Therefore, in the sampling process (S201) in FIG. 18, a signal received from the amplifier/filter 223 is sampled at a sampling frequency of 48 kHz to perform sampling for waveform data consisting of 40000 points or more. In this case, a sampling time Tw of 800 ms or longer can be obtained. The frequency resolution Δf for the FFT operation process (S204) is determined based on the sampling time Tw. That is, the frequency resolution Δf is a reciprocal (1/Tw) of the sampling time Tw.

The absolute value process (S202) is the same process as the envelope process, and during the digital processing, the operation can be considerably more simplified than a method that uses the Hilbert transform, etc. During this process, the average value is calculated to remove a DC component from the envelope or the absolute value waveform of the signal sampled during the sampling process (S201), and the line for amplitude 0 is re-drawn.

During the decimation process (S203), the envelope or the absolute value waveform signal obtained by the absolute value process (S202) is sampled at a predetermined sampling rate (4.8 kHz in this case) to perform decimation. During the FFT operation process (S204), a frequency analysis is performed for the signal obtained during the decimation process (S203).

During the FFT operation process (S204), data consists of a real part and an imaginary part, which are allocated to the X-RAM and the Y-RAM of the X/RAM 220e. When the method is used for supplying a memory area at the input and output, the FFT can be performed for a data length equivalent to 8 kB. Since the resolution of the A/D converter 223b is 16 bits (two bytes), 8192/2 bytes, i.e., data including 4096 points, can be processed by the DSP 220b. In other words, data exceeding 4096 points can not be handled by the DSP 220b. Therefore, in this example, for the decimation process (S203), data are thinned so that the data length equals 4096. And when decimation is performed the sampling frequency is fs=48 kHz to ¹/₁₀, fs=4.8 kHz, which is still a satisfactory sampling frequency for obtaining the frequency band of 1 kHz required for the detection of a bearing defect.

During the spectrum evaluation process (S205), peaks are detected for a frequency spectrum that is obtained using the FFT operation process (S204). Then, the peaks are compared with a bearing abnormality frequency, and in correlation with the comparison results, a position abnormality diagnosis index is examined for an evaluation to determine whether an abnormality has occurred.

During the abnormality diagnosis point addition process (S206), points evaluated as abnormalities during the spectrum evaluation process (S205) are counted. During the repetition count determination process (S207), a check is performed to determine whether the number of times (evaluation count n1) the spectrum evaluation process (S205) was performed has reached a predetermined count N1. When it is determined during the repetition count determination process (S207) that the evaluation count n1 has not reached the predetermined count N1 (No at S207), the phase shift process (S208) is performed. Through this process, the processing beginning with the decimation process (S203) is repeated, with the phase shifted.

When it is determined during the repetition count determination process (S207) that the evaluation count n1 has reached the predetermined count N1 (Yes at S207), the waveform sampling count determination process (S209) is performed. When the waveform sampling count n2 does not reach a predetermined count N2 (No at S209), the processing beginning with the sampling process (S201) is repeated. But when the waveform sampling count n2 has reached the predetermined count N2 (Yes at S209), program control advances to the evaluation/determination process (S210).

During the evaluation/determination process (S210), an evaluation/determination of an abnormality in the bearing is performed based on the abnormality evaluation points counted during the abnormality diagnosis point addition process (S206).

As described above, according to this embodiment, the following method is employed. Each time the spectrum evaluation process (S205) is performed, the decimation process (S203) is performed a plurality of times, with the phase shifted each time, and for one sampling waveform, the FFT operation process (S204) is performed a plurality of times to accumulate diagnosis points. This is done for the following reason. When data obtained simply by decimation is evaluated using one FFT, the effects provided by data sampling at the frequency of 48 kHz are small, and are the same as those when sampling is performed at 4.8 kHz at the beginning. Even when the rolling element passing period for the bearing is long, a shock wave that occurs while passing is attenuated in as short a period of time as a scratch is small. Thus, high rate sampling is originally effective, and in order to utilize high sampling, the phase shifting process and the FFT operation process are performed a plurality of times.

Figure 19A:
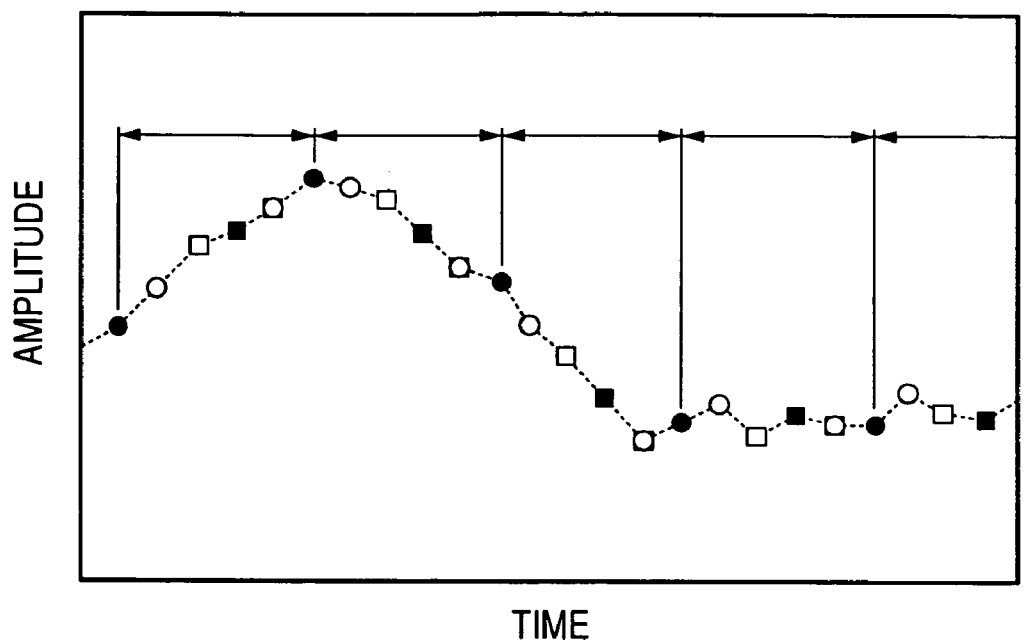
FIGS. 19(a) and (b) are explanatory diagrams showing the state in which the decimation process is performed for the envelope waveform for vibrations for which a phase has been shifted.
Figure 19B:
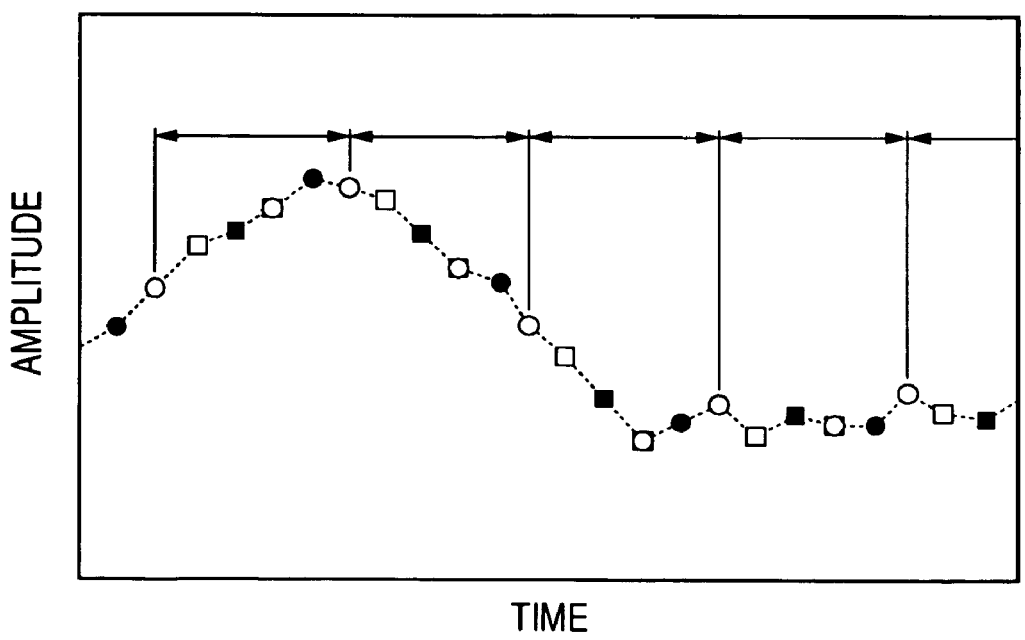

FIGS. 19(a) and (b), show where the decimation process is performed for the envelope waveform of the vibration, with the phase shifted. Shifting of the phase corresponds to the shifting of a sampling point a single point. In the example in FIG. 19, in the state (a), sampling is performed for only ● (black circles), while in the state in (b), the phase is shifted one point and re-sampling is performed only for O (white circles). According to the example in FIG. 19, since decimation to ⅕ is performed, a maximum of five re-sampling sets are obtained.

Therefore, when decimation to ¹⁄₁₀ is performed, a maximum of ten re-sampling sets are obtained. Then, the FFT operation is performed for all ten sets, and the evaluation points are accumulated in accordance with the detected frequency components. The obtained results are shown in the following table, as an example.

TABLE 2

| Detected components | Points |
| --- | --- |
| Fundamental wave, secondary and quartic components | 4 |
| Fundamental wave and secondary components | 2 |
| Fundamental wave and quartic components | 1 |

Figure 20:
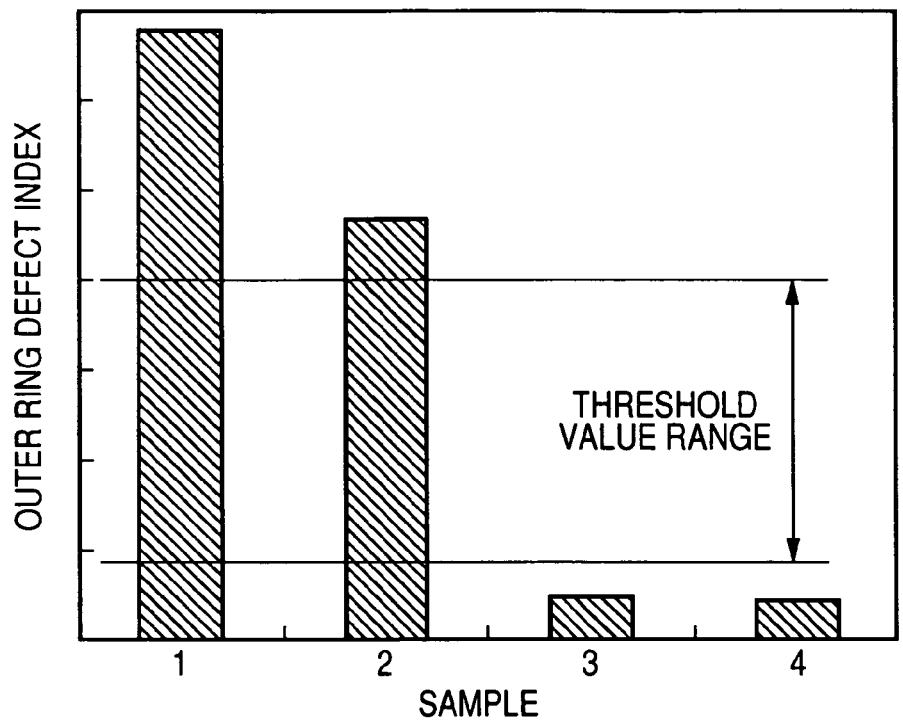
FIG. 20 is a diagram showing diagnosis results for the fourth embodiment.

FIG. 20 shows the outer ring scratch diagnosis results for a rolling bearing obtained by repeating the phase shifting and the FFT operation. In this example, samples (1 and 2), for which artificial scratches were made on the outer ring raceway surface of a rolling bearing, and normal samples (3 and 4), for which no scratches were present, were prepared, and a test was conducted by using, as the main component (fundamental wave component), the characteristic frequency component of the outer ring scratch on a bearing. The points were aggregated for a predetermined period of time, and the total of the points was defined as an outer ring defect index. For the detection of a frequency component, peaks were detected by performing the moving average calculation and the smooth differentiation of the FFT spectrum, and the frequency components were narrowed down to the upper nine components, in accordance with the magnitude of the spectrum component.

Figure 21:
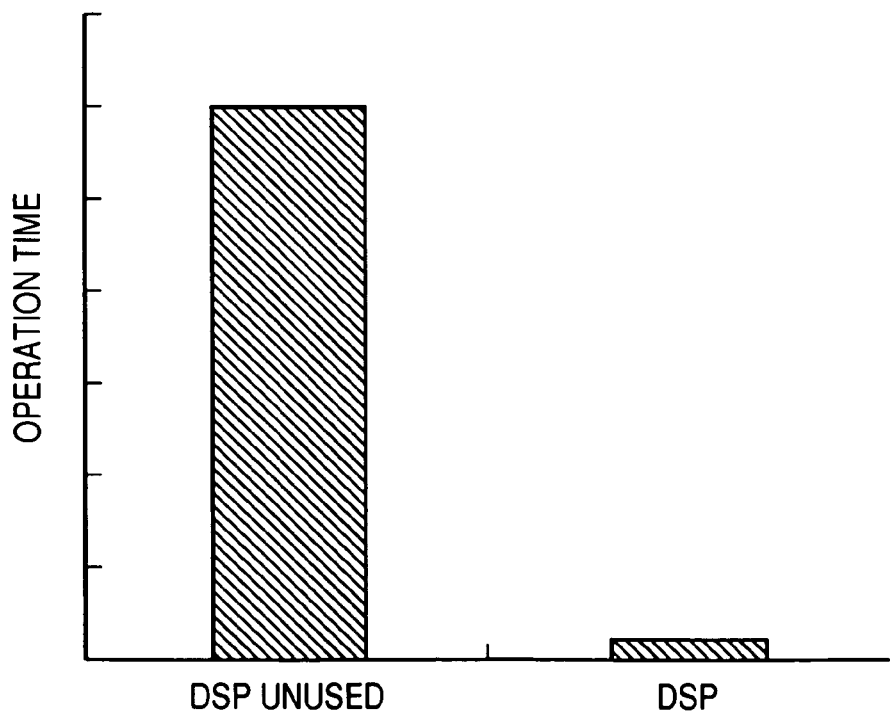
FIG. 21 is a diagram showing the times of the FFT operation required when a DSP is employed and when only a CPU is employed.

FIG. 21 is a graph showing a comparison of the FFT operation time between when the DSP 220b is employed and when only the CPU 220a is employed. In this case, the number of points for the FFT operation is defined as a 4 k word length, in consonance with the capacity of the fast memory 220e, from which, in accordance with an instruction, two sets of data can be read to the DSP 220b at the same time. Therefore, the FFT operation can be rapidly performed by the DSP.

As described above, according to the abnormality diagnosing system of this embodiment, for the digital envelope waveform, the FFT operation is performed by reducing the sampling frequency until the number of data sets is appropriate for the capacity of the X/Y-RAM 220e of the DSP 220b. Thus, the DSP 220b can perform the fast FFT process, and furthermore, the decimation process is performed after the absolute value process, and the number of points for the FFT operation is reduced to analyze the envelope waveform. Thus, both the frequency resolution of the signal and the efficiency of the FFT operation can be increased, and the abnormality diagnosis of the bearing can be accurately and efficiently performed.

Fifth Embodiment

Figure 22:
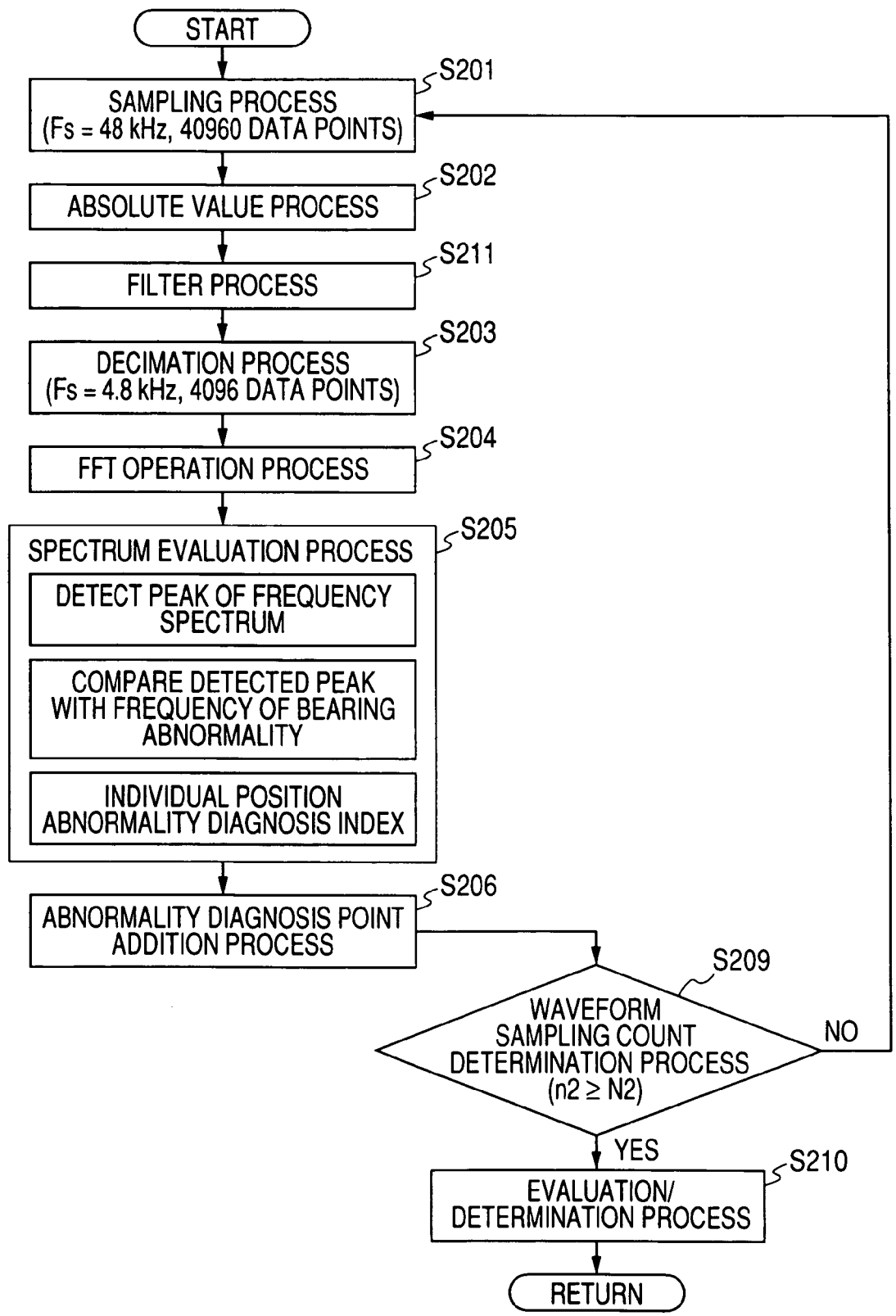
FIG. 22 is a flowchart showing the processing sequence performed by an abnormality diagnosing system according to a fifth embodiment.

FIG. 22 is a flowchart showing the process sequence performed by an abnormality diagnosing system according to a fifth embodiment. This flowchart differs from that in FIG. 18 in that a filter process (S211) performed by a digital low-pass filter is added before the decimation process (S203). Further, the repetition count determination process (S207) and the phase shift process (S208) are not shown.

Figure 23:
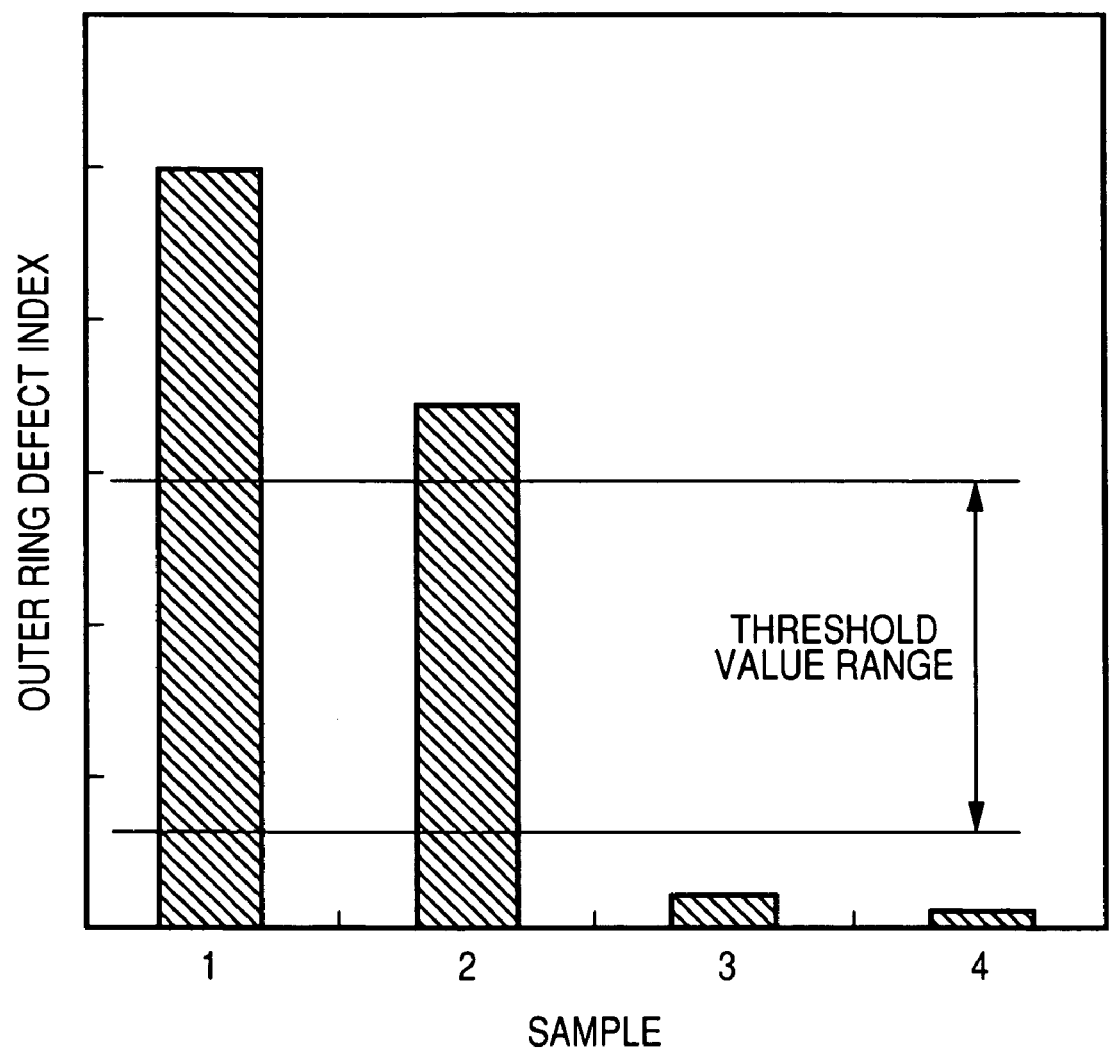
FIG. 23 is a diagram showing scratch diagnosis results for the fifth embodiment.

When, a band is lowered in advance by the digital low-pass filter in this manner, before the decimation process (S203), the affects of aliasing, etc., can be reduced, and a FFT operation for the low band can be stably performed. Compared with the system in FIG. 18, the program code for the digital low-pass filter and the filter coefficient calculated in consonance with the filter property are additionally required. However, this system is effective because the removal of noise is ensured. FIG. 23 shows the outer ring scratch diagnosis results obtained for the fifth embodiment. Samples used for testing are the same as those in FIG. 20.

Sixth Embodiment

Figure 24:
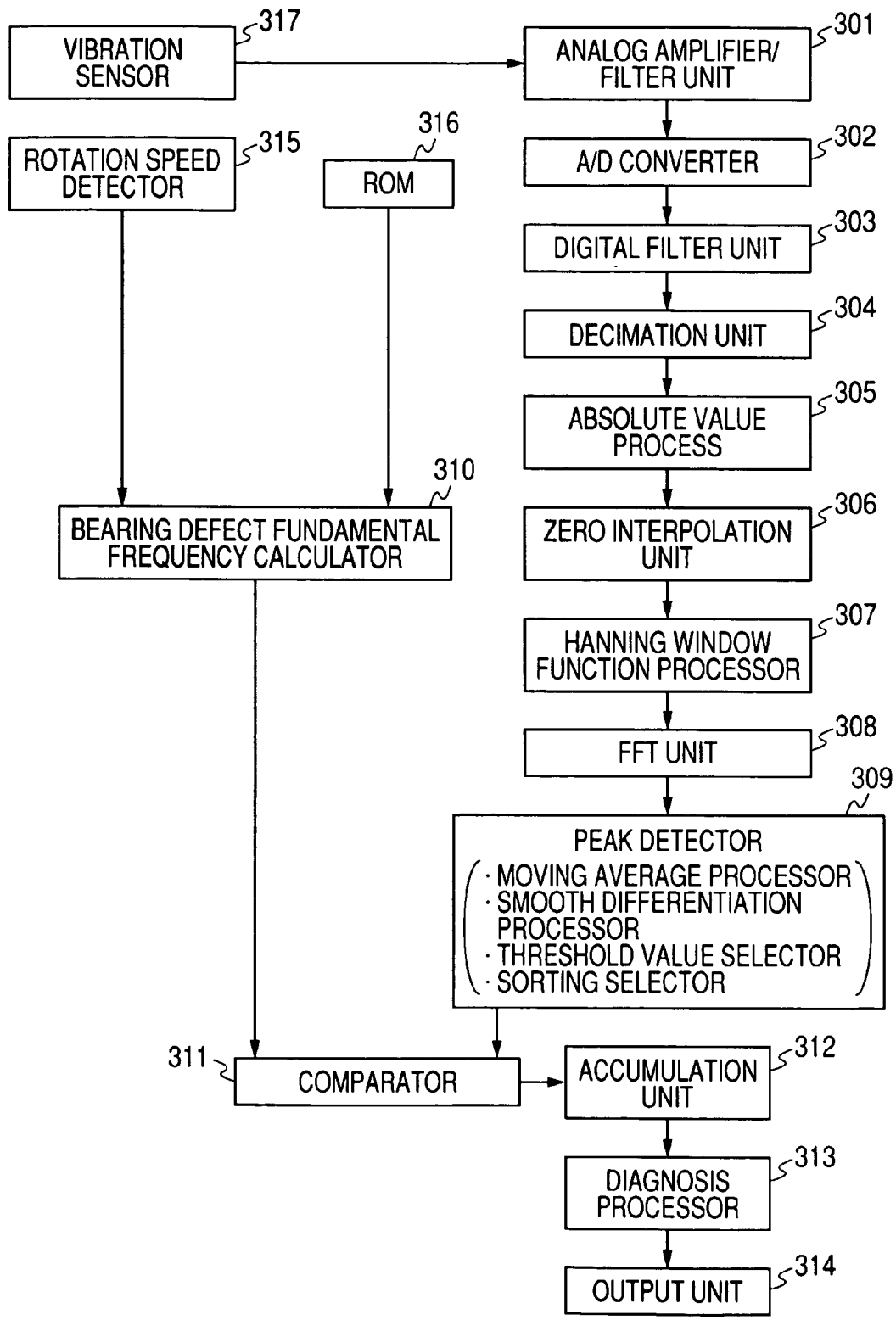
FIG. 24 is a functional block diagram showing a six embodiment for the abnormality diagnosing system of the present invention.

FIG. 24 is a functional block diagram showing an abnormality diagnosing system according to a sixth embodiment.

As shown in FIG. 24, the abnormality diagnosing system for the sixth embodiment includes: an analog amplifier and filter 301, an A/D converter 302, a digital filter 303, a decimation processor 304, an absolute value processor (envelope processor) 305, a zero interpolation unit (interpolation processor) 306, a Hanning window function processor 307, a FFT unit 308, a peak detector 309, a bearing defect fundamental frequency calculator 310, a comparator 311, an integration unit 312, a diagnosis processor 313 and a diagnosis results output unit 314.

The analog amplifier and filter 301 receives a signal detected by a vibration sensor (including an acoustic sensor) 317 that detects sounds or vibrations generated by mechanical equipment to be diagnosed. The analog amplifier and filter 301 amplifies the input signal using a predetermined gain, and blocks a signal having a predetermined frequency or higher.

The A/D converter 302 samples, at a predetermined sampling frequency, an analog signal passed through the analog amplifier and filter 301, and converts the analog signal into a digital signal.

The digital filter 303 passes only a signal in a predetermined frequency band of the digital signals generated by the A/D converter 302.

The decimation processor 304 performs a decimation process by sampling, at a predetermined sampling frequency, a signal that is passed through the digital low-pass filter 303.

The absolute value processor 305 obtains, as discrete data, the envelope (envelope waveform) of the signal that is sampled by the decimation processor 304.

The zero interpolation unit 306 performs zero-padding interpolation for the discrete data of the envelope obtained by the absolute value processor 305 in order to perform a fast Fourier transform at an arbitrary frequency resolution. In this case, the zero-padding interpolation is interpolation in which a 0 is added to the discrete data for the envelope when there is a shortage of data, so that the data are adjusted, and the sampling frequency used by the FFT 308 is the square of two.

The Hanning window function processor 307 multiplies, by a Hanning window function having a predetermined cycle, the signal obtained by the zero interpolation unit 306 through interpolation. As a result, a signal to be used for diagnosis is extracted.

The FFT unit 308 employs the FFT algorithm to perform a frequency analysis for the signal windowed by the Hanning window function processor 307, and generates a frequency spectrum waveform signal.

The peak detector 309 detects peaks in the frequency spectrum obtained by the FFT unit 308.

The bearing defect fundamental frequency calculator 310 calculates a fundamental frequency, indicating a bearing defect, based on the rotation speed of a rolling bearing, which is detected by a rotation speed detector 315, and the internal specifications for the bearing, which are read from a ROM 316 in which the bearing specifications are stored.

The comparator 311 compares peaks, obtained by the peak detector 309, with a frequency calculated by the bearing detect fundamental frequency calculator 310, and outputs the degree of coincidence as a numerical value.

The integration unit 312 performs integration for the value output by the comparator 311, and outputs the results.

The diagnosis processor 313 diagnoses an abnormality based on the integration results obtained by the integration unit 312.

The diagnosis results output unit 314 outputs the diagnosis results obtained by the diagnosis processor 313.

The peak detector 309 includes a moving average processor, a smooth differentiation processor, a threshold value selector and a sorting selector.

In a bilaterally symmetrical manner, the moving average processor weights a frequency spectrum (discrete data in the frequency area) obtained by the FFT unit 308, and calculates a moving average.

When the moving average processor performs the moving average process, the smooth differentiation processor performs a numerical differentiation process and extracts, as peaks for a frequency spectrum, frequency points at which the sign of a differential coefficient is changed.

From among the peaks extracted by the smooth differentiation processor, the threshold value selector selects peaks for which the root mean square of the amplitude level is equal to or greater than a threshold value. A power average value for a peak extracted by the smooth differentiation processor, or a value determined in consonance with the root mean square, is employed as the threshold value.

From among the peaks selected by the threshold value selector, the sorting selector selects a predetermined number of peaks, beginning with a peak for which the root mean square of the amplitude level is large. The simplest method that can be used for this is a method whereby, for example, a plurality of peaks are sorted in the descending order of levels using a well known sorting algorithm, and whereby the peaks are selected beginning with the highest.

The same configuration as in FIG. 17 can be provided as a block diagram (hardware configuration diagram) showing the micro computer (MPU) and its peripheral circuit, which are specific components of the abnormality diagnosing system of the sixth embodiment. Since these components have been previously described, no explanation for them will be given.

Among the functional blocks of the abnormality diagnosing system in FIG. 24 that perform the digital operation, the FFT unit 308 handles the largest amount of data at one time (each loop). In order to provide the FFT unit 308 by using the DSP 220b of the MPU 220, data employed during a FFT operation must be stored in the X/Y-RAM 220e.

On the other hand, in order to detect a scratch through a vibration analysis performed for a bearing, a waveform must be observed in a frequency band of about 10 kHz. However, the characteristic frequency for a scratch is generally equal to or lower than 1 kHz.

In this example, assume that the characteristic frequency for a scratch on the bearing to be diagnosed is a low frequency of 100 Hz or lower, the frequency resolution of the FFT unit 308 is 1 Hz (±0.5 Hz), the sampling frequency is 32.768 kHz and the sampling time (Tw) is 750 ms. Therefore, the number of samples taken for a raw waveform is 32768×0.75=24576. At the stage where the FFT unit 308 calculates the frequency spectrum, zero interpolation is performed so that the sampling time becomes 1 s. Therefore, the frequency resolution becomes 1 Hz (±0.5 Hz).

The passing band width for the digital filter 303 is selected in consonance with the frequency band where the S/N ratio of vibrations caused by an abnormality to noise is the greatest. For example, when it is known in advance that the S/N ratio of a flaking defect reaches the maximum in the frequency band of 1 kHz to 4 kHz, 1 kHz to 4 kHz is set as the passing band width for the digital filter 303. This type of digital filter can be constituted by an FIR filter, an IIR filter, a filter using a FFT and an inverse FFT (IFFT), etc. For a RISC type micro computer that incorporates a DSP of a fixed-point calculation type, an FIR filter is appropriate.

The absolute value processor 305 calculates the average value of the envelope or the absolute value waveform in order to remove a DC component, and re-draws the line for an amplitude of 0. Through the absolute value process (envelope process), a signal in a low band of less than 1 kHz, for which the originating factor is a bearing defect, becomes visible. At this time, a signal in a high band is also still included, and it is preferable that the FIR low-pass filter, which passes only a signal in a low band of less than 1 kHz, be activated before the FFT is performed. However, since the band-pass filter process performed by the digital filter 303 and the absolute value (envelope extraction) process performed by the absolute value processor 5 have already been performed for the raw waveform, the accuracy of the diagnosis of the bearing defect is little affected even when the preceding low-pass filter process performed by the FFT unit 308 is eliminated.

The decimation rate (decimation amount) for the FFT operation points of the decimation processor 304 and the interpolation rate, or the interpolation bit count, of the zero interpolation unit 306, are determined in accordance with the frequency band to be analyzed, the frequency resolution, the FFT operation points, etc. In this case, since the ultra fast FFT operation process is to be performed by the DSP 220b of the MPU 220, the number of FFT operation points is automatically limited in consonance with the capacity of the X/Y-RAM 220e, which can be accessed by the DSP 220b via a parallel special bus.

Data processed by the FFT unit 308 consists of a real number part and an imaginary part, which are allocated to the X-RAM and the Y-RAM of the X/Y-RAM 220e. When the method is used for supplying a memory area at the input and output, the FFT can be performed for a data length equivalent to 8 kB. When the resolution of the A/D converter 223b is 16 bits (two bytes), and when a length of two bytes is set for an operation variable, 8192/2 bytes, i.e., data including 4096 points, can be processed by the DSP 220b.

When the FFT interval length is denoted by Tw,fft, and when the sampling frequency (fs,fft) is 1.0 Hz, a necessary frequency resolution $\Delta fw$ is represented by $\Delta fw=1/Tw,fft$. Therefore, when Tw,fft=1 s is established, the condition is satisfied.

In this example, since the sampling time Tw,fft is defined as 0.75 s, the sampling time is short by 0.25 s. This shortage is interpolated by the zero interpolation unit 306. However, by using merely zero interpolation, 32786 data sets are required.

Therefore, when the original sampling count (32768) is reduced to 4096, which is the upper limit for the FFT operation points that is determined based on the capacity of the X/Y-RAM 220e of the DSP 220b and the byte length of the operation, the number of data sets is reduced to ⅛ of the original count, and the sampling frequency for the FFT unit 308 is also lowered to 32768/8=4096. Therefore, the upper limit of the frequency (Nyquist frequency) to be analyzed by the FFT unit 308 is halved, i.e., is 2.048 kHz, which is still satisfactory as a frequency (less than 1 kHz) that represents a defect of a bearing.

Figure 25:
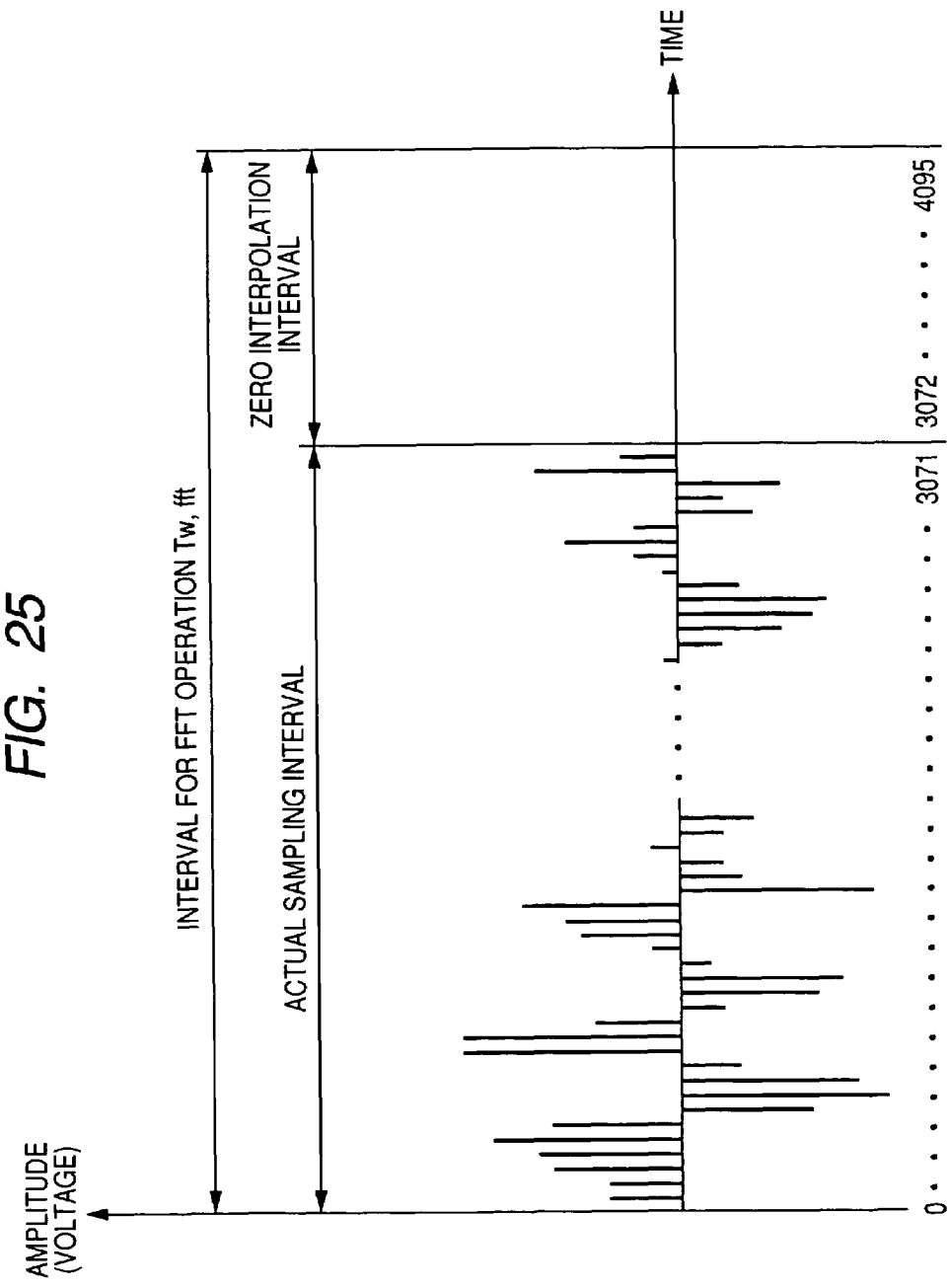
FIG. 25 is an explanatory diagram showing a zero-padding interpolation process performed by a zero interpolation unit in FIG. 24.

In this example, in accordance with this process, sampling (24576 points) is performed at 32.768 kHz for a period of 0.75 s, and the digital filter unit 303 and the absolute value processor 305 lower the frequency band. Thereafter, the decimation process to ⅛ is performed to reduce the sampling points and the sampling frequency to 3072 points and 4.096 Hz. As for the points short of 4096, 1024 zeros (0 s) are added after the 3072 points to form sampling waveform data consisting of 4096 points (see FIG. 25). This waveform data is transmitted via the Hanning window function unit 307 to the FFT unit 308. The Hanning window function unit 307 multiples the input waveform data by the Hanning window function, and reduces the affect at both ends of the waveform data that is to be transmitted to the FFT unit 308. The FFT unit 308 performs the FFT for the resultant waveform data, so that a frequency spectrum is obtained at a resolution of 1 Hz. The obtained frequency spectrum data are transmitted to the peak detector 309.

The peak detector 309 weights the frequency spectrum obtained by the FFT unit 308 in a bilaterally symmetrical manner, and calculates the moving average. Thus, the frequency spectrum is smoothed and noise is reduced.

Further, at the time for the moving average process, numerical differentiation is performed. And frequency points at which the sign of a differential coefficient is changed are extracted as peaks for the frequency spectrum. Then, from among the extracted peaks, peaks for which the root mean square of the amplitude level is equal to or greater than a threshold value are selected, and a predetermined number (e.g., ten) of peaks are selected, beginning with the one for which the root mean square of the amplitude level is largest.

On the other hand, the bearing defect fundamental frequency calculator 310 calculates a fundamental frequency, indicating a defect for a bearing, based on the bearing rotation speed, which is detected by the rotation speed detector 315, and the internal specifications for the bearing, which are read from the ROM 316. The rotation speed detector 315 repeats the detection of the rotation speed of the bearing for a plurality of cycles, in synchronization with vibrations detected by the vibration sensor 317 (e.g., once in 0.75 s).

The frequency at the peak, detected by the peak detector 309, and the fundamental frequency, obtained by the bearing defect fundamental frequency calculator 310, are synchronously transmitted to the comparator 311 for each cycle.

Each time the frequency at the peak and the fundamental frequency are input, the comparator 311 compares with the frequency at the peak the fundamental frequency and the higher harmonic component, provides points in consonance with the degree of coincidence of the two (formula), and outputs the value to the integration unit 312. An example for the provision of points is shown in the following table.

TABLE 3

| Detected components | Abnormality diagnosis points |
| --- | --- |
| Fundamental wave, secondary, tertiary and quartic components | 16 |
| Fundamental wave, secondary and tertiary components | 8 |
| Fundamental wave, secondary and quartic components | 8 |
| Others | 0 |

In this case, the diagnosis process relative to the sampling of a waveform one time, corresponds to a following process during in which diagnosis points consonant with the coincidence degree of the detected peak are provided for the fundamental frequency and the higher harmonic components, up to the quartic components, that are obtained for vibrations that are caused by a bearing defect.

The detection of the frequency peak is repeated each time the diagnosis points are added, and the total of the points is evaluated. In this manner, the affect of a variance in the spectrum can be reduced, and the abnormality diagnosis can be accurately performed.

Figure 26:
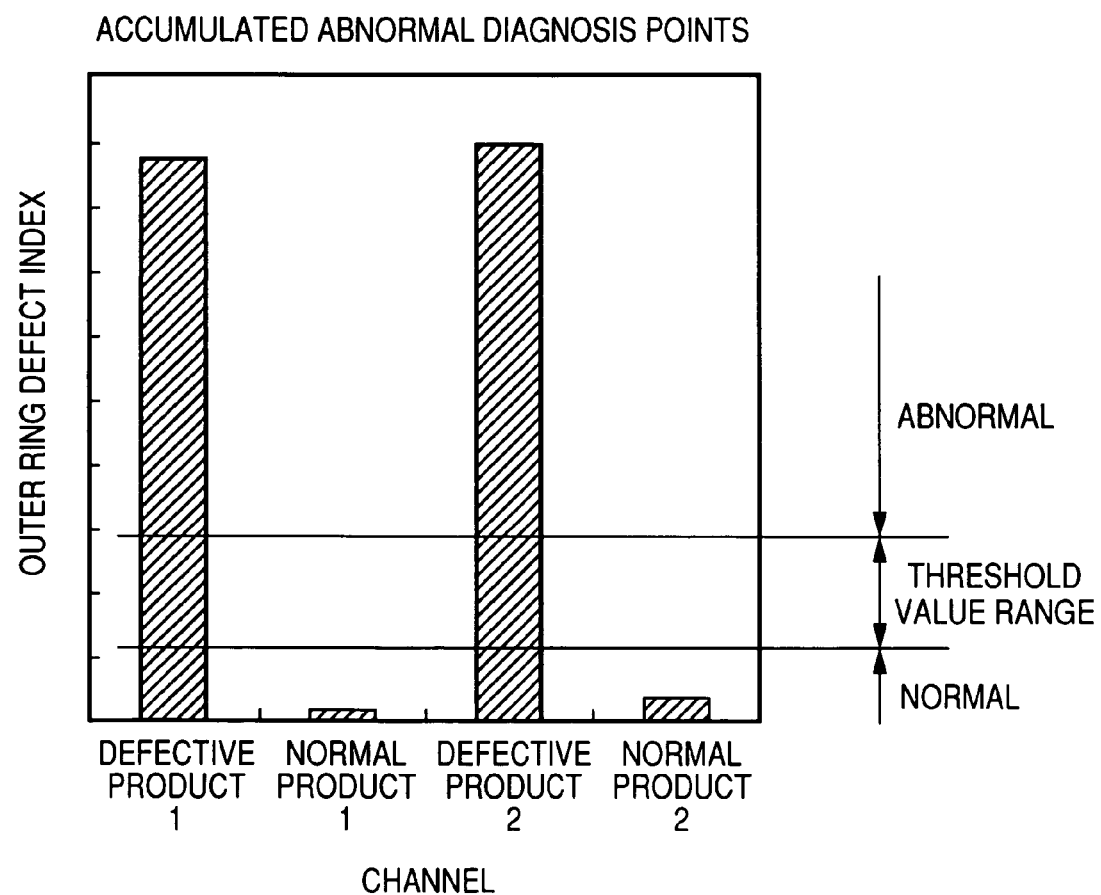
FIG. 26 is a diagram showing the abnormality diagnosis results for a defective product and a normal product.
Figure 27:
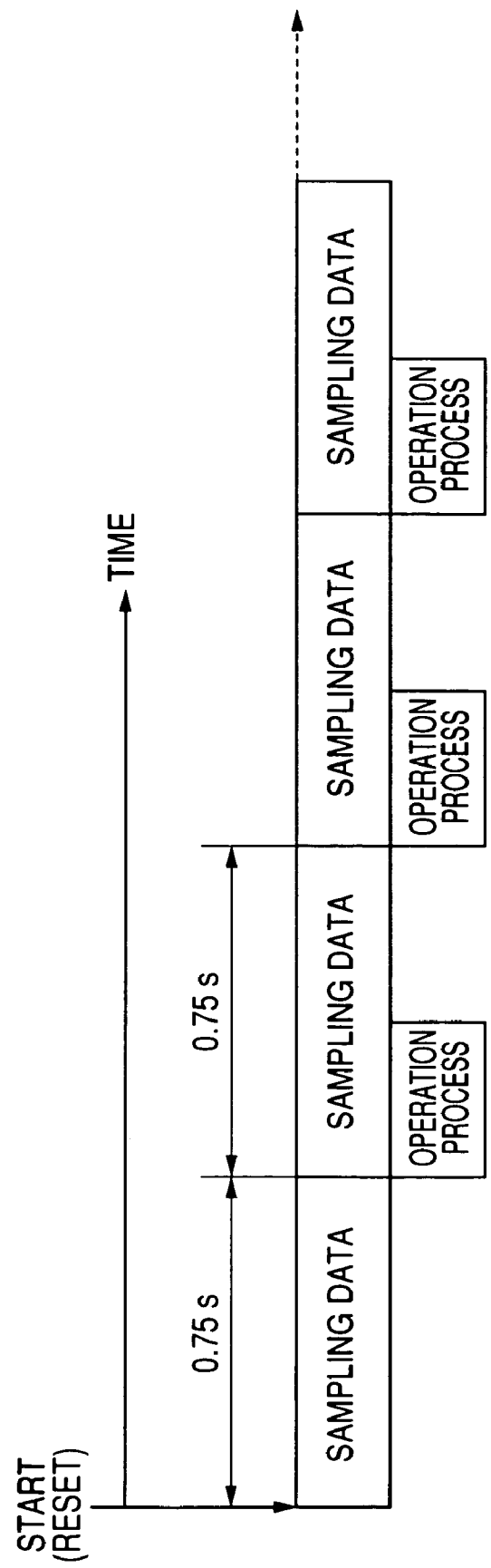
FIG. 27 is a timing chart showing timings for a data sampling process and a data calculation process and processing time.

FIG. 26 is a column graph showing the total value of diagnosis points for a bearing (a defective product) for which a defect has been created and a bearing (a normal product) for which there is no defect. In accordance with this example, by using the above described abnormality diagnosing system, a test was conducted for a bearing of an inner ring rotary type. Since the outer ring raceway surface tends to be damaged on a bearing of an inner ring rotary type, in this case, a scratch was made in an outer ring raceway surface when the test was conducted. Four sets of bearings were employed for diagnosis, and an outer ring scratch was made for two sets of them. As the condition for this test, 100 Hz or lower was the fundamental frequency when the outer ring raceway surfaces were scratched. For the fundamental wave, when the frequency at the peak fell within a range of ±1.0 Hz of the fundamental frequency, it was assumed that the fundamental wave matched the frequency at the peak. As for the higher harmonic waves, such as the secondary, the tertiary and the quartic waves, when the frequency at the peak fell within a range of ±2.0 Hz of the higher harmonic frequencies, it was assumed that they matched the frequency at the peak, and points in Table 1 above were added. The test time was defined as 60 seconds. Sampling time for one cycle was 0.75 seconds, and the operation time required for calculating the abnormality diagnosis points took about 0.15 seconds. Data sampling was performed by the DMA, and the operation process was performed within 0.15 seconds of the sampling of the next data. Therefore, as for the overall viewpoint, as shown in FIG. 27, when this system was operated sequentially for 60(+0.15) seconds, the diagnosis process could be performed 80(=60/0.75) times.

As shown in FIG. 26, noise is counted slightly even for a normal product; however, the difference from a defective product is noticeable. Since a great difference appears between a defective product and a normal product, a large range for the threshold value can be obtained. Thus, it is possible for an alarm to be generated step by step while this range is employed as a gray zone.

FIG. 21 is a graph showing a comparison for the FFT operation time between when the DSP 220b is employed and when only the CPU 220a is employed. The band is lowered by the digital filter 303, and thereafter the number of points for the FFT operation is reduced by the decimation processor 304 so that they correspond to the capacity of the X/Y-RAM 220e of the DSP 220b. Thus, the FFT operation can be performed by the DSP 220b extremely rapidly.

As described above, according to the abnormality diagnosing system of this embodiment, a detected signal is converted into a digital signal, a signal is extracted from a frequency band required for diagnosis, and an envelope for a signal after decimation is obtained. Then, the zero-padding interpolation is performed for the envelope so as to perform the FFT at an arbitrary frequency resolution, a signal used for diagnosis is extracted by the Hanning window function, the frequency analysis is performed through the FFT, and an abnormality is diagnosed based on the obtained frequency spectrum. Therefore, the FFT is performed for a detected signal at a sampling frequency and a frequency resolution that are appropriate for an operation device that is employed for the FFT operation, so that the abnormality diagnosis can be accurately performed.

Furthermore, the moving average process is performed for the frequency spectrum obtained by the FFT, then, a smoothing and differentiation process is performed for the spectrum, and frequency points at which the sign of the differential coefficient is changed from positive to negative are detected as peaks. Then, peaks having a predetermined threshold value or greater are extracted, and are sorted, and a predetermined number of peaks are extracted beginning with the highest. And the degree of coincidence is calculated between the peak that corresponds to the main component (fundamental wave component) of a vibration, or the peak that corresponds to the main component (fundamental wave component) and the higher order components (harmonics components) of the vibration, and a frequency that indicates an abnormality for a diagnosis target. Then, points are provided for the coincidence degree, and are accumulated a plurality of times, and the accumulated value is evaluated. The abnormality is diagnosed in this manner, and therefore, under a condition wherein the S/N ratio of the abnormality signal, or the abnormality prediction signal, to the noise signal is small, a noise signal will not be erroneously detected as an abnormality signal or an abnormality prediction signal, and extremely accurately and efficiently, an abnormality diagnosis can be performed.

Seventh Embodiment

Figure 28:
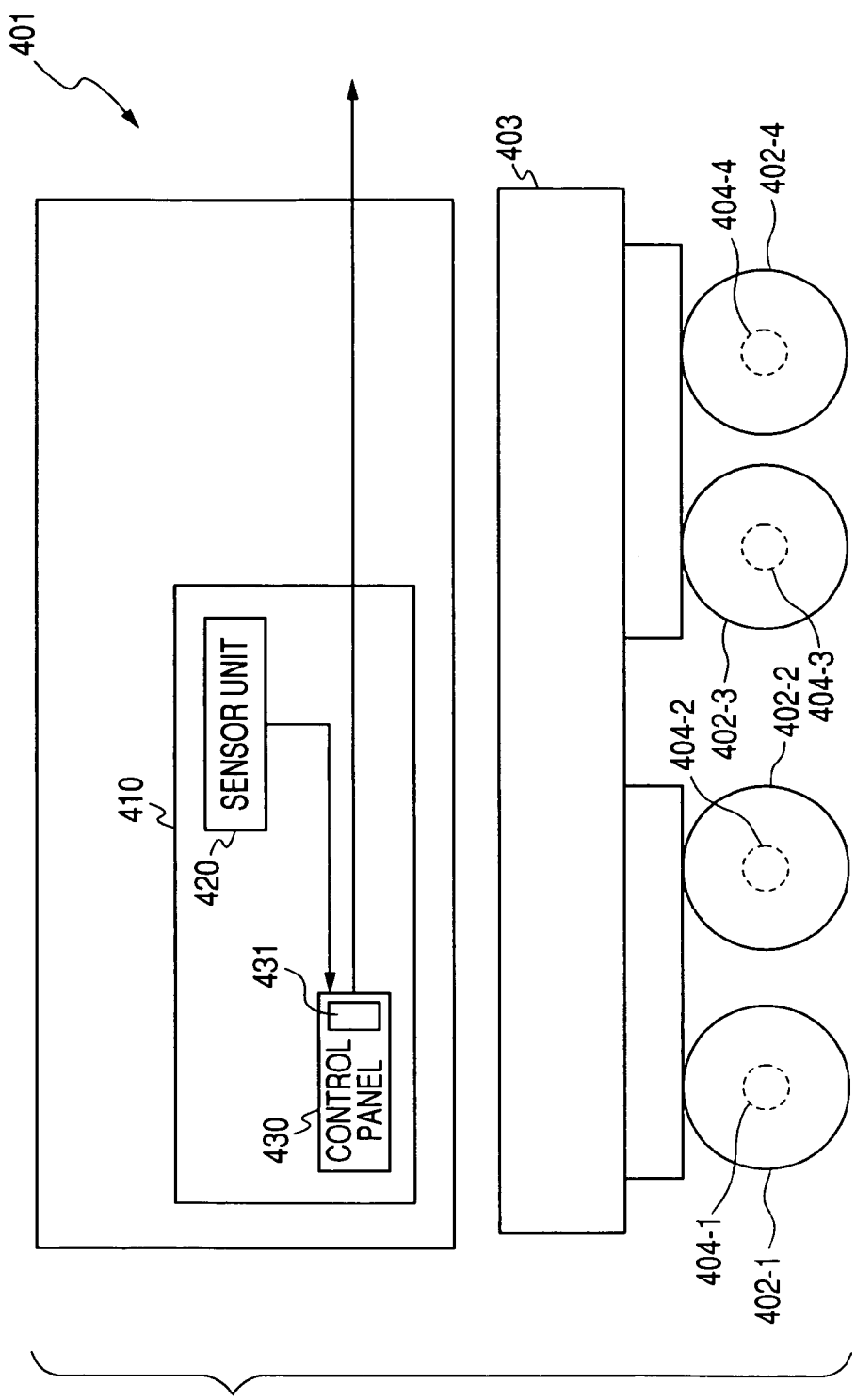
FIG. 28 is a schematic diagram showing the arrangement of a railway vehicle that includes an abnormality diagnosis apparatus according to a seventh embodiment.

FIG. 28 is a schematic configuration diagram showing a railway vehicle that includes an abnormality diagnosis apparatus according to a seventh to a thirteenth embodiments. A railway vehicle 401 includes a four sets of wheels (a total of eight) 402-1 to 402-4 and four bearings 404-1 to 404-4, for rotatably supporting the wheels under a undercarriage 403, and an abnormality diagnosis apparatus 410 is mounted on the undercarriage 403.

The abnormality diagnosis apparatus 410 includes a sensor unit 420 and a control panel 430. The sensor unit 420 is a unit for detecting vibrations of the undercarriage 403. The control panel 430 includes a diagnosis circuit 431, for employing a signal output by the sensor unit 420 to diagnose the presence/absence of an abnormality, such as flaking of the bearings 404-1 to 404-4 or flat of wheels 402-1 to 402-4. In this system, diagnostic content (an alarm signal) obtained by the diagnosis circuit 431 is transmitted via the communication line of the vehicle 401 to an engineer s cab or a control center.

Figure 38:
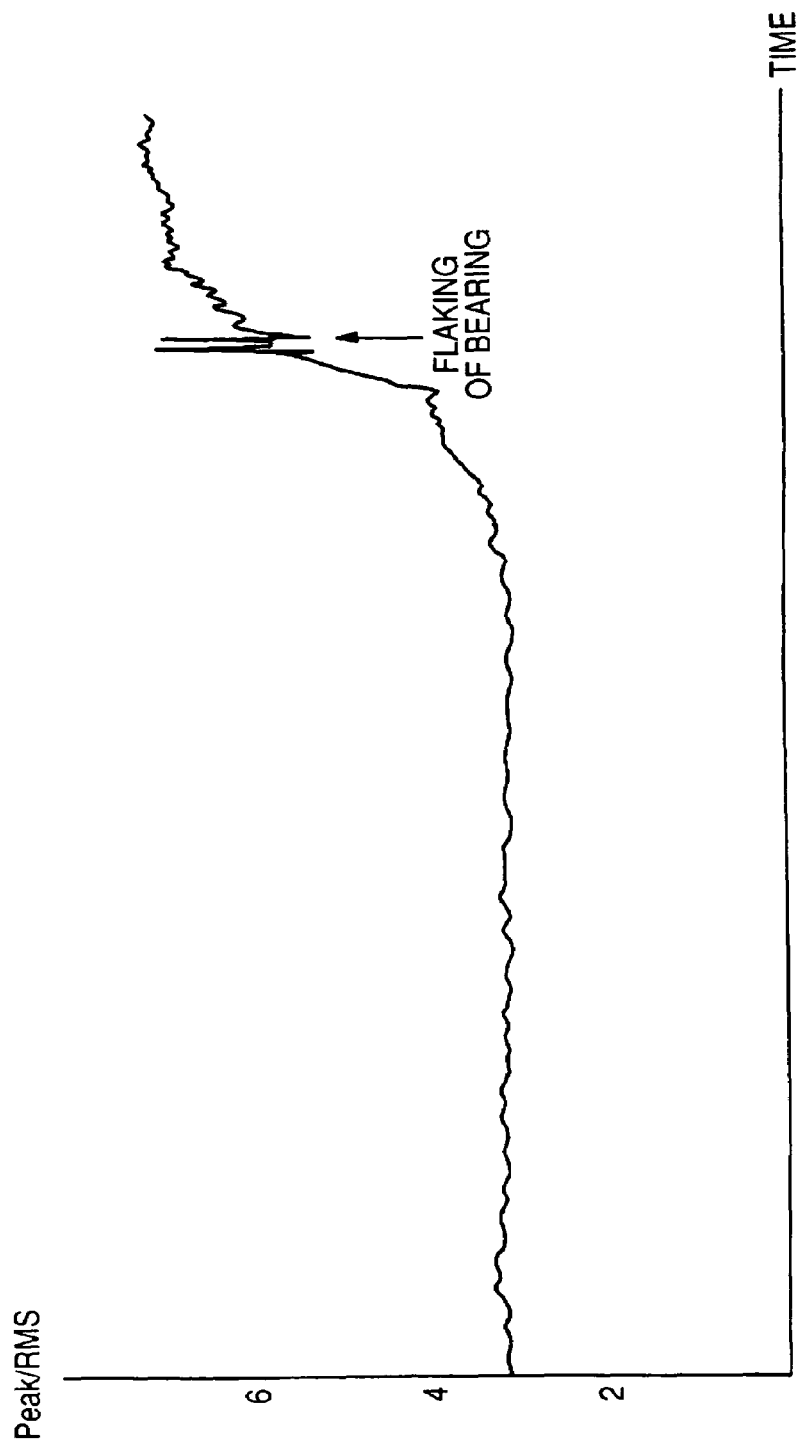
FIG. 38 is a waveform diagram showing a crest factor (Peak/RMS) that is one of the parameters indicating a deterioration, such as flaking, and showing that a parameter value is increased because of flaking.
Figure 39:
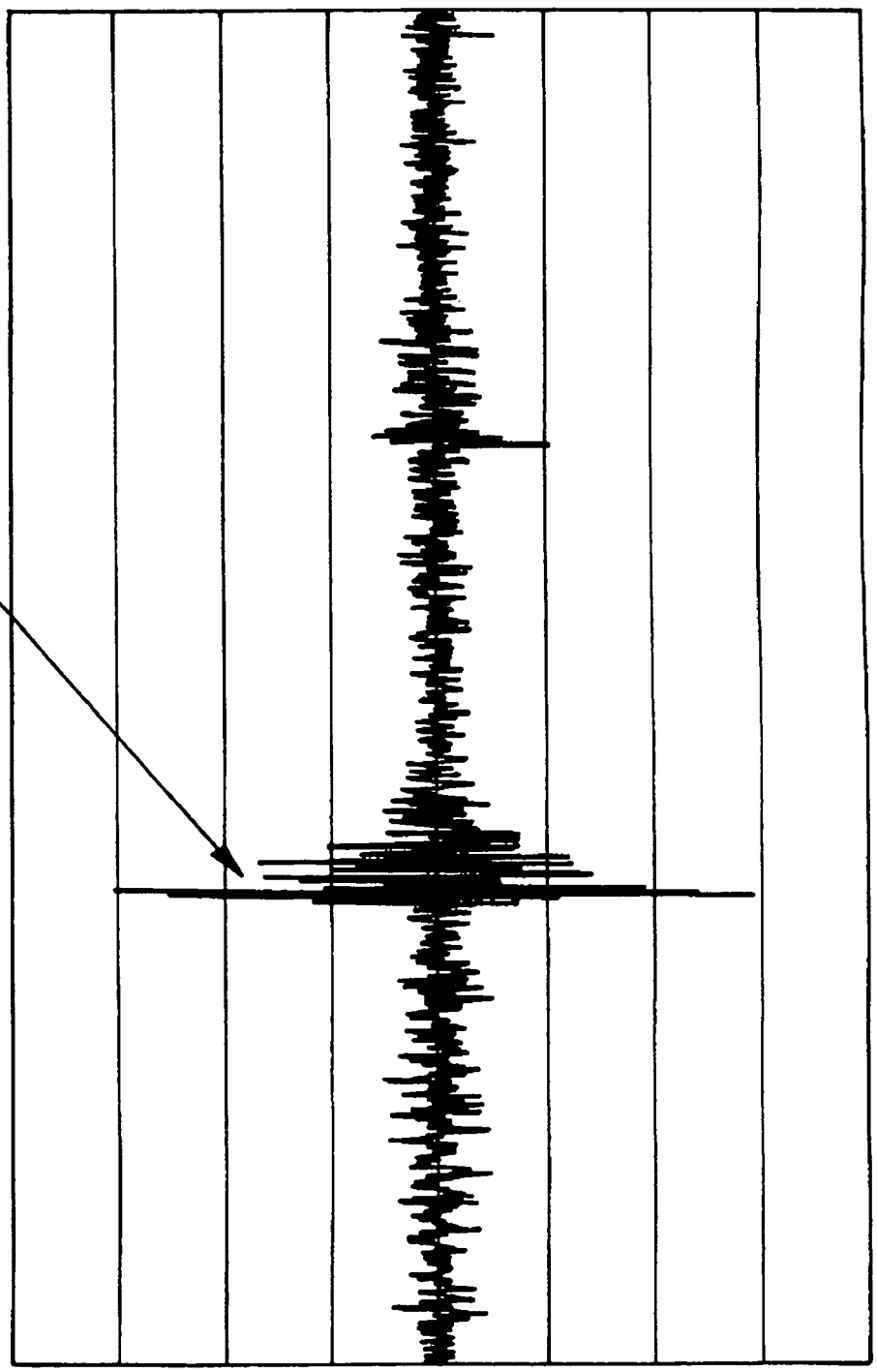
FIG. 39 is a waveform diagram showing vibrations of a railway vehicle, and indicating that impulsive vibration (noise) caused by rail joints is mixed with a detected vibration waveform.

In the eighth embodiment to the twelfth embodiment below, as shown in FIG. 38, the Peak/RMS (Root Mean Square) is employed as a parameter that indicates deterioration, such as flaking of the bearings 404-1 to 404-4. In this case, Peak indicates an absolute value for the maximum amplitude in a predetermined interval and RMS indicates a root mean square value for a vibration voltage in a predetermined interval. A target waveform in this case is a waveform shown in FIG. 39 that represents the vibration of the undercarriage 403, and that includes noise, such as an impulsive sound or a friction sound caused by rail joints, that is not related to deterioration of the mechanical constituents of the vehicle 401. This type of noise has an amplitude considerably greater than a vibration for which the origin is an abnormality such as the flaking of the bearings 401-1 to 404-4 or the flat of the wheels 402-1 to 402-4.

Figure 29:
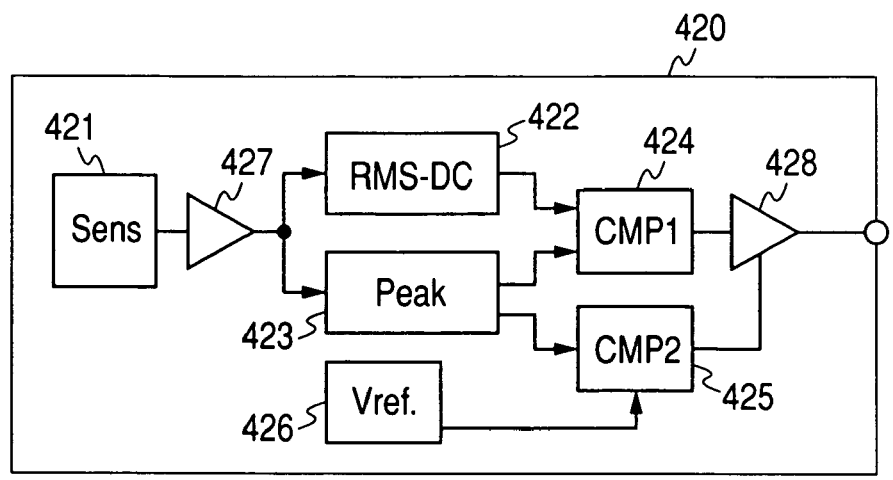
FIG. 29 is a block diagram showing a sensor unit for the seventh embodiment.

FIG. 29 is a block diagram showing the seventh example arrangement of the sensor unit 420. The sensor unit 420 in FIG. 29 includes a vibration sensor (Sens) 421, a root mean square calculation circuit (RMS-DC; hereinafter referred to as an RMS calculation circuit) 422, which is a parameter value detection circuit, and an analog calculation circuit, a peak detection circuit (Peak) 423; a first comparator (CMP1) 424, which is a comparison circuit; a second comparator (CMP2) 425, which is a peak-reference value comparison circuit; and a reference voltage output circuit (Vref.) 426. It should be noted that the RMS calculation circuit 422 performs the root mean square calculation based on the following formula (3).

[Equation 6]

$$\sqrt{\sum \frac{x_i^2}{n}} \quad (3)$$

$X_i$ : $i - th$ actual value (value at time $I$)

$n$ : the number of samples (interval length)

The vibration sensor 421, which is a sensor for detecting a vibration in the perpendicular direction using piezoelectric ceramic, detects a vibration in a frequency band of 50 Hz to 10 kHz, and outputs the vibration waveform as an electric signal. The signal (vibration signal) output by the vibration sensor 421 is amplified by an amplification circuit 427, and the amplified signal is transmitted both to the RMS calculation circuit 422 and the peak detection circuit 423.

The RMS calculation circuit 422 processes an input vibration signal, and outputs a DC signal having a voltage (hereinafter referred to as an RMS voltage) that corresponds to the RMS of the voltage of the vibration signal. An RMS to DC converter IC that incorporates, for example, a buffer amplifier, an absolute value circuit, a root/division circuit and an output filter amplifier circuit, is employed as the RMS calculation circuit 423. A specific example for the RMS to DC converter IC is product model number "AD637": Analog Devices Co., Ltd, etc.

The time constant for the RMS calculation circuit 422 can be determined by an external capacitor. In this example, the time constant is set to be 100 ms. Furthermore, the RMS calculation circuit 422 includes a circuit for amplifying the RMS voltage at a specific magnification ratio, and for outputting the resultant voltage. In this case, four times a voltage is output.

The peak detection circuit 423 outputs the peak voltage for the input vibration signal. The time constant for the peak detection circuit 423 is equal to that for the RMS calculation circuit 422, and the amplification level of the voltage to be output is 1.

The signal output by the RMS calculation circuit 422 is transmitted to the first input terminal of the first comparator 424. The signal output by the peak detection circuit 423 is transmitted to the second input terminal of the first comparator 424 and the first input terminal of the second comparator 425. A reference voltage output by the reference voltage output circuit 426 is transmitted to the second input terminal of the second comparator 425.

The first comparator 424 compares the signal voltage received from the RMS calculation circuit 422, i.e., four times the RMS voltage, with the signal voltage received from the peak detection circuit 423, i.e., the peak voltage. Then, when the peak voltage is higher, a signal of +5 V (a first voltage) is output. When the peak voltage is lower, a signal of −5 V (a second voltage) is output. That is, a signal indicating whether the crest factor (Peak/RMS) exceeds 4 is output.

The second comparator 425 compares the signal voltage received from the peak detection circuit 423, i.e., the peak voltage, with the reference voltage received from the reference voltage output circuit 426. Then, when the peak voltage is higher than the reference voltage, a signal of +5 V is output, and when the peak voltage is lower, a signal of −5 V is output. The reference voltage is set to a level higher than the voltage level of a signal that is caused by an abnormality of a bearing, etc.

The signal output by the first comparator 424 is transmitted to the detected signal input terminal of a gate circuit 428. The signal output by the second comparator 425 is transmitted to the control signal input terminal of the gate circuit 428. When a signal of −5 V is provided by the second comparator 425, the gate circuit 428 outputs a signal (+5 V or −5 V) received unchanged from the first comparator 424, or when a signal of +5 V is provided form the second comparator 425, always outputs a signal of 0 V.

In table 4 below, a relation is shown between the comparison results obtained by the first and second comparators 424 and 425 of the sensor unit 420 and the output of the gate circuit 428. In Table 1, 4×RMS denotes the input voltage for the first comparator 424, peak denotes the input voltage (peak voltage) for the second comparator 425, Vref denotes the output voltage (reference voltage) for the reference voltage output circuit 426, and Output denotes the output voltage for the gate circuit 428. It should be noted that the voltages output by the first and second comparators 424 and 425 are two-valued values. The gate circuit 428 passes (−5 V or +5 V) or invalidates (0 V) a signal output by the first comparator 424, depending on whether the signal output by the second comparator 425 is true or false. The output of the second comparator 425 is a gate open/close signal, the output of the gate circuit 428 is a gate output, and the output of the first comparator 424 is a signal source.

TABLE 4

| peak ≧ 4 × RMS | peak < Vref | Output |
| --- | --- | --- |
| T | T | +5 V |
| F | T | −5 V |
| T | F | 0 |
| F | F | 0 |

T: True F: False

As shown in Table 4, only when the peak voltage (peak) of the vibration signal detected by the vibration sensor 421 is equal to or lower than the reference level, i.e., the voltage level of a signal for which the origin is an abnormality in the bearing, etc., the sensor unit 420 outputs a signal (+5 V or −5 V) that indicates the magnitude of a relation between the peak voltage (peak) and a voltage that is four times the RMS voltage. Therefore, the output of the sensor unit 420 is prevented from being saturated by a very large signal that is the result of noise, such as an impulsive sound or a friction sound generated at the joints of rails, that is not related to the deterioration of mechanical constituents of the vehicle 401. The output voltage of +5 V of the sensor unit 420 means that Peak/RMS exceeds a predetermined reference. On the other hand, the output voltage of −5 V of the sensor unit 420 means that Peak/RMS is less than the predetermined reference.

Figure 30:
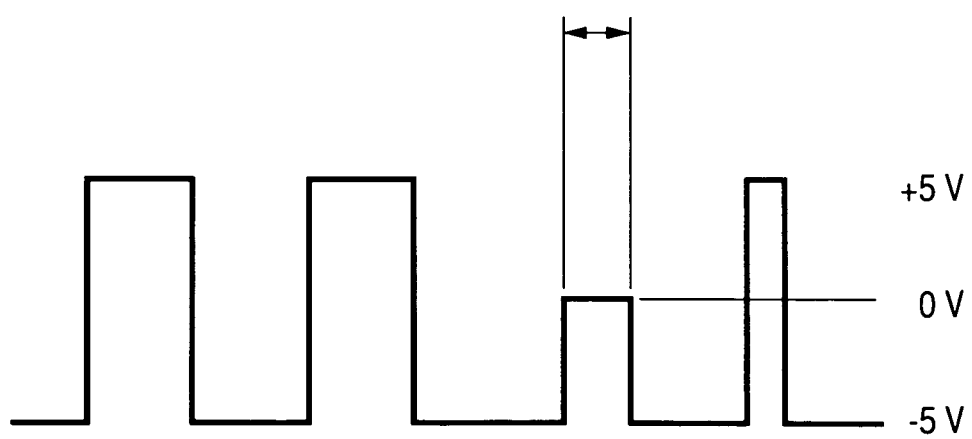
FIG. 30 is a diagram showing the waveform output by the sensor unit in FIG. 29.

The diagnosis circuit 431 of the control panel 430 always monitors the signal output by the sensor unit 420, and calculates, as a duty ratio for which Peak/RMS exceeds the reference, the ratio of a period for outputting a signal of a voltage of +5 V relative to the unit time (in this case, 60 seconds) (see FIG. 30). Then, an alarm signal at an alarm level is generated in consonance with the calculated duty ratio. The alarm signal is updated each second, and the duty ratio is always calculated based on a signal received before 60 seconds has elapsed since the latest signal was received from the sensor unit 420. This alarm signal is transmitted via the communication line of the vehicle 401 to the engineer's cab or the control center. A plurality of different colored alarm lamps are provided in the engineer's cab and in the control center, and a predetermined color alarm lamp is turned on or blinks in accordance with the alarm level of the alarm signal received from the sensor unit 420.

In Table 5 below, the correlation between the duty ratio and the alarm level is shown. Further, in Table 5, the correlation between the alarm level and the color of the alarm lamp is also shown.

TABLE 5

| Duty ratio for which peak/RMS exceeds a reference value | Alarm level | Alarm lamp color |
| --- | --- | --- |
| less than 20% | Normal | |
| 20% or greater to less than 40% | Caution needed | Yellow |
| 40% or greater to less than 80% | Alarm level I | Orange |
| 80% or greater | Alarm level II | Red |

This abnormality diagnosis apparatus 410 monitors the presence/absence of an abnormality when the railway vehicle is in motion. Unlike a prediction of a derailing, the alarms shown in Table 5 are not provided on the assumption that a train is to be halted when an abnormality is detected. Even alarm level II, which is the maximum alarm level in Table 5, is the degree at which, for example, a visual inspection within one week is required. Since the running of a train is not immediately disabled when flaking of a bearing or wheel flat has occurred, the presentation of a target time for maintenance is the main purpose of the use of the abnormality diagnosis apparatus 410. It should be noted, however, that the emergency level for maintenance is increased as the running speed of the train becomes higher. For a super high-speed railway for which the maximum speed exceeds 200 km per hour, it is preferable that a train be halted as soon as an alarm is generated at the alarm level II, and that an inspection be conducted.

Eighth Embodiment

Figure 31:
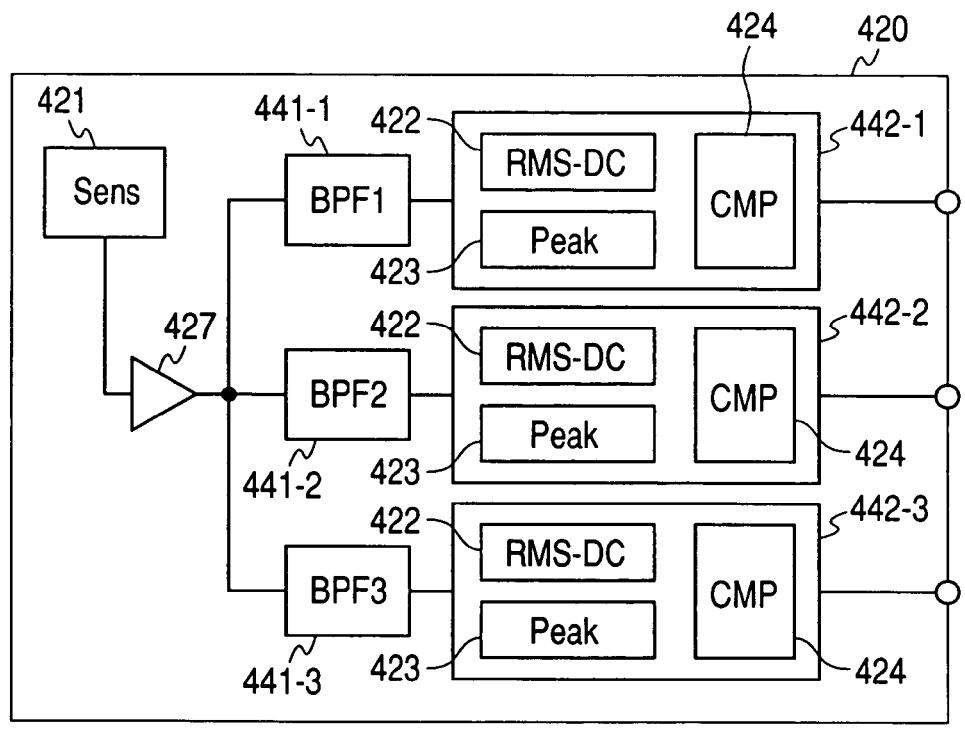
FIG. 31 is a diagram showing a sensor unit according to an eighth embodiment.

FIG. 31 is a block diagram showing a sensor unit 420 according to an eighth embodiment. The sensor unit 420 shown in FIG. 31 includes: a vibration sensor (Sens) 421; an amplifier 427; three band-pass filters (BPF) 441-1 to 441-3, having different bands in which a signal output by the amplifier 427 is received; and three signal processors 442-1 to 442-3, for processing signals that are passed through the band-pass filters 441-1 to 441-3. In this example, the band-pass filters 441-1 to 441-3 have center frequencies of 500 Hz, 1.5 kHz and 3 kHz.

The signal processors 442-1 to 442-3 each include: an RMS calculation circuit (RMS-DC) 422, a peak detector (Peak) 423 and a comparator (CMP) 424.

The vibration sensor 421, as well as in the example in FIG. 29, detects vibrations in a frequency band of 50 Hz to 10 kHz, and outputs the vibration waveform as an electric signal. The signal (vibration signal) output by the vibration sensor 421 is amplified by the amplification circuit 427, and the amplified signal is transmitted at the same time to the three band-pass filters 441-1 to 441-3. Signals in different bands, which are passed through the band-pass filters 441-1 to 441-3, are transmitted to the RMS calculation circuits 422 and the peak detection circuits 423 of the signal processors 442-1 to 442-3, respectively. That is, in this example, the RMS calculation circuit 422 and the peak detection circuit 423 of the first signal processor 442-1 receive a vibration signal in a low band (center frequency of 500 Hz) that has been passed through the first band-pass filter 441-1. The RMS calculation circuit 422 and the peak detection circuit 423 of the second signal processor 442-2 receive a vibration signal in a middle band (center frequency of 1.5 kHz) that has been passed through the second band-pass filter 441-2. The RMS calculation circuit 422 and the peak detection circuit 423 of the second signal processor 442-2 receive a vibration signal in a high band (center frequency of 3 kHz) that has been passed through the third band-pass filter 441-3.

The RMS calculation circuits 422 of the individual signal processors 442-1 to 442-3 process the received vibration signal, and output a voltage that is four times the RMS voltage of the vibration signal.

The peak detection circuit 423 of the individual signal processors 442-1 to 442-3 output the peak voltages of the received vibration signal. The amplification level of the voltage level output by the peak detection circuit 423 is 1. The signals output by the RMS calculation circuits 422 of the signal processors 442-1 to 442-3 are transmitted to the first input terminals of the comparators 424. The signals output by the peak detection circuits 423 are transmitted to the second input terminals of the comparators 424.

The comparators 424 of the individual signal processors 442-1 to 442-3 compare signal voltages received from the RMS calculation circuits 422, i.e., voltages that are four times the RMS voltages, with the signal voltages received from the peak detection circuits 423, i.e., the peak voltages. When the peak voltages are higher, signals of +5 V are output. When the peak voltages are lower, signals of −5 V are output.

Figure 32:
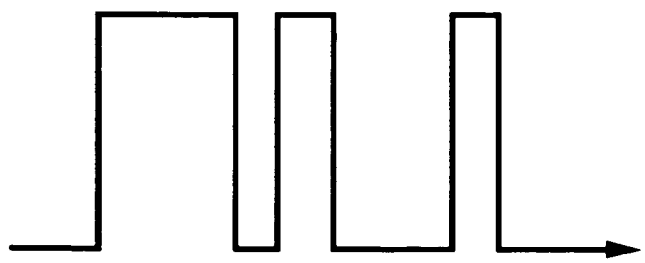
FIG. 32 is a block diagram showing the waveform output by the sensor unit in FIG. 31.

The diagnosis circuit 431 of the control panel 430 always monitors signals output by the signal processors 442-1 to 442-3 of the sensor unit 420. And for each signal, the diagnosis circuit 432 calculates, as the duty ratio for which Peak/RMS exceeds the reference, the ratio of a period for outputting a signal of +5 V relative to the unit time (in this case, 60 seconds) (see FIG. 32). Then, an alarm signal is generated at the alarm level consonant with the obtained duty ratio.

In this example, unlike the example in FIG. 29, since the upper limit is not provided for the peak voltage used for calculation of the duty ratio, as a noise countermeasure, a noise component is included in the reference for the duty ratio.

According to the example shown in the Table 5, noise, such as an impulsive sound or a friction sound generated at rail joints, that is not related to the deterioration of mechanical constituents of the vehicle 401, is taken into account in the duty ratio of less than 20% that indicates normal.

Ninth Embodiment

Figure 33:
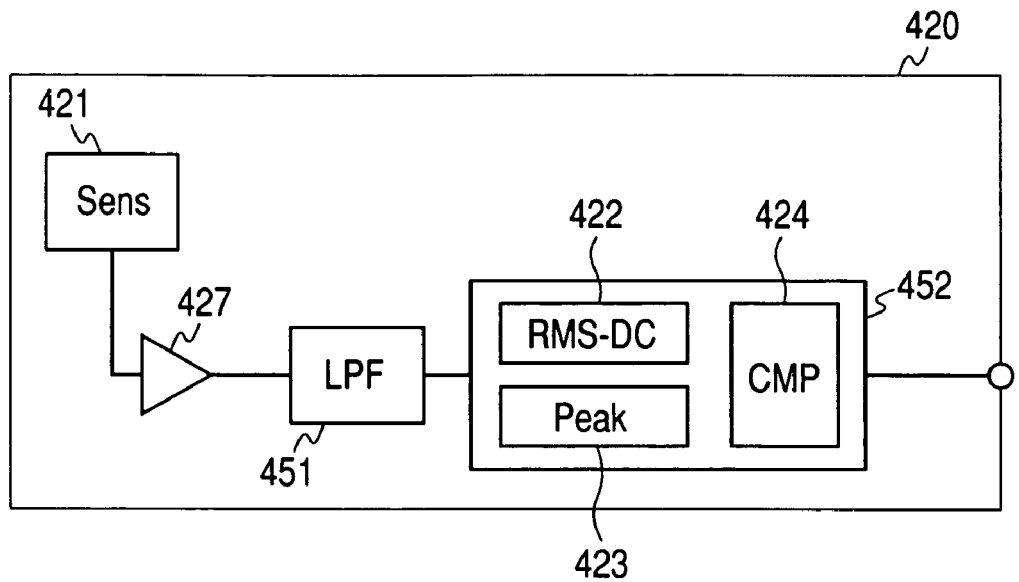
FIG. 33 is a diagram showing a sensor unit according to a ninth embodiment.

FIG. 33 is a block diagram showing a sensor unit 420 according to a ninth embodiment. The sensor unit 420 shown in FIG. 33 includes: a vibration sensor (Sens) 421; an amplifier 427; a low-pass filter (LPF) 451, for receiving a signal from the amplifier 427; and a signal processor 452, for processing a signal that is passed through the low-pass filter 451. The low-pass filter 451 has a cut-off frequency of about 1 kHz. Since a signal exceeding about 1 kHz is cut off, a very large signal can be cut for which the origin is a noise, such as an impulsive sound or a friction sound generated at rail joints, that is not related to the deterioration of the mechanical components of the vehicle 401, and only vibrations of the mechanical components are captured.

The signal processor 452 includes an RMS calculation circuit (RMS-DC) 422, a peak detection circuit (Peak) 423 and a comparator (CMP) 424.

The vibration sensor 421, as well as in the example in FIG. 29, detects vibrations in the frequency band of 50 Hz to 10 kHz, and outputs the vibration waveform as an electric signal. The signal (vibration signal) output by the vibration sensor 421 is amplified by the amplification circuit 427, and the amplified signal is transmitted to the low-pass filter 451. A signal of about 1 kHz or lower, which has been passed through the low-pass filter 451, is transmitted to the signal processor 452. The process performed by the signal processor 452 is the same as the process performed by each signal processor 442-1 to 442-3 in FIG. 31.

According to the ninth embodiment, since only a signal of about 1 kHz or lower is captured and transmitted to the signal processor 452, the output of the sensor unit 420 can be prevented from becoming saturated by a very large signal for which the origin is noise, such as an impulsive sound or a friction sound generated at rail joints, that is not related to the deterioration of the mechanical constituents of the vehicle 401.

Tenth Embodiment

Figure 34:
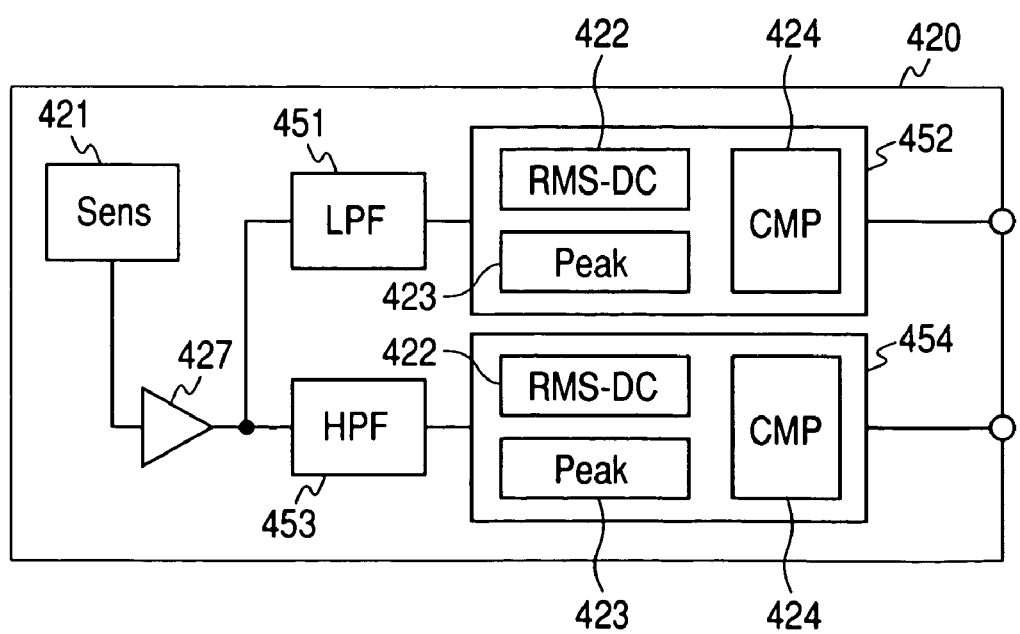
FIG. 34 is a diagram showing a sensor unit according to a tenth embodiment.

FIG. 34 is a block diagram showing a tenth configuration example for the sensor unit 420. In addition to the arrangement in FIG. 33, the sensor unit 420 in FIG. 34 includes a high-pass filter (HPF) 453, for receiving a signal from an amplifier 427; and a signal processor 454, for processing a signal passed through the high-pass filter 453. The arrangement of the signal processor 454 is the same as that of the signal processor 452 on the low-pass filter 451 side. The high-pass filter 453 has a cut-off frequency of 1 kHz. Since only a signal of 1 kHz or higher is transmitted to the signal processor 454, a spot scratch on a bearing can be effectively detected.

Eleventh Embodiment

Figure 35:
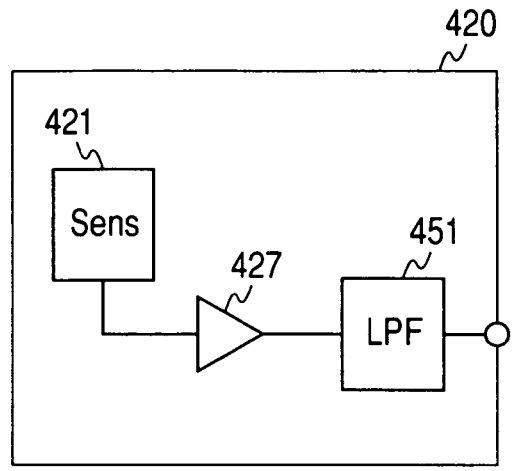
FIG. 35 is a diagram showing a sensor unit according to an eleventh embodiment.

FIG. 35 is a block diagram showing a sensor unit 420 according to an eleventh embodiment. This configuration example is for a case wherein the functions of the RMS calculation circuit 422, the peak detection circuit 423 and the comparator 424 described above are provided for a control panel 430. Only a vibration sensor (Sens) 421, an amplifier 427 and a low-pass filter (LPF) 451 are arranged in the sensor unit 420.

Twelfth Embodiment

Figure 36:
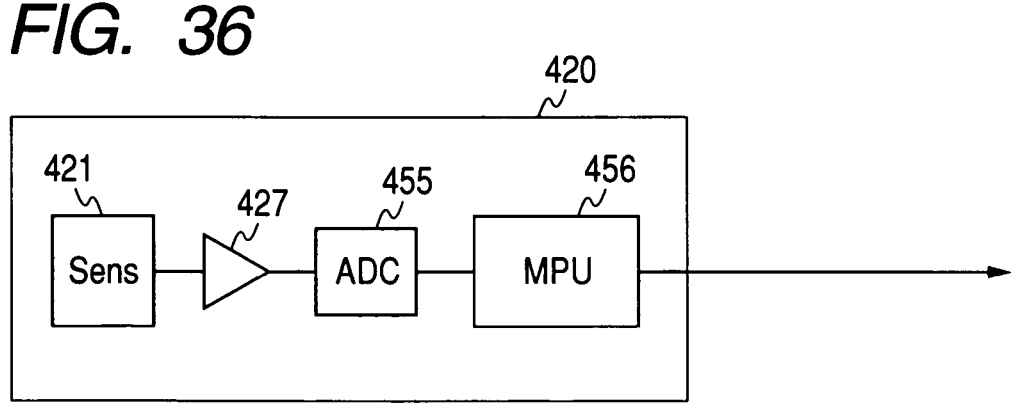
FIG. 36 is a diagram showing a sensor unit according to a twelfth embodiment.

FIG. 36 is a block diagram showing a sensor unit 420 according to a twelfth embodiment. The sensor unit 420 shown in FIG. 36 includes: a vibration sensor (Sens) 421; an amplifier 427; an A/D converter (ADC) 455, for transforming the output of the amplifier 427 into a digital signal; and a micro processor (MPU) 456, for processing the signal received by the A/D converter 455. In accordance with an internally stored program, the MPU 456 performs a digital process for the signal received from the A/D converter 455 so as to serve as the RMS calculation circuit 422, the peak detection circuit 423 and the comparator 424 described above, and also performs the diagnosis process shown in Table 5, as an example. Therefore, according to the configuration example, the diagnosis circuit 431 of the control panel 430 is not required. A DSP (digital signal processor) can also be employed instead of the MPU 456. Further, when a micro processor that incorporates an A/D converter is employed instead of the MPU 456, an external A/D converter 455 can be eliminated.

However, when the operation is to be performed using an MPU or a DSP, the RMS calculation imposes a considerably large process load. For a system that performs fixed-point calculation, saturation tends to occur in the summation of squares, and an instruction for roots is usually not present.

Therefore, when the RMS calculation is considerably complicated and the other processes are comparatively simple, more useful than using an MPU or DSP is that a special digital operation circuit, for which the RMS calculation process efficiency is regarded as preferential, be provided by a field programmable gate array (FPGA). As for the operation circuit that uses the FPGA, the preference relative to the micro computer and the DSP differs, depending on the actual signal processing; however, high speed hardware is demanded, and there is a high probability that the operation circuit can be made smaller than the micro computer circuit. An adder, a multiplier, etc., which are originally mounted on a micro computer, must be written to later for the FPGA. However, looked at from a different angle, the operation function and the peripheral function can be mounted as needed, and downsizing the apparatus and increasing the speed by using parallel processing can be expected.

Thirteenth Embodiment

Figure 37:
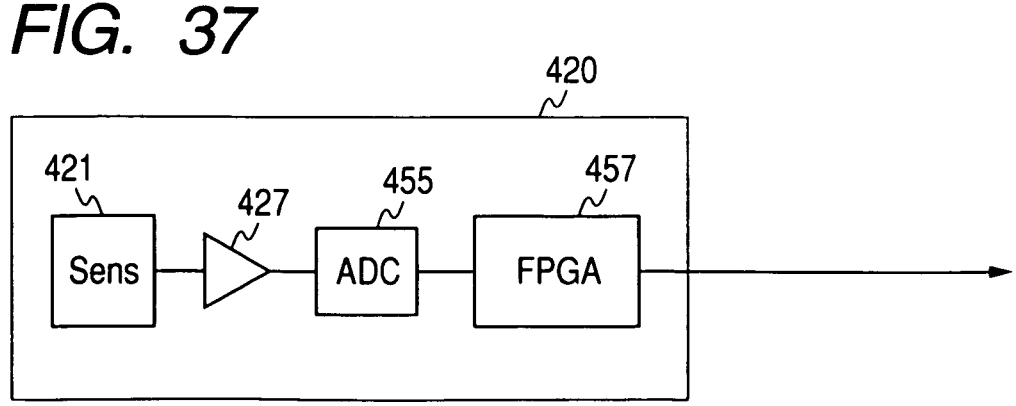
FIG. 37 is a diagram showing a sensor unit according to a thirteenth embodiment.

Therefore, according to a thirteenth embodiment shown in FIG. 37, an FPGA 457 is provided as a special digital circuit that performs a digital process for a signal received from an A/D converter (ADC) 455 in order to serve as the RMS calculation circuit 422, the peak detection circuit 423 and the comparator 424 described above, and also performs a diagnosis process shown in Table 5, as an example. In the explanation for the above embodiment, Peak/RMS (crest factor) has been employed as a parameter that represents deterioration, such as flaking of the bearings 404-1 to 404-4. Instead of this, a kurtosis, a impulse factor (Peak/absolute value average) or a shape factor (RMS/absolute value average) may be employed. It should be noted that the kurtosis is a dimensionless parameter for a basic statistic, and is calculated using the following formula (4).

[Equation 7]

$$\frac{1}{n}\sum_{i=1}^{n}\left(\frac{x_i}{\sigma}\right)^4 \quad (4)$$

$n$: the number of samples (interval length)
$X_i$: $i-th$ actual value (value at time $I$)
$\sigma$: standard deviation For a vibration waveform where the average value is set to 0, $\sigma$ may be equal to the RMS value, and a square circuit included in an RMS circuit can be applied as a fourth power circuit. Therefore, an embodiment wherein a kurtosis is employed instead of the crest factor (Peak/RMS) in the above embodiment can also be provided. That is, an abnormality diagnosis apparatus that employs, instead of the RMS calculation circuit (RMS-DC) 422, a circuit that calculates a kurtosis, a impulse factor or a crest factor is also included in the present invention.

Fourteenth Embodiment

An abnormality diagnosis apparatus according to a fourteenth embodiment will now be described while referring to FIGS. 40 to 45.

As shown in FIG. 40, one railway vehicle 500 is supported by two undercarriages, at the front and the rear, and four wheels 501 are attached to each undercarriage. Vibration sensors 511, for detecting vibrations generated by rotation support devices (bearing housings) 510 while running, are attached to the rotation support devices 510 of the individual wheels 501.

Two abnormality diagnosis apparatus 550 are mounted on a control panel 515 of the railway vehicle 500 to sampling sensor signals for four channels at the same time (substantially the same time) and perform a diagnosis process. That is, signals output by the four vibration sensors 511, which are provided for the individual undercarriages, are transmitted via signal lines 516 to the abnormality diagnosis apparatuses 550 for the different undercarriages. The abnormality diagnosis apparatuses 550 also receive rotation speed pulse signals from a rotation speed sensor (not shown) that detects the rotation speed of the wheels 501.

Figure 41:
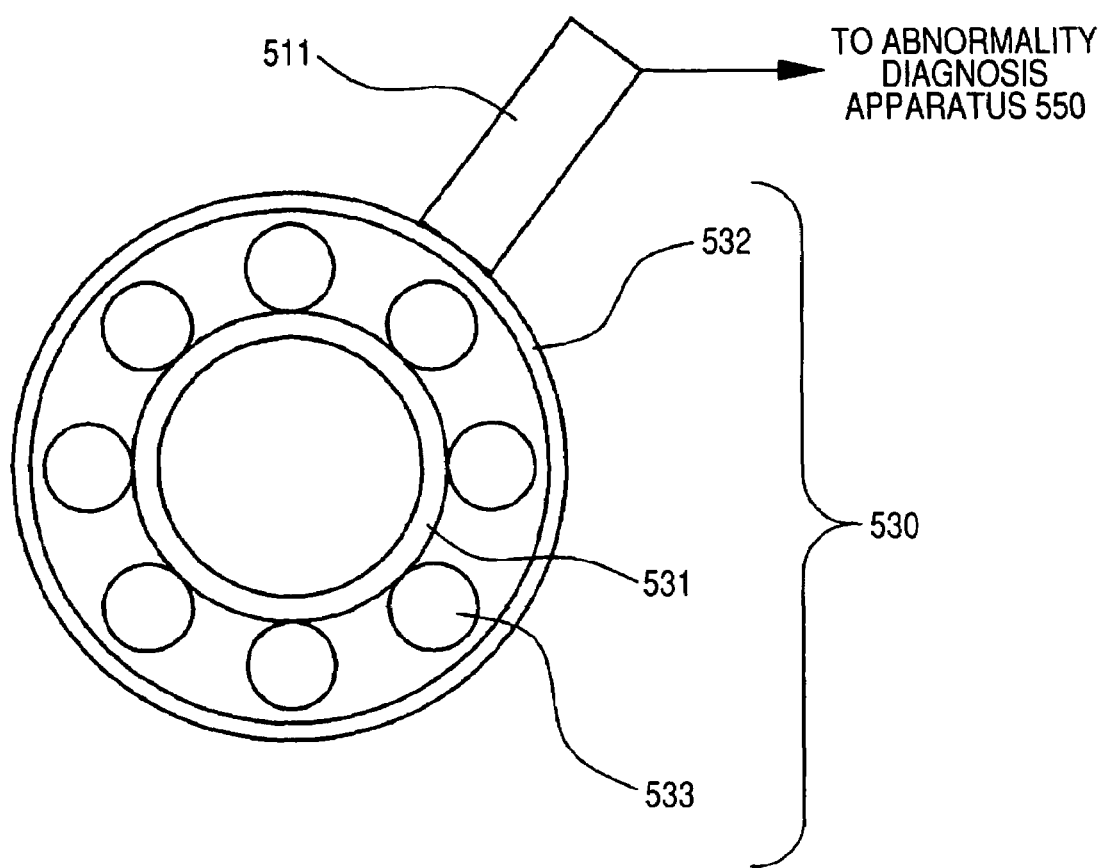
FIG. 41 is a schematic diagram showing an example positional relationship between an axle bearing and a vibration sensor.

As shown in FIG. 41, axle bearings 530, which are example rotary parts, are provided for the rotation support devices 510. Each of the axle bearings 530 include: an inner ring 531, which is a rotation ring fitted over a rotary shaft (not shown); an outer ring 532, which is a fixed ring to be fitted in a housing (not shown); balls 533, which are a plurality of rolling elements located between the inner ring 531 and the outer ring 532; and a cage (not shown), for holding the balls 533 so they roll freely. The vibration sensor 511 is held at the posture to detect the vibration acceleration in the direction of gravity, and is fixed near the outer ring 532 of the housing. Various types of sensors, such as an acceleration sensor, an AE (Acoustic Emission) sensor, an ultrasonic sensor and a shock pulse sensor, can be employed as the vibration sensor 511.

Figure 42:
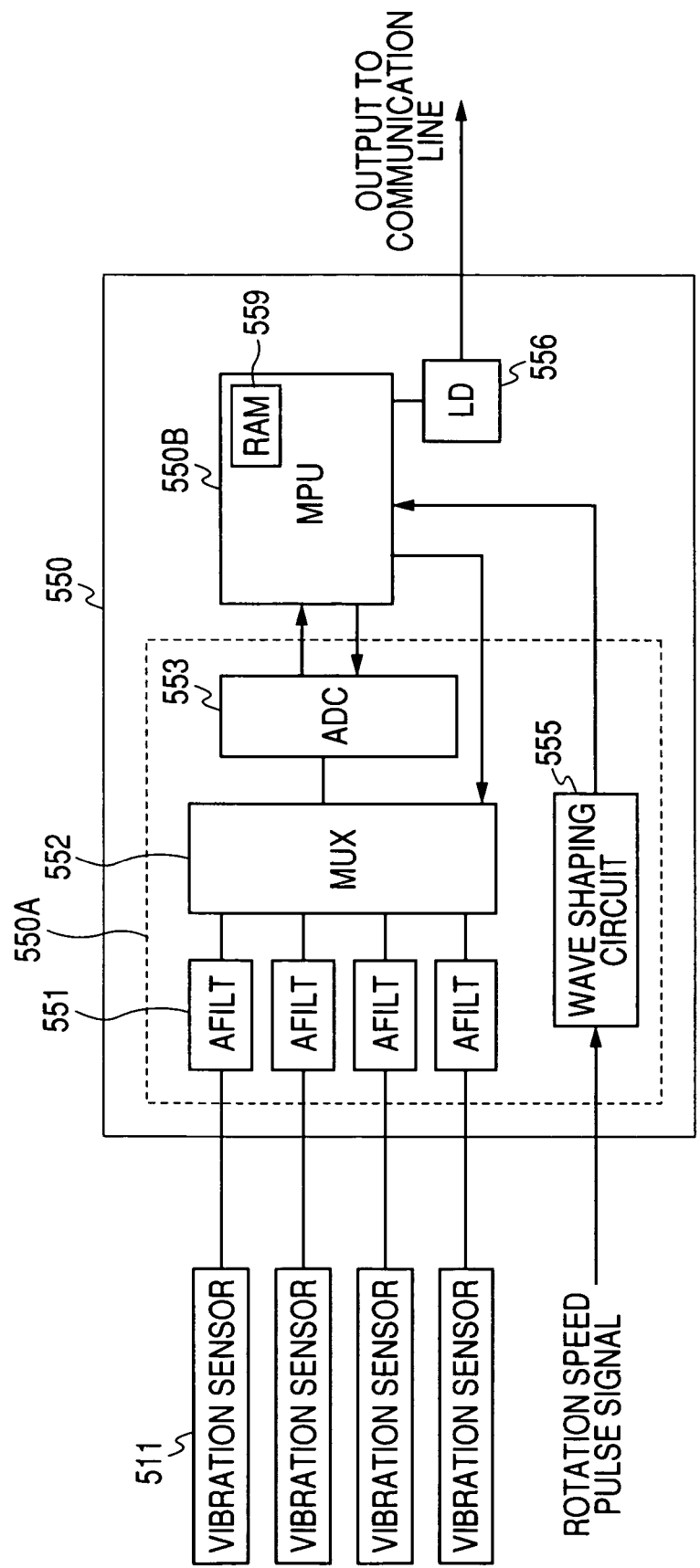
FIG. 42 is a block diagram showing an abnormality diagnosis apparatus according to the fourteenth embodiment of the invention.

As shown in FIG. 42, the abnormality diagnosis apparatus 550 includes: a sensor signal processor 550A and a diagnosis processor (MPU) 550B. The sensor signal processor 550A includes four amplification/filter units (AFILT) 551. And signals output by the four vibration sensors 511 are transmitted separately to the amplification/filter units 551. The amplification/filter units 551 include functions both of an analog amplifier and of an anti-aliasing filter. Analog signals for four channels, which have been amplified and filtered by these four amplification/filter units 551, are switched, in accordance with a signal received from a diagnosis processor (MPU) 550B, to a signal for each channel by a multiplexer (MUX) 552 that serves to perform a switching function. Then, the resultant signal is converted into a digital signal by an AD converter (ADC) 553, and the digital signal is sampled by the diagnosis processor (MPU) 550B. A rotation speed pulse signal, which is transmitted by the rotation speed sensor, is shaped by a wave shaping circuit 555, and pulses per unit time are counted by a timer counter (not shown) and the count value is transmitted as a rotation speed signal to the diagnosis processor (MPU) 550B. The diagnosis processor (MPU) 550B performs an abnormality diagnosis based on the vibration waveforms, detected by the vibration sensors 511, and the rotation speed signal, detected by the rotation speed sensor. The diagnosis results obtained by the diagnosis processor (MPU) 550B are output via a line driver (LD) 556 to a communication line 520 (see FIG. 40). The communication line 520 is connected to an alarm device, which performs an appropriate alarm operation when an abnormality, such as flat of the wheels 501, has occurred.

When the rotation speed signal detected by the rotation speed sensor is almost a predetermined specific speed (in this embodiment, 185 to 370 min$^{-1}$), the diagnosis processor (MPU) 550B processes waveform block data wherein the sampling frequency fs and the sampling count Ns are fixed, and performs the detection of the flat of the wheels 501. Specifically, when fs=2 kHz and Ns=2000, the interval length for the block data=1 sec. The detection of wheel flat is performed as follows. The number of times the vibration waveform pulses due to wheel flat are counted in one second is compared with the number of rotations of the wheels 501 in one second, which is calculated based on the vehicle speed detected by the rotation speed sensor.

In a state wherein the flat of the wheels 501 has occurred, the vibration acceleration is great, and the value of the vibration acceleration generated by the normal vibrations of the vehicle is frequently smaller. Further, vibrations at the rail joints is at the same vibration acceleration level as is wheel flat, or greater. Further, vibration acceleration generated by friction between a rail and the wheels 501 at a curve in the rail is also at the same level as those due to wheel flat and rail joints. The diagnosis processor (MPU) 550B includes a memory (RAM) 559, and can perform FFT and digital filtering at an extremely high speed by using the memory. Therefore, for the vibration sensors 511 for four channels, the real time process (i.e., calculation performed in a short period of time with a considerable time surplus greater than the sampling time) can be performed.

While one shock from wheel flat occurs once each at one rotation, shocks due to rail joints occur over a longer cycle, and shocks due to rail friction occur irregularly. Therefore, for this embodiment, the regularity of the occurrence of a shock (pulse), which exceeds the threshold value of vibration acceleration inherent to wheel flat, is focused on. Then, shock waves generated per unit time at an almost constant speed are counted, and when the count value substantially matches the number of revolutions of the wheels, it is highly probable that wheel flat has occurred, and an abnormality diagnosis is performed.

Further, according to this embodiment, an algorithm is prepared for repetitively performing the diagnosis process for the same wheel 501, and the reliability of the abnormality diagnosis is increased by using a statistical determination method that takes into account variances in the count values for pulses, the affect of noise, etc.

Figure 43:
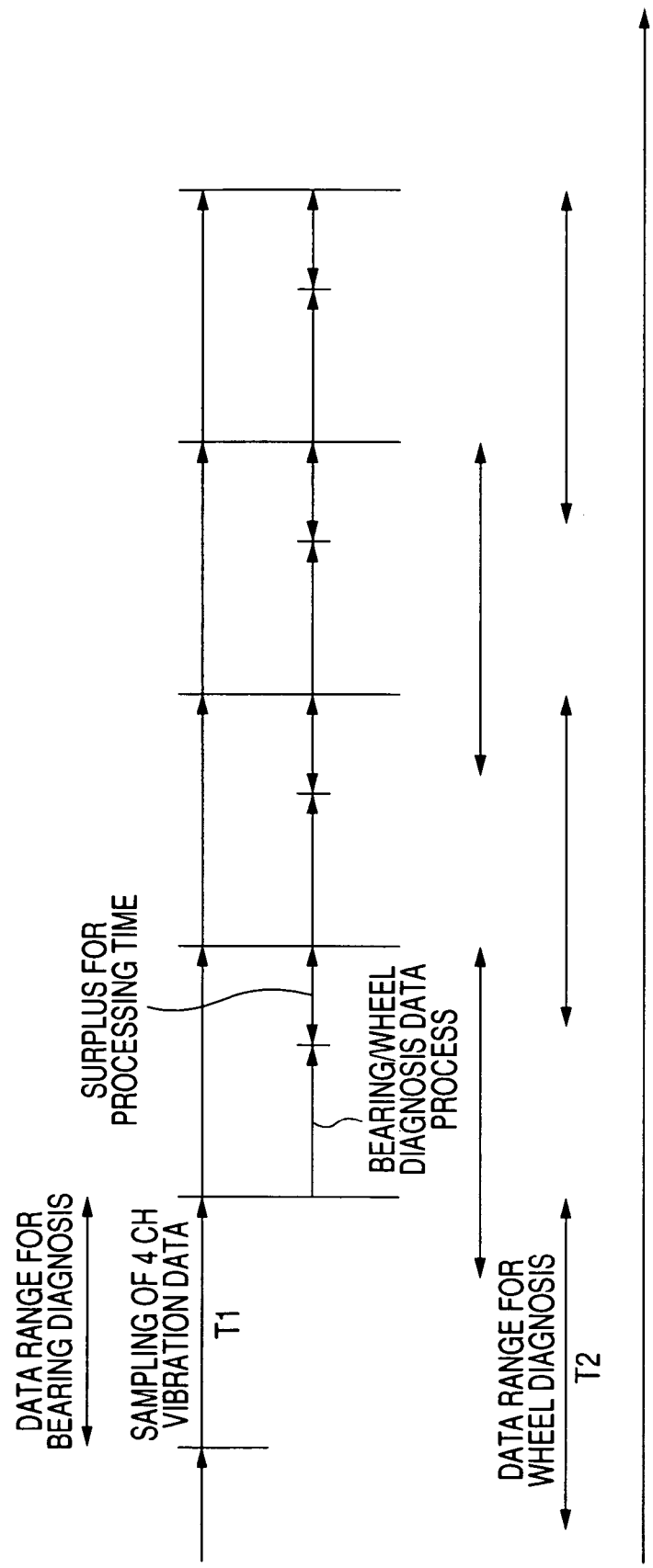
FIG. 43 is a time chart showing the sampling of vibration data for four channels and a data analysis performed by the abnormality diagnosis apparatus.

FIG. 43 is a time chart showing the sampling of vibration data for four channels and data analyzing performed by the abnormality diagnosis apparatus 550. Vibration data are sampled by the abnormality diagnosis apparatus 550 without stopping, and can be divided into predetermined sampling segments in accordance with a diagnosis target. Less than one second is satisfactory for a sampling cycle T1 required for diagnosis (detection of flaking) of the bearing 530, and as short a time as possible is preferable in order to reduce the affect of contact noise generated when the wheel 501 contacts the rail. On the other hand, in order to detect an abnormality on the rolling face of the wheel 501, the shock must be detected each time rotation of the wheel 501 occurs. Therefore, a cycle T2 of about one second, which is longer than the cycle T1, is required.

When the cycle T1 for sampling vibration data for bearing diagnosis is defined, for example, as 0.67 seconds, in consonance with the time required to sample vibration data for four channels, and when a sampling frequency is defined as 20 kHz, data for 4×0.67×20,000 points are sampled during one cycle T1. Therefore, when the cycle T2 for sampling the vibration data for wheel diagnosis is defined as one second, 0.33 second will be insufficient when vibration data are sampled during the cycle T1 for sampling vibration data for bearing diagnosis. Therefore, data equivalent to the last 0.33 seconds in the preceding cycle is added to the data for cycle T1, and the resultant data is used as data for the cycle T2. It should be noted that, as will be described later, since the number of data sets can be reduced in the decimation process after the filtering process, data can be 2000 points or less per one channel. As a result, a period required for performing the diagnosis for the wheels 501 and the bearings 530 for four channels can be shorter than the cycle T1, i.e., 0.67 seconds, so that sufficient time can be allocated for processing the wheel/bearing diagnosis data.

In this embodiment, the diagnosis processor (MPU) 550B performs the vibration data sampling and the wheel/bearing diagnosis data process in parallel. That is, within the cycle T1 for sampling vibration data for four channels, the wheel/bearing diagnosis data process is completed, i.e., a real time process is performed. The real time process is provided in a manner such that the diagnosis processor (MPU) 550B interrupts the multiplexer 552 and the AD converter 553 of the sensor signal processor 550A, and performs data sampling. Further, the real time process can also be provided when a direct memory access controller (DMA) performs data sampling.

As described above, sufficient time is allocated for the processing of the wheel/bearing diagnosis data, and the sampling of vibration data and the processing of the wheel/bearing diagnosis data are performed in parallel. Thus, the loss of data can be avoided. Therefore, reliability is provided for the diagnosis results, which are obtained by performing the statistic process for data that includes the random process due to the irregularity of rails, the shaking of a vehicular body, load fluctuation, etc.

Figure 44:
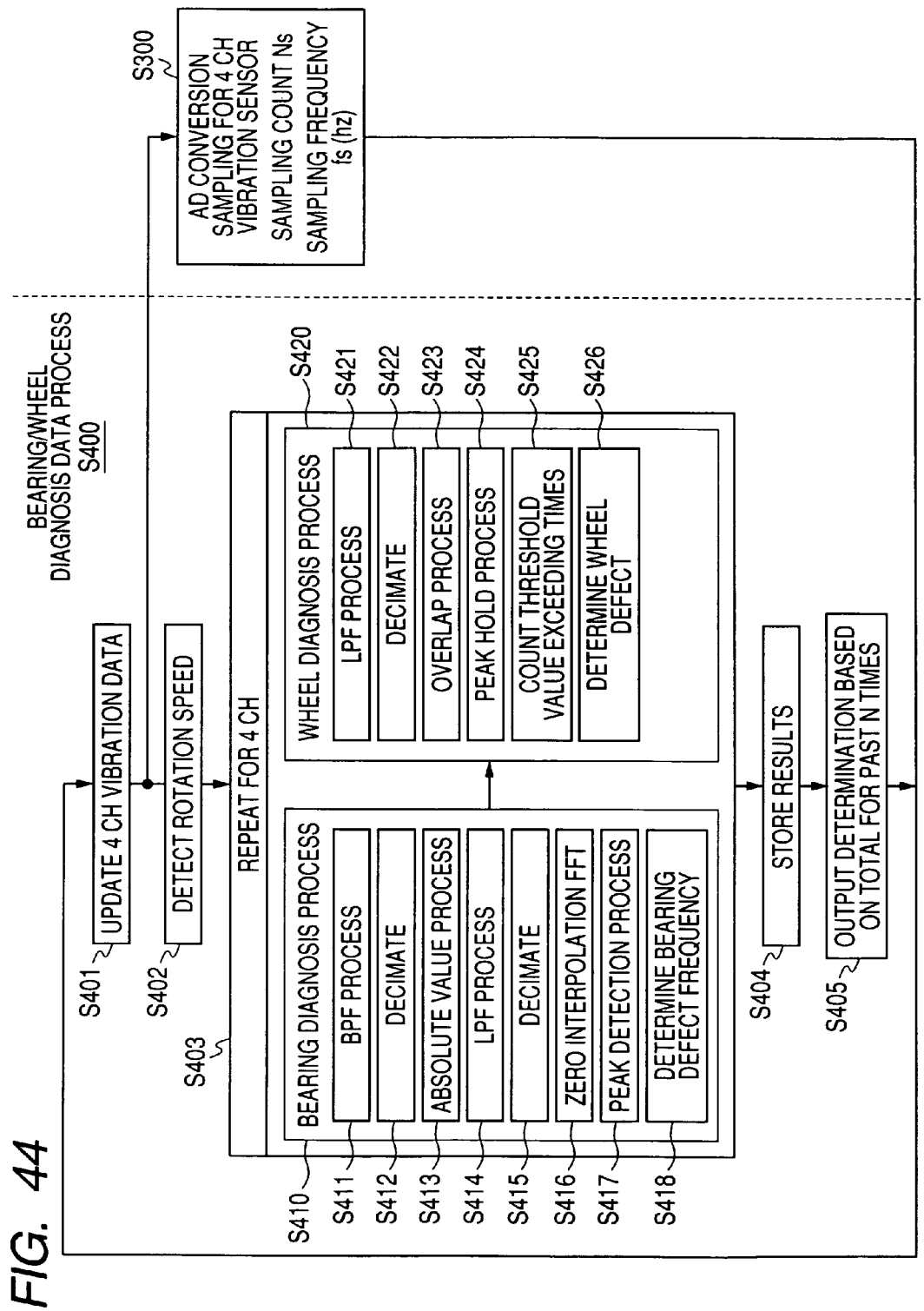
FIG. 44 is a flowchart showing the operational contents of a diagnosis processor in FIG. 42.

FIG. 44 is a flowchart showing the operation of the diagnosis processor (MPU) 550B. The diagnosis processor (MPU) 550B performs the sampling of vibration data, i.e., performs, in parallel, an AD conversion of sensor signals for four channels and sampling (S300), and the bearing/wheel diagnosis data process (S400).

During the wheel/bearing diagnosis data process (S400), each time the vibration data for four channels is updated (S401), the rotation speed detection process (S402), the diagnosis process (S403), the diagnosis results storing and saving process (S404) and the determination results output process (S405) are performed in order.

The rotation speed detection process (S402) is a process for detecting the rotation speed of the bearing 130 based on a signal output by a rotation speed sensor.

The diagnosis process (S403) includes a bearing diagnosis process (S410) and a wheel diagnosis process (S420).

The bearing diagnosis process (S410) is a process for detecting an abnormality in the bearing 530 based on the rotation speed of the bearing 530 and a frequency peak that is obtained by processing the envelope waveform of a vibration. In the bearing diagnosis process (S410), first, the band-pass filter (BPF) process (S411) is performed in which components in a high frequency range (3 kHz or higher) and in a low frequency range (200 Hz or lower) are attenuated, from the sampled vibration data, and vibration data in a middle band is extracted. Then, the decimation process (S412) is performed for the extracted data at a predetermined decimation rate. Thereafter, the absolute value process (S413) and the low-pass filter (S414), for extracting components in a low frequency range (1 kHz or lower), are performed. Then, the decimation process (S415) is further performed for the extracted data, and the zero interpolation fast Fourier transform (FFT) process (S416) is performed, so that frequency data having a resolution of 1 Hz are obtained. The peak detection process (S417) using smooth differentiation is performed for the frequency data, and a comparison of up to the fourth order is performed for the fundamental frequency (see FIG. 45) of the bearing defect that is obtained based on the rotation speed and the internal bearing specifications. Then, whether or not there is a match is determined (S418: bearing defect determination process).

The wheel diagnosis process (S420) is a process for detecting an abnormality of the wheel 501 based on a phenomenon wherein a shock occurs in synchronization with the rotation of the wheel 501. The main factor that causes the shock in synchronization with the rotation of the wheel 501 is the presence of a portion called a flat, which occurs on the rolling face of the wheel 501. During the wheel diagnosis process (S420), first, the low-pass filter (LPF) process (S421) is performed to extract, from the sampled vibration data, a component having a predetermined frequency (1 kHz) or lower. Then, the decimation process (S422) is performed for the extracted data at a predetermined decimation rate. Thereafter, as explained while referring to FIG. 43, in order to obtain data having a longer interval (cycle T2) than one sampling interval (cycle T1), the overlapping process (S423) is performed, during which the last ⅓ of the data in the preceding sampling interval is added to the head of the data in the current sampling interval. Then, from among data obtained through the overlapping process (S423), the peak holding process (S424) is performed for data that exceeds a threshold value in order to obtain an absolute value, so that the value exceeding the threshold value is maintained for a predetermined period ($\tau$) of time. This holding period ($\tau$) is determined in accordance with the rotation speed of the wheel 501, and a value smaller than a value for one rotation of a wheel is selected. The peak holding process for changing the data to obtain an absolute value and to hold the absolute value for a predetermined period enables a stable peak measurement. Thereafter, the number of times the number of pulses exceeds the threshold value is counted (S425: a threshold value exceeding times counting process), and whether the count value matches the number of revolutions of the wheel 501 is determined (S426: a wheel defect determination process).

The bearing diagnosis process (S410) and the wheel diagnosis process (S420) are repeated for the vibration data for four channels that are updated at step S401. That is, each time data is updated, the bearing diagnosis process (S410) and the wheel diagnosis process (S420) are performed four times each. The determination results obtained during the determination processes (S418 and S426) performed each time are stored and saved in the diagnosis processor (MPU) 550B (S404). The diagnosis processor (MPU) 550B holds the results obtained during processes (S418 and S426) retroactive for the past N times, from the latest. Based on the determination results for the N times, the abnormality determination is statistically performed, and the results are output (S405).

That is, according to this embodiment, the occurrence of an abnormality for the axle bearing 530 and the wheels 501 is not determined simply when the defective frequency is matched once, or when the number of rotations of the wheel is matched once. Since the matching of the frequency is based on a random process, a statistic determination based on the total of a plurality of values is required.

As the statistic determination method, generally, an integration average for the spectrum can be employed. According to the determination method used in this embodiment, for the bearing, data that represents, using an integer value, the degree of coincidence for the spectrum is added a plurality of times, e.g., 16 times, and when the sum reaches a reference value, it is determined that an abnormality has occurred, or in the other case, it is determined that an abnormality has not occurred. This is appropriately applied for an abnormality diagnosis for the axle bearing of a railway vehicle. This is done for the following reason. When small flaking has occurred for a bearing, so long as lubrication, sealing, etc., is appropriately provided, this will not develop rapidly and there is little risk that the running of the railway vehicle would be adversely affected, and normally, another means, such as a temperature fuse, can be used to detect the occurrence of an abnormality that may affect the running of the railway vehicle.

As described above, according to the abnormality diagnosis apparatus 550 of this embodiment, the vibration sensor 511 detects vibrations of the axle bearing 530 or of the wheel 501 and the sensor signal processor 550A samples the signal output by the vibration sensor 511, and based on the vibration data, the diagnosis processor (MPU) 550B performs an abnormality diagnosis for of the axle bearing 530 and the wheel 501. At this time, the diagnosis processor (MPU) 550B sequentially samples vibration data from the sensor signal processor 550A, divides the data into intervals for predetermined cycles, and processes the vibration data for one interval as vibration data for a bearing diagnosis. Further, the diagnosis processor (MPU) 550B adds, to the head of the vibration data for one interval, the data for the last predetermined period of time for the preceding interval, and processes the resultant data as vibration data for a wheel diagnosis. As described above, since the vibration data for a bearing diagnosis and the vibration data for a wheel diagnosis are processed separately, it can be determined that the abnormal vibration is due to flat of the wheel 501 or due to the axle bearing 530, and an accurate diagnosis can be performed.

Furthermore, according to the abnormality diagnosis apparatus for this embodiment, sensor signals for four channels are sampled at the same time (substantially at the same time) from the four vibration sensors 511, which are respectively attached to the four rotation support devices 510 on the undercarriages. And for all the channels, a real time process is performed so that the diagnosis data process is completed during a period of time for data sampling. Thus, the loss of data can be avoided, and an extremely reliable abnormality diagnosis can be performed.

Fifteenth Embodiment

Figure 46:
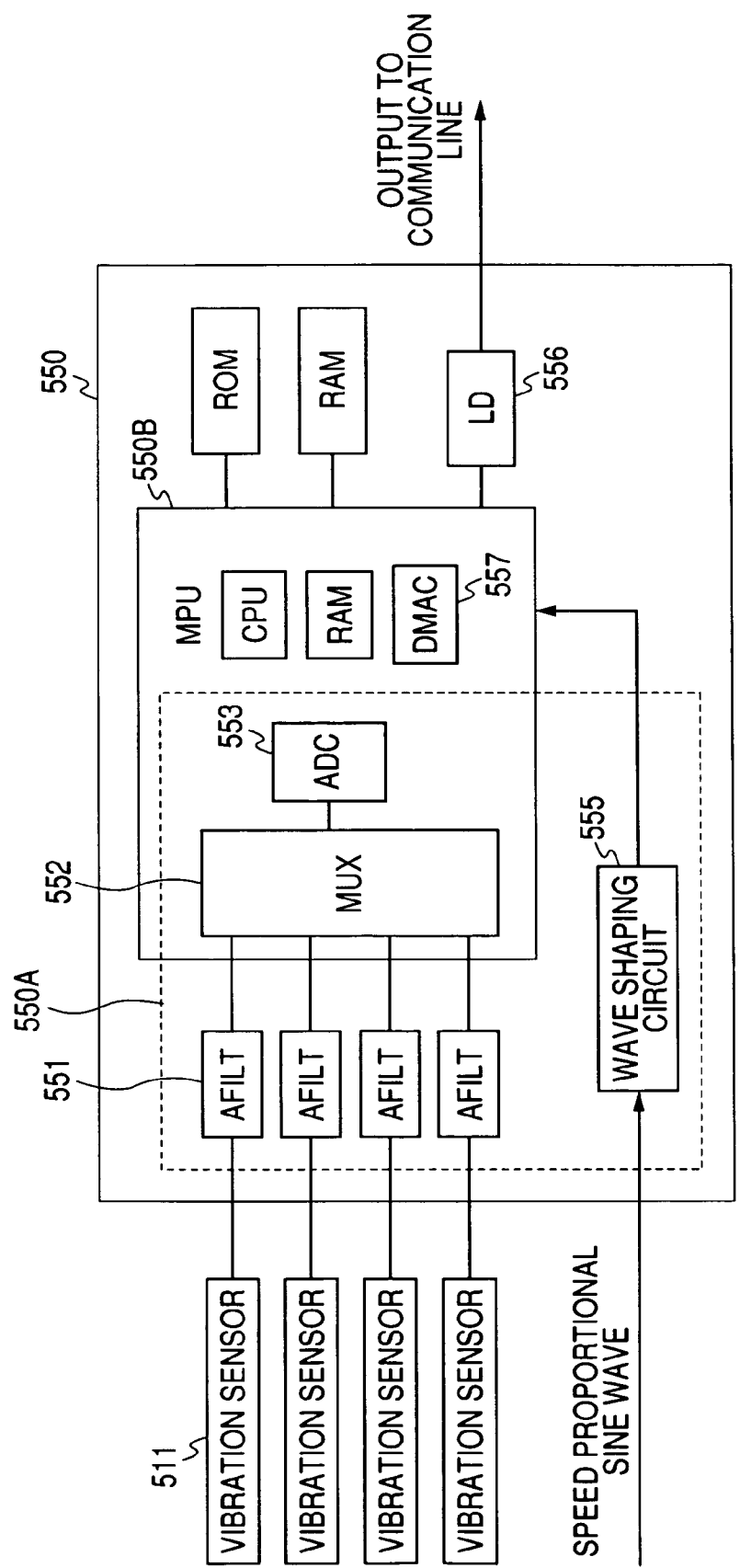
FIG. 46 is a block diagram showing an abnormality diagnosis apparatus according to a fifteenth embodiment of the invention.

FIG. 46 is a block diagram showing a fifteenth embodiment (a modification of the above described fourteenth embodiment). An abnormality diagnosis apparatus 550 employs, as a diagnosis processor 550B, an MPU that includes a multiplexer (MUX) and an AD converter (ADC). That is, the MPU serves to perform one part of the functions of the sensor signal processor 550A. According to this arrangement, the circuit of the abnormality diagnosis apparatus 550 can be simplified, and cooperation with another MPU incorporated circuit, such as a DMA controller (DMAC) 557, can be easily provided by using software. Therefore, more efficient software control than that for the arrangement in the fourteenth embodiment is enabled.

Sixteenth Embodiment

Figure 47:
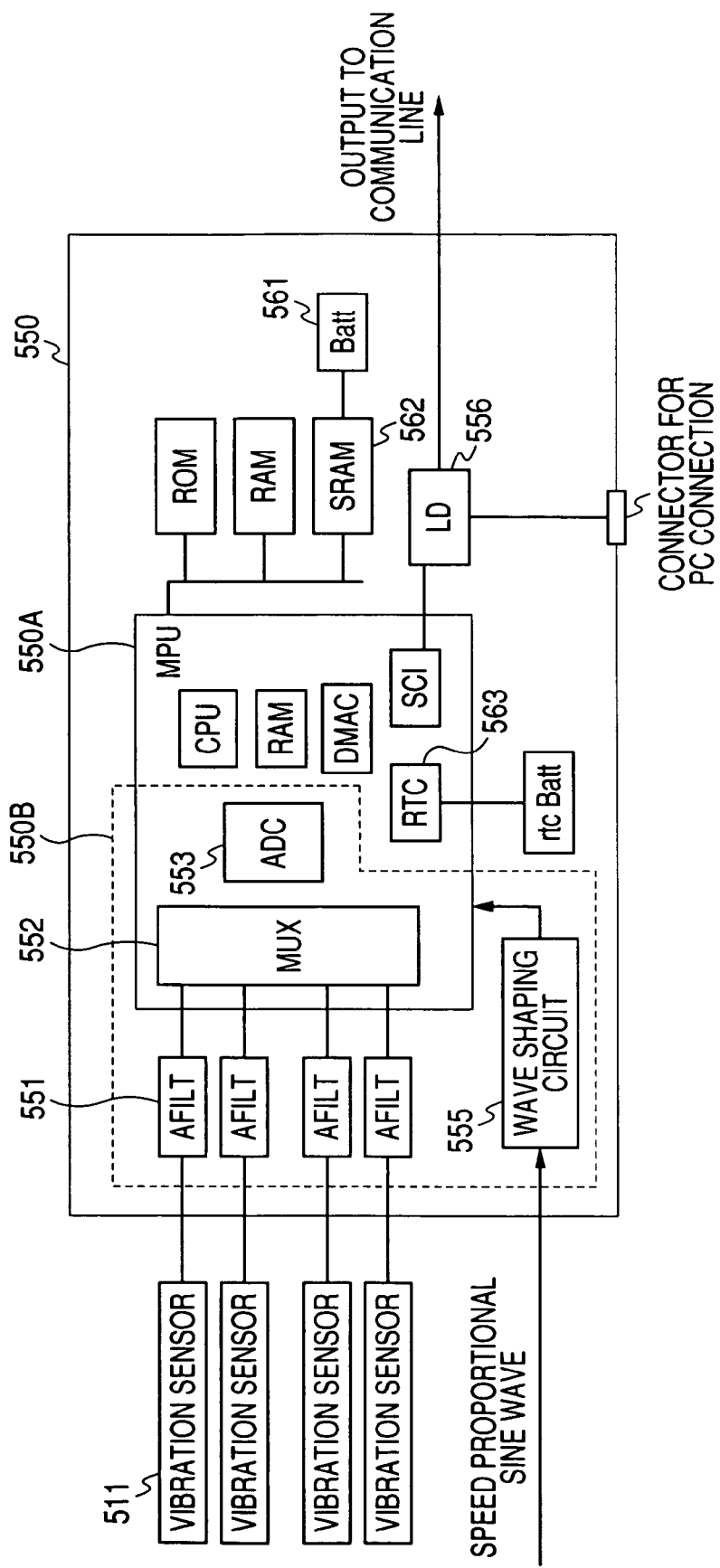
FIG. 47 is a block diagram showing an abnormality diagnosis apparatus according to a sixteenth embodiment of the invention.

FIG. 47 is a block diagram showing a sixteenth embodiment (a modification of the above described fifteenth embodiment). In addition to the arrangement in FIG. 46, this abnormality diagnosis apparatus 550 includes a static random access memory (SRAM) 562 having a backup battery (Batt) 561 as a storage device. Further, since the hardware arrangement that validates an MPU incorporated calendar timer circuit (RTC) 563 is employed, data can be saved upon the occurrence of an abnormality.

Figure 48:
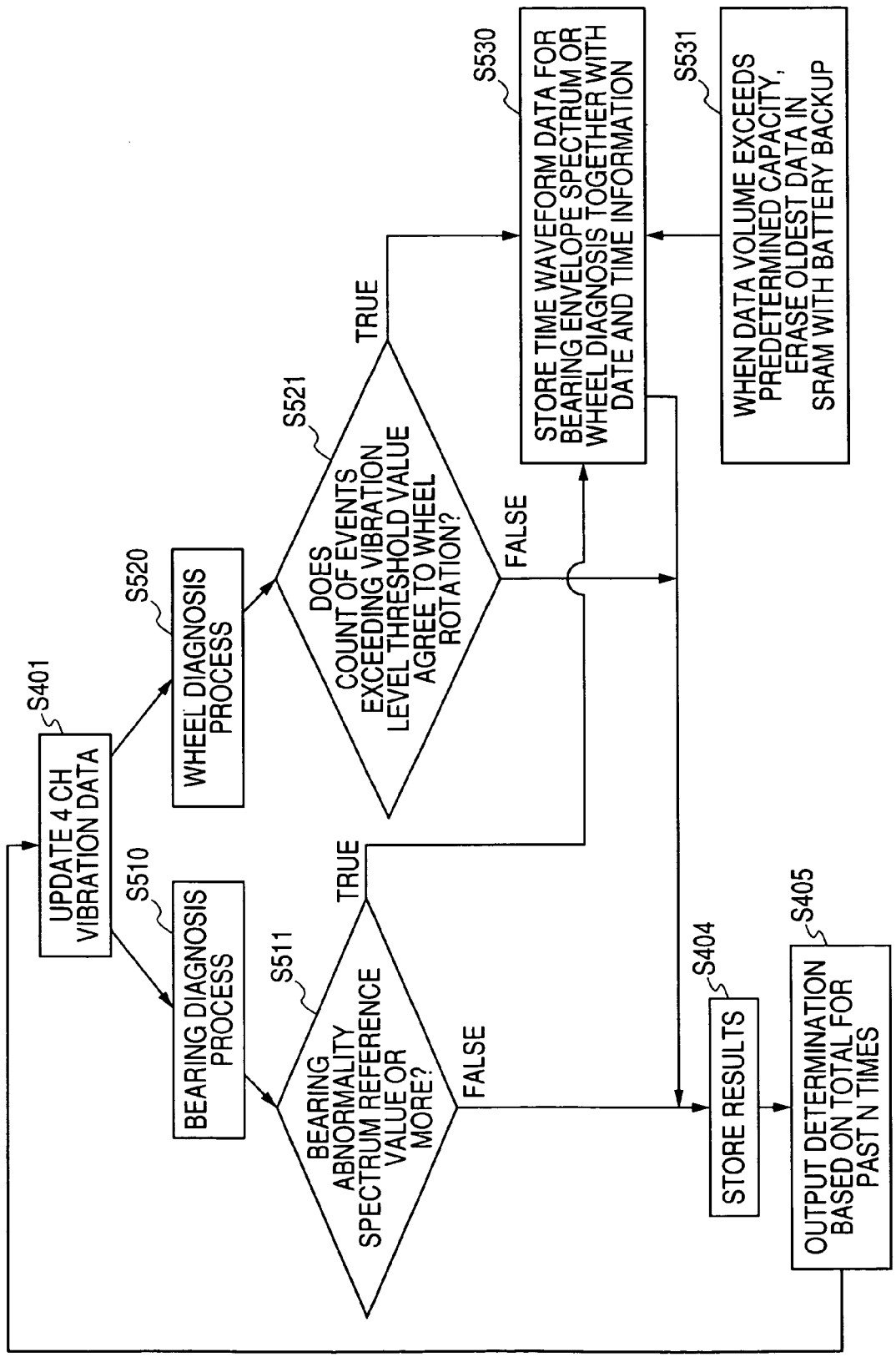
FIG. 48 is a flowchart showing the operational contents of a diagnosis processor in FIG. 47.

In FIG. 48, the contents of the wheel/bearing diagnosis data processing performed by a diagnosis processor 550B for the sixteenth embodiment are shown. Each time vibration data for four channels are updated (S401), the diagnosis processor 550B performs the bearing diagnosis process (S510) and the wheel diagnosis process (S520). Then, a check is performed to determine whether the spectrum intensity of the envelope waveform for bearing vibration, which is obtained during the bearing diagnosis process (S510), is equal to or greater than a reference value (S511). When the spectrum intensity is smaller than the reference value (False at S511), the results obtained during the bearing diagnosis process (S510) are stored and used for finding the total N results (S404). Further, a check is performed to determine whether the count value obtained during the wheel diagnosis process (S520), for events that have exceeded a vibration level threshold value matches the number of rotations of the wheel 501 (S521). When the two do not match (False at S521), the count value is stored and used for finding the total N results (S404).

When the spectrum intensity is equal to or greater than the reference value (True at S511), the spectrum intensity of the envelope waveform for the bearing vibration is stored in the SRAM 562, together with date and time information that is read from the calendar timer circuit (RTC) 563 (S530). Further, when the count value for events that have exceeded the vibration level threshold value matches the number of rotations of the wheel 501 (True at S521), the data for the time waveform used for wheel diagnosis is stored in the SRAM 562, together with date and time information that is read from the calendar timer circuit (RTC) 563 (S530). When the amount of stored data reaches the limit of the storage capacity for the SRAM 562, the oldest data is erased (S531).

According to this embodiment, the alarm process is performed by transmitting the abnormality determination results to an alarm device, and for the contents of the spectrum, etc., data stored in the SRAM 562 are read and transmitted to a maintenance computer, so that the data can be employed as maintenance information for a vehicle.

Seventeenth Embodiment

Figure 49:
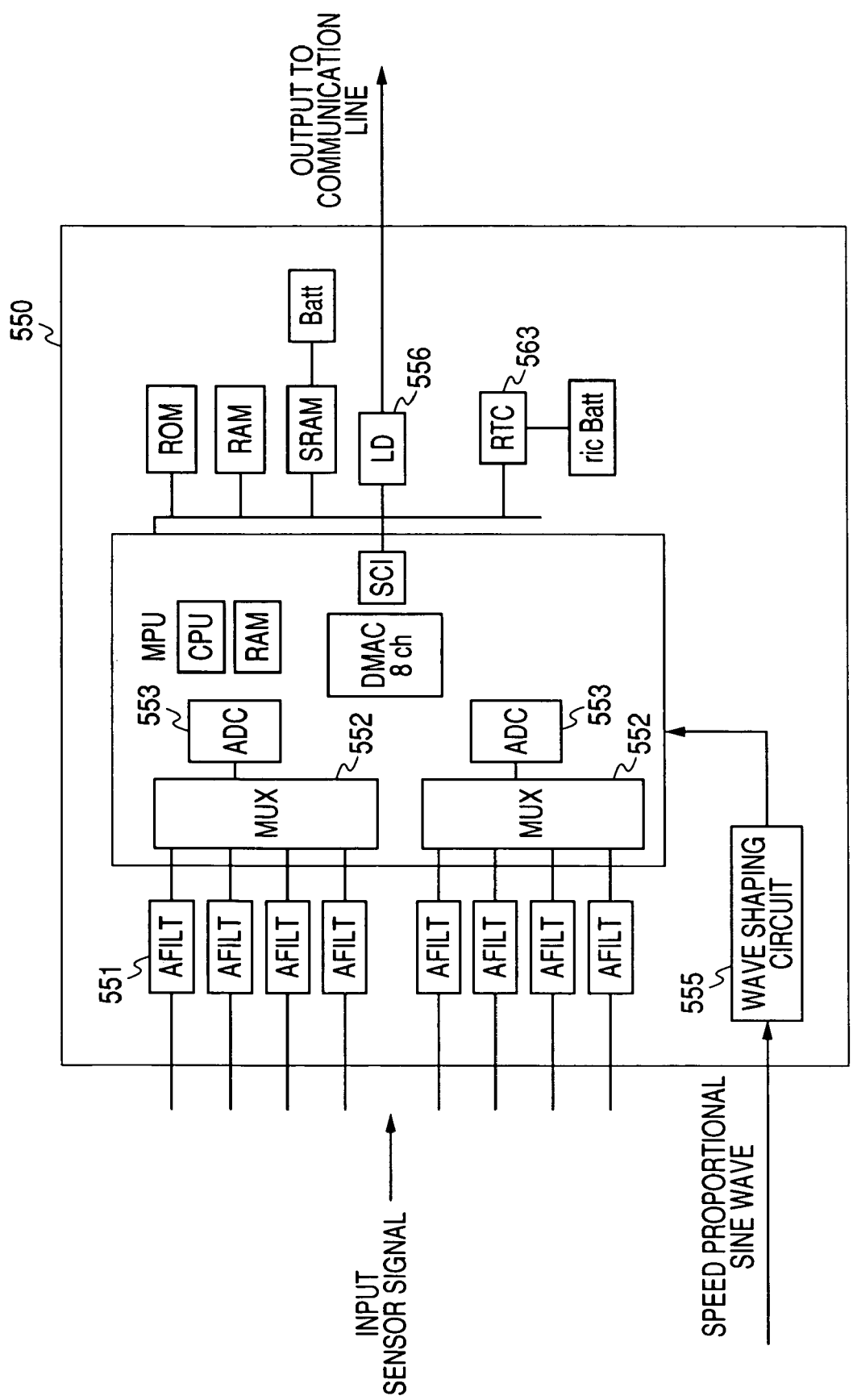
FIG. 49 is a block diagram showing an abnormality diagnosis apparatus according to a seventeenth embodiment of the invention.

FIG. 49 is a block diagram showing a seventeenth embodiment (a modification of the above described sixteenth embodiment). For this abnormality diagnosis apparatus 550, two multiplexers (MUX) 552 and two AD converters (ADC) 553 are provided for an MPU, so that, using one module, a real time diagnosis is enabled using a sensor signal for eight channels. So long as the calculation capability of the MPU is available, an arbitrary number of channels for inputting sensor signals can be increased by increasing the number of AD converters, or by employing an AD converter and a multiplexer having a fast conversion speed. In the example in FIG. 49, a calendar timer circuit (RTC) 563 is not incorporated in the MPU, and instead, a calendar timer circuit supplied with a backup battery (Batt) is externally provided for the MPU.

Eighteenth Embodiment

Figure 50:
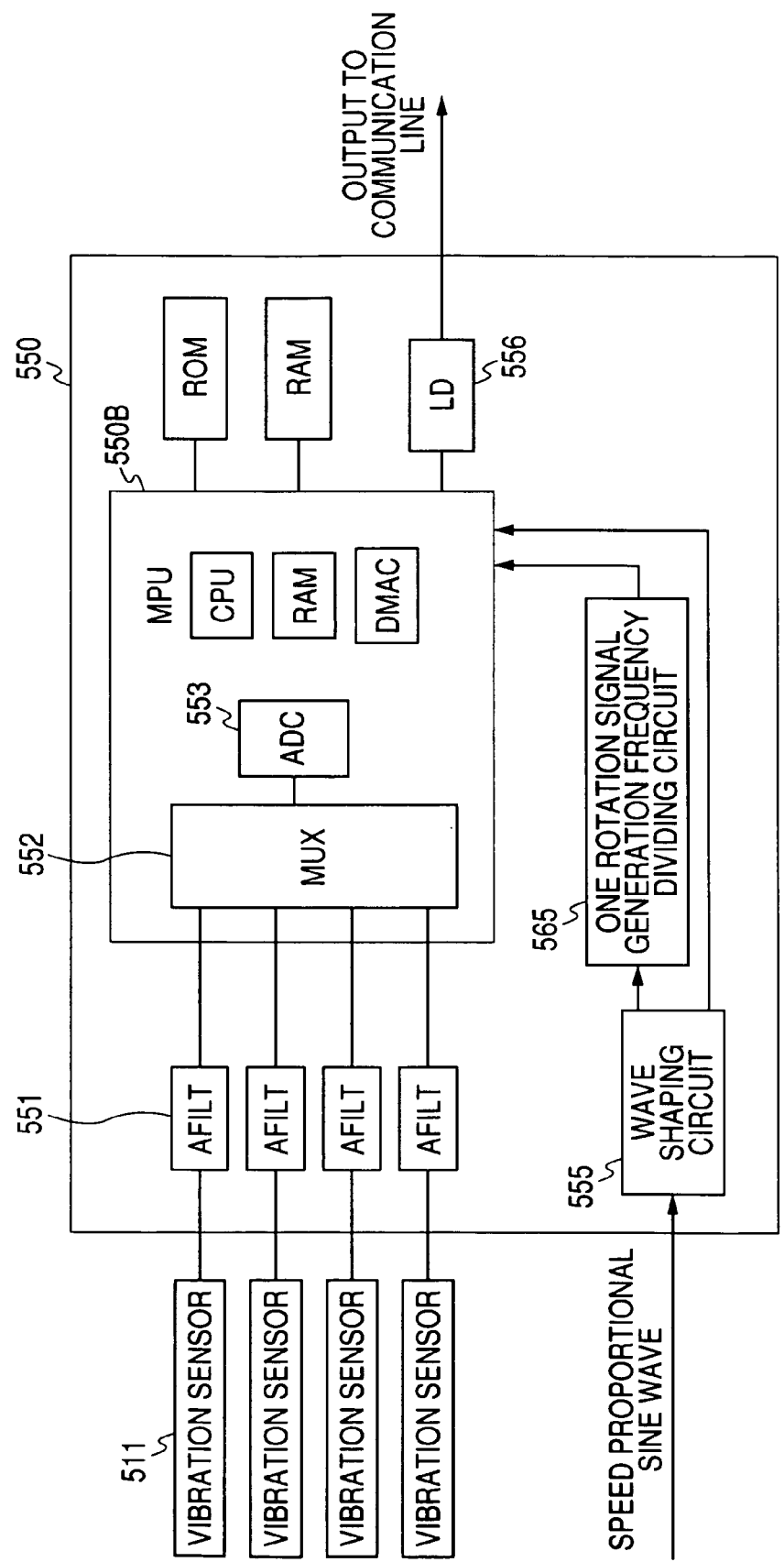
FIG. 50 is a block diagram showing an abnormality diagnosis apparatus according to an eighteenth embodiment of the invention.

FIG. 50 is a block diagram showing an eighteenth embodiment (a modification of the above described fifteenth embodiment). For this abnormality diagnosis apparatus 550, a one-rotation signal generation frequency-dividing circuit 565 is additionally provided for the configuration of the abnormality diagnosis apparatus explained while referring to FIG. 46. The output of a wave shaping circuit 555 is transmitted to a diagnosis processor (MPU) 550B and the one-rotation signal generation frequency-dividing circuit 565. The one-rotation signal generation frequency-dividing circuit 565 divides a rotation count proportional sine wave that has been shaped by the wave shaping circuit 555, and transmits to the diagnosis processor (MPU) 550B a rotation synchronization signal for one pulse per one rotation. In the interval for a predetermined speed, the diagnosis processor (MPU) 550B performs the sampling of data by employing the rotation synchronous signal as a trigger, and performs averaging for the data in order to perform an abnormality diagnosis. Since data are sampled by using, as a trigger, the rotation synchronous signal generated upon each rotation of the wheel 501, and averaging is performed for the sampled data, the components other than the signal synchronized with the rotation of the wheel 501 are canceled, and only the component synchronized with the rotation of the wheel 501 remains. Therefore, detection of flat of the wheel 501 can be accurately performed based on a determination that uses the threshold value of the shock level.

Nineteenth Embodiment

Figure 51:
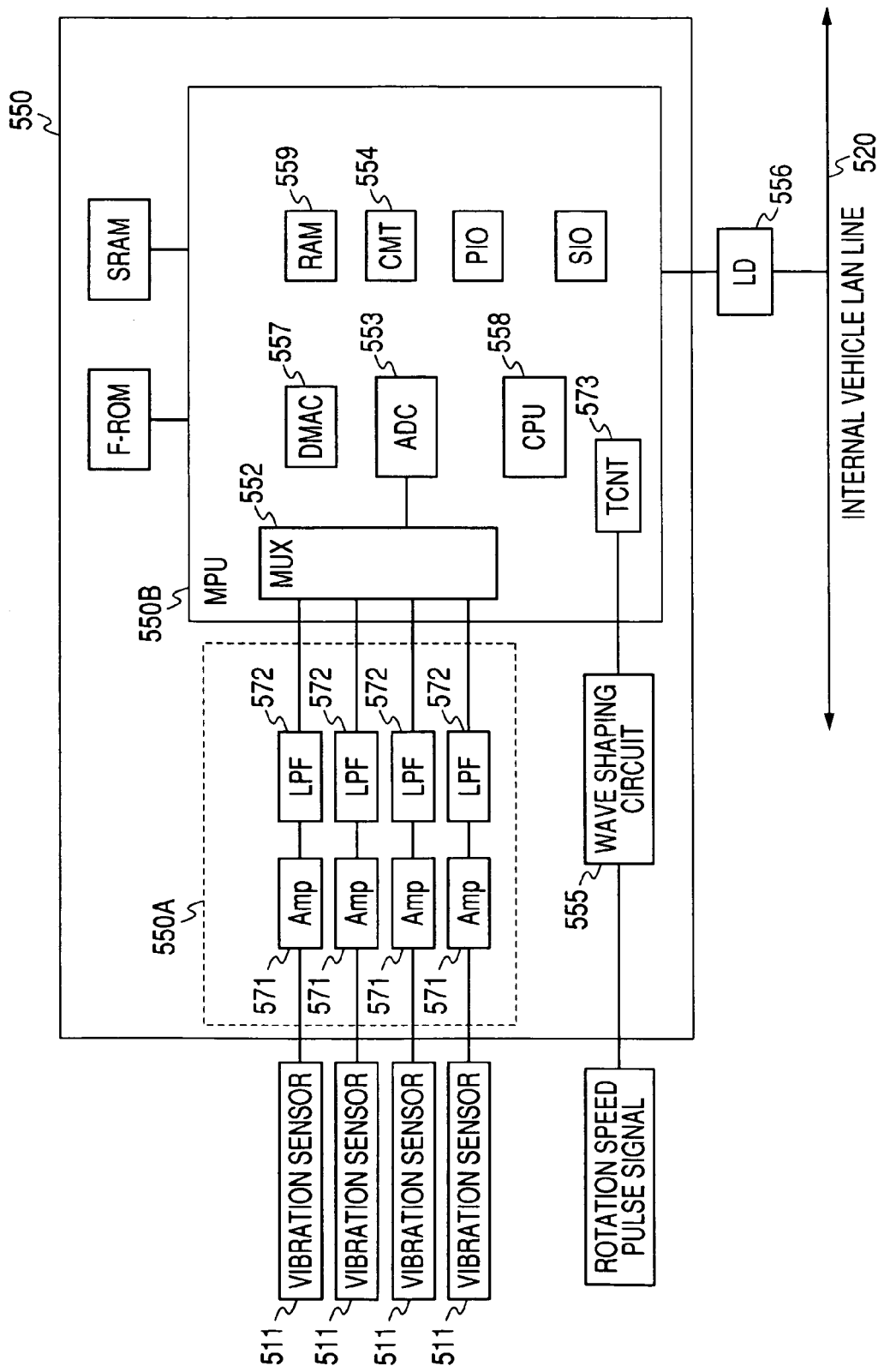
FIG. 51 is a block diagram showing an abnormality diagnosis apparatus according to a nineteenth embodiment of the invention.

FIG. 51 is a block diagram showing a nineteenth embodiment. This abnormality diagnosis apparatus 550 includes a sensor signal processor 550A and a diagnosis processor (MPU) 550B. The sensor signal processor 550A includes one amplifier (Amp) 571 and one filter unit (LPF) 572. And signals (analog signals) output by four vibration sensors 511 are received by the single amplifier (Amp) 571, and are amplified, and the amplified signals are transmitted to the single filter (LPF) 572. That is, the amplifier (Amp) 571 and the filter (LPF) 572 are employed to amplify and filter the signals for four channels output by the four vibration sensors 511. The analog signals that are amplified and filtered by the amplifier (Amp) 571 and the filter (LPF) 572 are sampled by the diagnosis processor (MPU) 550B, and are converted into digital signals by an AD converter (ADC) 553 in the diagnosis processor (MPU) 550B. A rotation speed pulse signal received from a rotation speed sensor is shaped by a wave shaping circuit 555, the shaped signal is sampled by the diagnosis processor (MPU) 550B, pulses per unit time are counted by a timer counter (TCNT) 573 in the diagnosis processor (MPU) 550B, and the obtained value is processed as a rotation speed signal. The diagnosis processor (MPU) 550B performs the abnormality diagnosis based on vibration waveforms detected by the vibration sensors 511 and the rotation speed signal detected by the rotation speed sensor. The diagnosis results obtained by the diagnosis processor (MPU) 550B are output via a line driver (LD) 556 to a communication line 520 (see FIG. 40). The communication line 520 is connected to an alarm device, which performs an appropriate alarm operation when an abnormality, such as flat of the wheel 501, has occurred.

Abnormalities that can be detected from the signal output by the vibration sensor 511 are flaking of an axle bearing 530 and flat (abrasion) of the wheel 501. Both abnormalities can be detected as vibration signals in the frequency range up to near 1 kHz. Therefore, in the nineteenth embodiment, the amplifier (Amp) 571 and the filter (LPF) 572 are employed in order to amplify and filter the signals output by the vibration sensors 511. And after data is filtered by the filter (LPF) 572 and converted by the AD converter (ADC) 553 into a digital signal, through the software process, the obtained digital data is separated into data used for axle bearing diagnosis and data used for wheel diagnosis, so that abnormality diagnoses for the two can be performed.

Among the abnormalities that occur in the axle bearing 530, flaking of the outer ring raceway surface of a stationary ring occurs most frequently. Therefore, for the axle bearing 530, flaking of the outer ring raceway surface of the stationary ring is regarded as a detection target.

The frequency band of the defect differs about 10 times between flaking of the axle bearing 530 and flat of the wheel 501. The rotation speed (sec$^{-1}$) of the wheel 501 is equal to the fundamental frequency of the wheel flat. The range of the rotation speed to be diagnosed is 4 to 10 sec$^{-1}$ (fundamental frequency: 4 to 10 Hz). On the other hand, when a defect is present in the outer ring raceway surface of the stationary ring, the fundamental frequency of the defect is 33 to 83 Hz, even for the same rotation speed range (4 to 40 sec$^{-1}$). When higher harmonic components, up to quartic components, are to be inspected, 4 to 40 Hz for the wheel 501 or 33 to 330 Hz for the axle bearing 530 is the frequency analysis range required for a DFT (Discrete Fourier Transform). The frequency resolution of 1.0 Hz is sufficient for the diagnosis of the axle bearing 530. However, for the diagnosis of the wheel 501, the resolution of 1.0 Hz is not satisfactory, and the affect of the DC component tends to be received in the FFT low range by an offset.

Therefore, according to the nineteenth embodiment, data for a digital signal, which is obtained by the AD converter (ADC) 553 through conversion (sampling), is transformed to two types of data having different sampling frequencies, i.e., one type for an analysis of the flaking of the axle outer ring raceway surface (axle baring diagnosis) and the other for an analysis of the wheel flat (wheel diagnosis).

Figure 52:
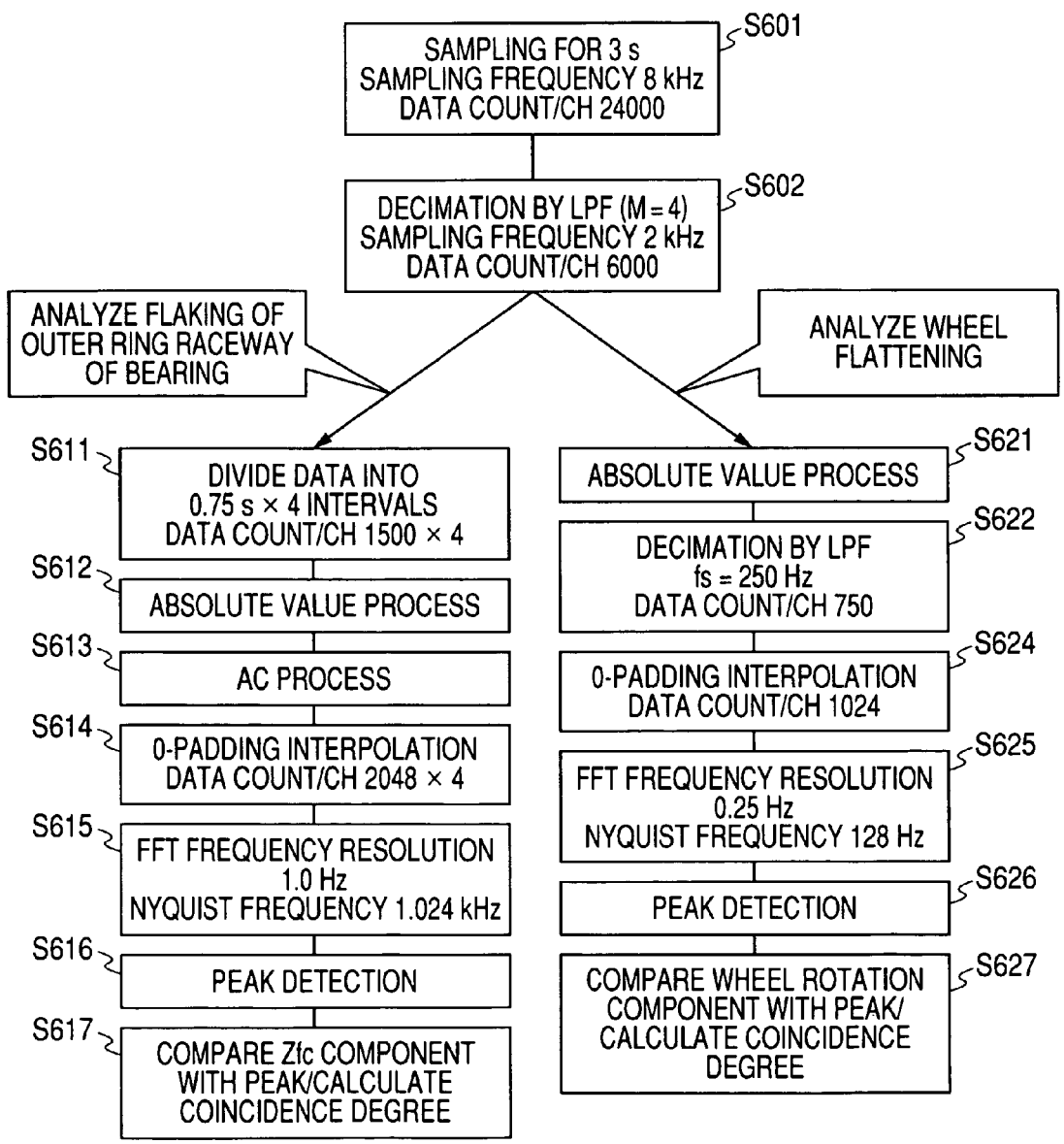
FIG. 52 is a flowchart showing the operation contents for a diagnosis processor of the abnormality diagnosis apparatus according to the nineteenth embodiment of the invention.

FIG. 52 is a flowchart showing the operation of the diagnosis processor (MPU) 550B for the nineteenth embodiment. In the diagnosis processor (MPU) 550B, sensor signals, output by the four vibration sensors 511, are processed via the amplifier (Amp) 571 and the filter (LPF) 572. The resultant signal is sampled and converted into a digital signal by the AD converter (ADC) 553 (S601). The decimation process (S602) is performed for the signal output by the AD converter (ADC) 553 through the FIR low-pass filtering provided by software. In this example, sampling is performed by the AD converter (ADC) 553 for a period of three seconds at a frequency of 8 kHz. Further, during the decimation process (S602), the number of data sets is reduced to ¼ at the decimation rate M of 4 in order to lower the sampling frequency fs to 2 kHz.

Figure 53A:
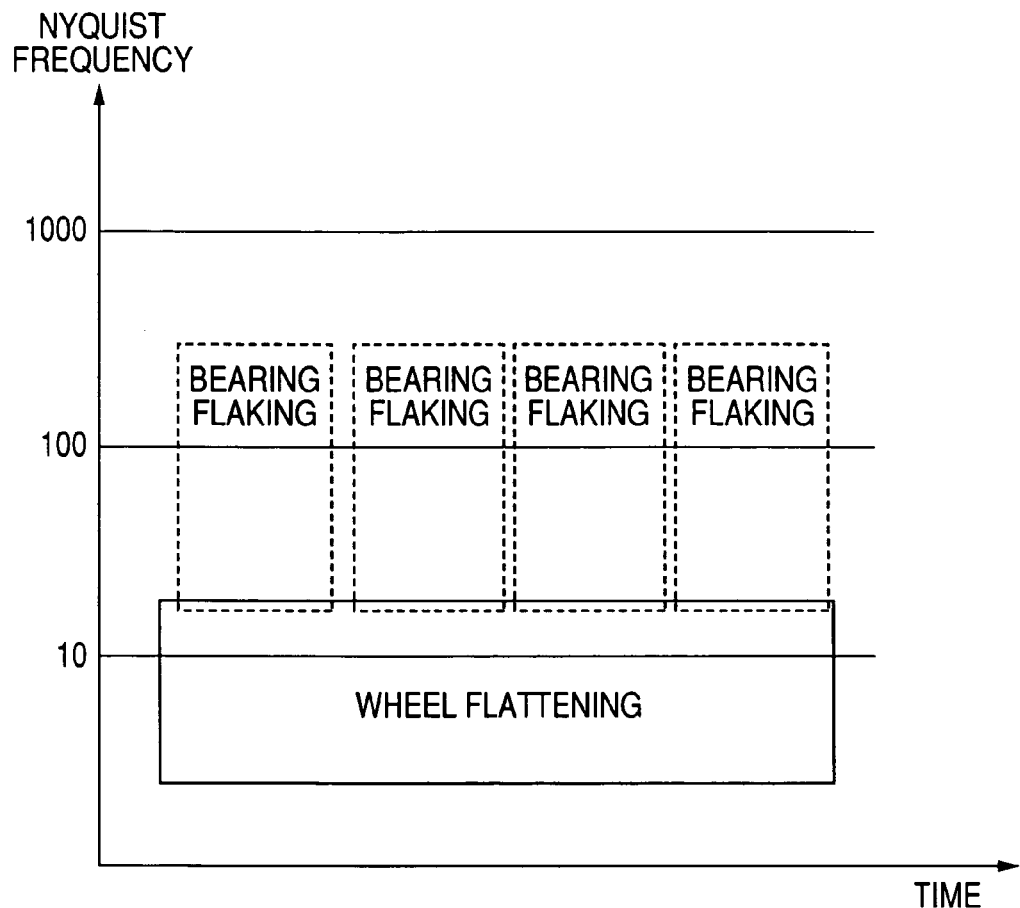
FIG. 53(a) is a conceptual diagram showing the relation on a time-frequency plane between bearing flaking diagnosis data and wheel flat diagnosis data, and (b) is a conceptual diagram showing a relation of a frequency range for a bearing and a wheel.

The diagnosis processor (MPU) 550B converts data obtained during the decimation process (S602) into two types of data having different sampling frequencies, i.e., one for an analysis of the axle outer ring raceway surface (hereinafter referred to as "for bearings") and the other for an analysis of the wheel flat (hereafter referred to as "for wheels") (see FIG. 53(a)).

The data for bearings is obtained when data obtained during the decimation process (S602) is divided into four data intervals of 0.75 seconds each (S611). The absolute value process (S612) and the AC process (S613) are performed for the obtained data. Then, 0 s equivalent to about 0.25 seconds (sec) are added for each interval to define a data interval length of about one second (S614), and a FFT is performed with a frequency resolution of about 1.0 Hz (S615). The number of input data sets for the FFT is 2048. Before the FFT, the Hanning window process is performed. After the FFT, the outer ring defect frequency Zfc is obtained based on the vehicle speed and the bearing specification data, and peak detection is performed from the fundamental wave to the quartic wave (S616). Then, the outer ring defect frequency Zfc is compared with the frequency peak, and the degree of coincidence for the two data is calculated (S617). This process is repeated a specific number of times, and the total of the degrees of coincidence is calculated. Then, based on the total degree, the abnormality determination is performed for the axle bearing 530.

Data for wheels is obtained in the following manner. After the absolute value process (S621) is performed, at the decimation rate M of 8, the filter (LFP) performs the decimation process (S622) for data that indicates a sampling frequency fs of 2 kHz and that is obtained through the decimation process (S602). Then, since the sampling frequency fs is lowered to 250 Hz, the data for wheels is obtained. Since the number of data sets at this time is 750, 0-padding interpolation (S624) is performed to change the data to data for about four seconds, and the FFT is performed at the frequency resolution of about 0.25 Hz (S625). Before the FFT, the Hanning window process is performed. After the FFT, the peak detection is performed (S626). Thereafter, comparison with the frequency peak is performed for the fundamental frequency for the wheel flat and the higher order components (harmonics components) up to the quartic component, and the degree of coincidence for them is calculated (S627). This process is repeated a predetermined number of times, and based on the total of the obtained degrees of coincidence, the abnormality determination for the wheels 501 is performed. The fundamental frequency for the wheel flat is obtained when the timer counter (TCNT) 573 counts pulses for the rotation speed pulse signal per unit.

As described above, one amplifier (Amp) 571 and one filter (LPF) 572 are provided for each of the four vibration sensors 511. And data that is a digital signal obtained by the AD converter (ADC) 553 via the multiplexer (MUX) 552 through conversion (sampling) is changed to two types of data having different sampling frequencies for bearings and for wheels, so that the process including the FFT is performed separately for the two types. Therefore, abnormality diagnoses for bearings and wheels can be accurately and efficiently performed. On the other hand, when the frequency range is examined for bearings and wheels, for which the frequency area differs most in one FFT, an accuracy (resolution) consonant with the calculation cost can not be provided (see FIG. 53(*b*)).

It should be noted that in the above example the greatest part of the digital process is performed by software; however, part or all of the process may be performed by hardware, such as an FPGA (Field Programmable Gate Array).

Twentieth Embodiment

Figure 54:
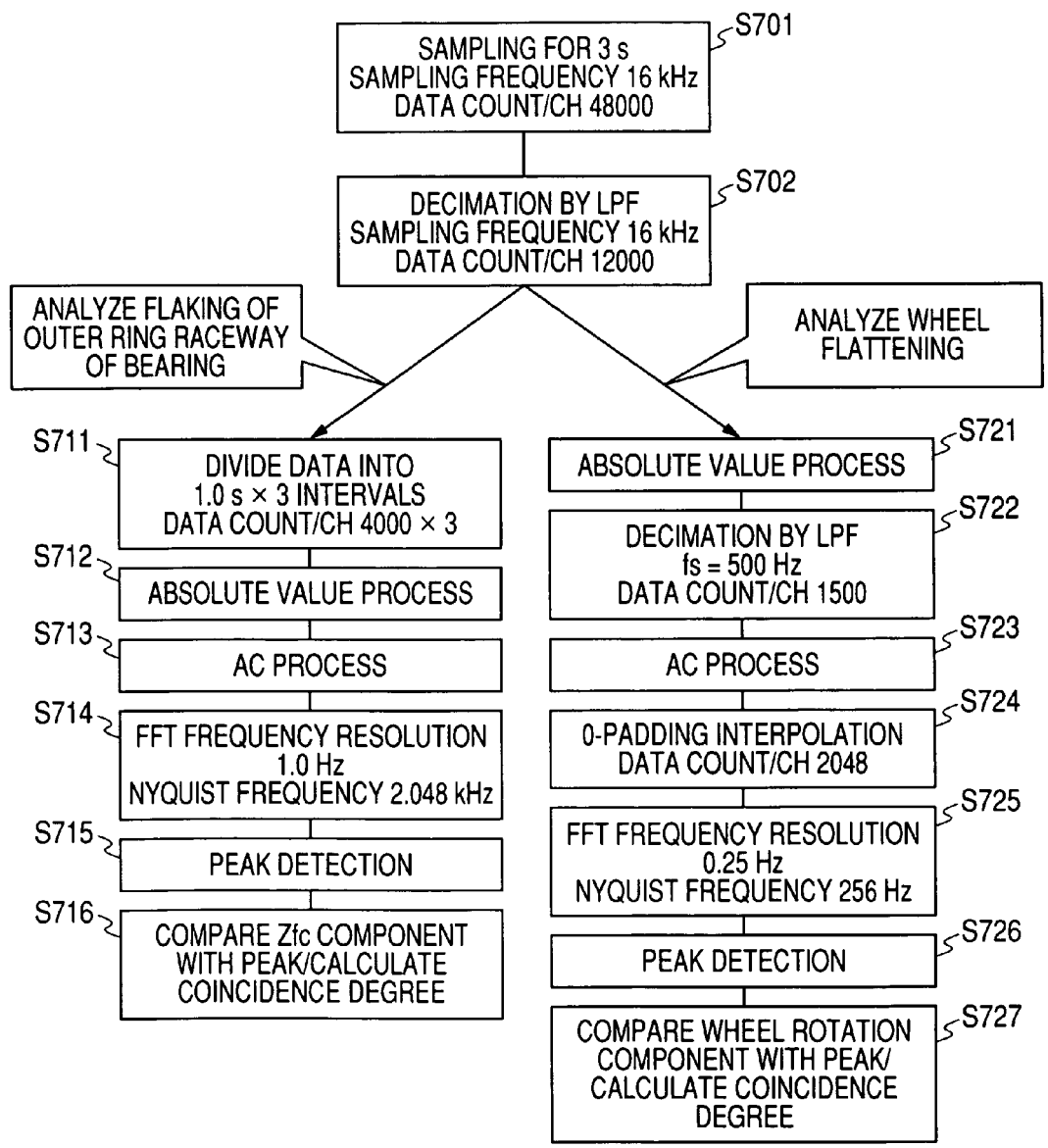
FIG. 54 is a flowchart showing the operation contents for the diagnosis processor of an abnormality diagnosis apparatus according to a twentieth embodiment of the invention.

FIG. 54 is a flowchart showing the operation of a diagnosis processor (MPU) 550B according to a twentieth embodiment. In this example, an AD converter (ADC) 553 performs sampling for an interval of three seconds at a frequency of 16 kHz (S701). Further, during the decimation process (S702), the number of data sets is reduced to ¼ at the decimation rate M of 4 in order to lower the sampling frequency fs to 4 kHz.

Figure 53B:
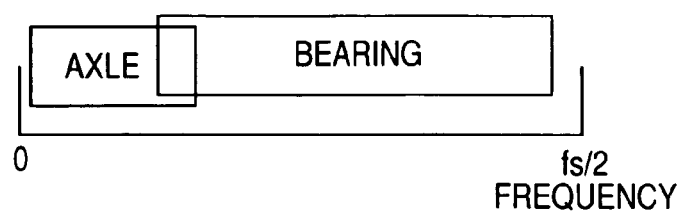

The diagnosis processor (MPU) 550B converts data obtained during the decimation process (S702) into two types of data having different sampling frequencies for bearings and for wheels (see FIG. 53(*a*)).

Data for bearings is acquired when data obtained during the decimation process (S702) is divided into three intervals of 1.0 second each (S711). Then, the absolute value process (S712) and the AC process (S713) are sequentially performed for the obtained data. And the 0-padding interpolation process is completely skipped, or the 0-padding interpolation process is performed so as to interpolate only the fractions, e.g., to interpolate 96 pieces of 0 s for 4000 data sets, and the FFT is performed with a frequency resolution of about 1.0 Hz (S714). Before the FFT, the Hanning window process is performed. After the FFT, the outer ring defect frequency Zfc is obtained based on the vehicle speed and the bearing specification data, and peak detection from the fundamental wave to the quartic wave is performed (S715). Then, the outer ring defect frequency Zfc is compared with the frequency peak, and the degree of coincidence for the two is calculated (S716) This process is repeated a predetermined number of times, and based on the total of the obtained degrees of coincidence, an abnormality determination is performed for the axle bearing 530.

Data for wheels is obtained in the following manner. After the absolute value process (S721) is performed, the filter (LFP) performs the decimation process (S722) for data that indicates the sampling frequency fs of 4 kHz and that is obtained through the decimation process (S702). Then, since the sampling frequency fs is lowered to 500 Hz, the data for wheels is obtained. Thereafter, the AC process (S723) is performed for the obtained data. Then, 0-padding interpolation process (S724) is performed to change the data to data for about four seconds, and the FFT is performed at the frequency resolution of about 0.25 Hz (S725). Before the FFT, the Hanning window process is performed. After the FFT, the peak detection is performed (S726). Thereafter, comparison with the frequency peak is performed for the fundamental frequency for the wheel flat and the higher order components (harmonics components) up to the quartic component, and the degree of coincidence for them is calculated (S727). This process is repeated a predetermined number of times, and based on the total of the obtained degrees of coincidence, abnormality determination for the wheels 501 is performed.

As in the twentieth embodiment, for the bearing data process, since the 0-padding interpolation process is completely skipped, or the 0-padding interpolation process is performed so as to interpolate only the fractions, the number of performances of the FFT process can be reduced. That is, compared with the nineteenth embodiment, the FFT process to be performed during the same period of time is reduced from four times to three times. However, it is better, as in the nineteenth embodiment, for the 0-padding interpolation process to be performed and for the FFT intervals to be separated for each short period of time, because the FFT intervals in which rail noise can be avoided can be increased.

Twenty-First Embodiment

FIGS. 55(*a*) and 55(*b*) are partial block diagrams for a diagnosis processor (MPU) 550B according to a twenty-first embodiment. While referring to FIG. 55(*a*), in the hardware configuration in FIG. 51, an absolute value circuit (ABS) 581 is provided on the front stage (input side) of an AD converter (ADC) 553 of the diagnosis processor (MPU) 550B, and a low-pass filter (LPF) 582 is arranged on the rear stage. While referring to FIG. 55(*b*), in the hardware configuration in FIG. 51, an envelope circuit (ENV) 591 is provided on the front stage (input side) of the AD converter (ADC) 553 of the diagnosis processor (MPU) 550B, and a high-pass filter (HPF) 592 is arranged on the rear stage.

Figure 56:
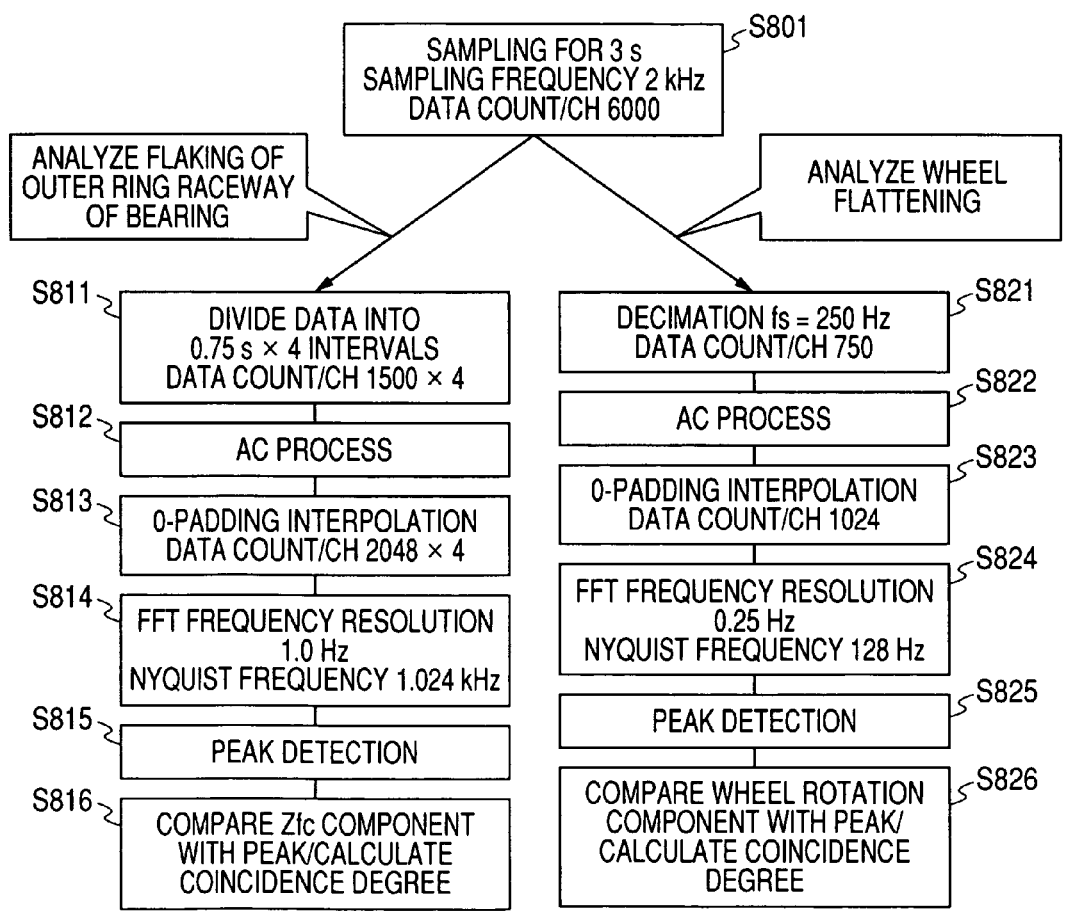
FIG. 56 is a flowchart showing the operation contents for the diagnosis processor of the abnormality diagnosis apparatus for the twenty-first embodiment of the invention.

FIG. 56 is a flowchart showing the operation of the diagnosis processor (MPU) 550B for the twenty-first embodiment. In the diagnosis processor (MPU) 550B, sensor signals are output by four vibration sensors 511, and are processed via amplifiers (Amp) 571 and filters (LPF) 572. The AD converter (ADC) 553 samples these signals and converts them into a digital signal (S801). In this example, the AD converter (ADC) 553 performs sampling for a period of three seconds at a frequency of 2 kHz. Data for bearings is acquired when data obtained via the low-pass filter 582, through the AD conversion, are divided into four and are separated into data intervals of 0.75 seconds (S811). Then, the AC process (S812) is performed for the obtained data. And 0 s equivalent to about 0.25 seconds (sec) are added for one interval to define a data interval length of about one second (S813: 0-padding interpolation), and the FFT is performed with a frequency resolution of about 1.0 Hz (S814). Before the FFT, the Hanning window process is performed. After the FFT, the outer ring defect frequency Zfc is obtained based on the vehicle speed and the bearing specification data, and peak detection from the fundamental wave to the quartic wave is performed (S815). Then, the outer ring defect frequency Zfc is compared with the frequency peak, and the degree of coincidence for the two is calculated (S816). This process is repeated a predetermined number of times, and based on the total of the obtained degrees of coincidence, the abnormality determination is performed for the axle bearing 530.

Data for wheels is obtained in the following manner. The absolute value circuit 581 performs the absolute value process for sensor signals output by the vibration sensors 111, and the resultant signals are sampled at 2 kHz. Then, at the decimation rate M of 8, the decimation process (S821) is performed for the data so as to lower the sampling frequency fs to 250 Hz. In this manner, the data for wheels is obtained. Thereafter, the AC process (S822) is performed for the obtained data. Then, 0-padding interpolation (S823) is performed to change the data to data for about four seconds, and the FFT is performed at the frequency resolution of about 0.25 Hz (S824). Before the FFT, the Hanning window process is performed. After the FFT, the peak detection is performed for the fundamental frequency and the higher order components (harmonics components) up to the quartic component (S825). Thereafter, comparison with the frequency peak is performed for the fundamental frequency for the wheel flat and the higher order components (harmonics components) up to the quartic component, and the degree of coincidence for them is calculated (S826). This process is repeated a predetermined number of times, and based on the total of the obtained degrees of coincidence, the abnormality determination for the wheels 501 is performed.

According to the twenty-first embodiment, the decimation process (S602) and the absolute value process (S612), which are performed by software in FIG. 52, are performed by hardware that can provide high-speed processing. Therefore, software signal processing is simplified. When the sampling frequency fs used by the AD converter (ADC) 553 is lowered ¼, from 8 kHz in the case of FIG. 52 to 2 kHz, accurate and efficient abnormality determination is still enabled.

Twenty-Second Embodiment

First, an abnormality diagnosis apparatus according to a twenty-second embodiment will be described while referring to FIGS. 40, 41, 45, 51, 57 and 58.

As shown in FIG. 40, one railway vehicle 500 is supported by two front and rear undercarriages, and four wheels 501 are attached to each undercarriage. Vibration sensors 511, for detecting vibrations generated by rotation support devices (bearing housings) 510 during running, are attached to the rotation support devices 510 of the individual wheels 501.

Two abnormality diagnosis apparatuses 550 are mounted on a control panel 515 of the railway vehicle 500 to sample sensor signals for four channels at the same time (substantially the same time) and perform the diagnosis process. That is, signals output by the four vibration sensors 511, which are provided for the individual undercarriages, are transmitted via signal lines 516 to the abnormality diagnosis apparatuses 550 for the different undercarriages. The abnormality diagnosis apparatuses 550 also receive rotation speed pulse signals from a rotation speed sensor (not shown) that detects the rotation speed of the wheels 501.

As shown in FIG. 41, axle bearings 530, which are example rotary parts, are provided for the rotation support devices 510. Each of the axle bearings 530 include: an inner ring 531, which is a rotation ring fitted over a rotary shaft (not shown); an outer ring 532, which is a fixed ring to be fitted in a housing (not shown); balls 533, which are a plurality of rolling elements located between the inner ring 531 and the outer ring 532; and a cage (not shown), for holding the balls 533 so they could roll freely. The vibration sensor 511 is held at the posture to detect the vibration acceleration in the direction of the gravity, and is fixed near the outer ring 532 of the housing. Various types of sensors, such as an acceleration sensor, an AE (Acoustic Emission) sensor, an ultrasonic sensor and a shock pulse sensor, can be employed as the vibration sensor 511.

As shown in FIG. 51, the abnormality diagnosis apparatus 550 includes a sensor signal processor 550A and a diagnosis processor (MPU: Micro Processing Unit) 550B. The sensor signal processor 550A includes one amplifier (Amp) 571 and one filter unit (LPF) 572 for one vibration sensor 511, i.e., four amplifiers (Amp) 571 and four filters (LPF) 572. And signals (analog signals) output by the four vibration sensors 511 are respectively received by the amplifiers (Amp) 571, and are amplified, and the amplified signals are respectively transmitted to the filters (LPF) 572. The analog signals that are amplified and filtered by the amplifiers (Amp) 571 and the filters (LPF) 572 are sampled by the diagnosis processor (MPU) 550B, and are converted into digital signals by an AD converter (ADC) 553 via a multiplexer (MUX) 552 in the diagnosis processor (MPU) 550B. A rotation speed pulse signal received from a rotation speed sensor is shaped by a wave shaping circuit 511, the shaped signal is sampled by the diagnosis processor (MPU) 550B, pulses per unit time are counted by a timer counter (TCNT) 573 in the diagnosis processor (MPU) 550B, and the obtained value is processed as a rotation speed signal. The diagnosis processor (MPU) 550B performs the abnormality diagnosis based on vibration waveforms detected by the vibration sensors 511 and the rotation speed signal detected by the rotation speed sensor. The diagnosis results obtained by the diagnosis processor (MPU) 550B are output via a line driver (LD) 556 to a communication line 520 (see FIG. 40). The communication line 520 is connected to an alarm device, which performs an appropriate alarm operation when an abnormality, such as flat of the wheel 501, has occurred.

Abnormalities that can be detected from the signal output by the vibration sensor 511 are flaking of an axle bearing 530 and flat (abrasion) of the wheel 501. The diagnosis of the axle bearing 530 will be described. Among the abnormalities that occur in the axle bearing 530, flaking of the outer ring raceway surface of a stationary ring occurs most frequently. Therefore, for the axle bearing 530, flaking of the outer ring raceway surface of the stationary ring is regarded as a detection target.

In this embodiment, the amplifiers (Amp) 571 and the filter (LPF) 572 are employed in order to amplify and filter the signals output by the vibration sensors 511. After the data is filtered by the filter (LPF) 572 and is converted by the AD converter (ADC) 553, the obtained digital signal is processed by the operation function provided by software, and an abnormality diagnosis is performed based on the signal output by each vibration sensor 511.

The signals output by the vibration sensors 511 are passed through the amplifiers (Amp) 571 and the filters (LPF) 572, and are transmitted to the AD converter (ADC) 553 of the diagnosis processor (MPU) 550B. In this embodiment, the resolution of the AD converter (ADC) 553 is eight bits. The diagnosis processor (MPU) 550B reads vibration data as a value of eight bits. Further, the sampling frequency of the AD converter (ADC) 553 is fixed, and in order to prevent imposing a load on the CPU 558, a compare match timer (CMT) 554 and a direct memory access controller (DMAC) 557 are employed. The sampling frequency is 8 kHz. The filters (LPF) 572 also serve as anti-aliasing filters, and reduce the high frequency range of 1 kHz.

The input range of the AD converter (ADC) 553 is 0 to 3.3 V. The vibration sensors 511, the amplifiers (Amp) 571 and the filters (LPF) 572 are so designed that the vibration waveform matches the input range of the AD converter (ADC) 553, and the voltage in the center of the vibration waveform is 1.65 V.

Figure 57:
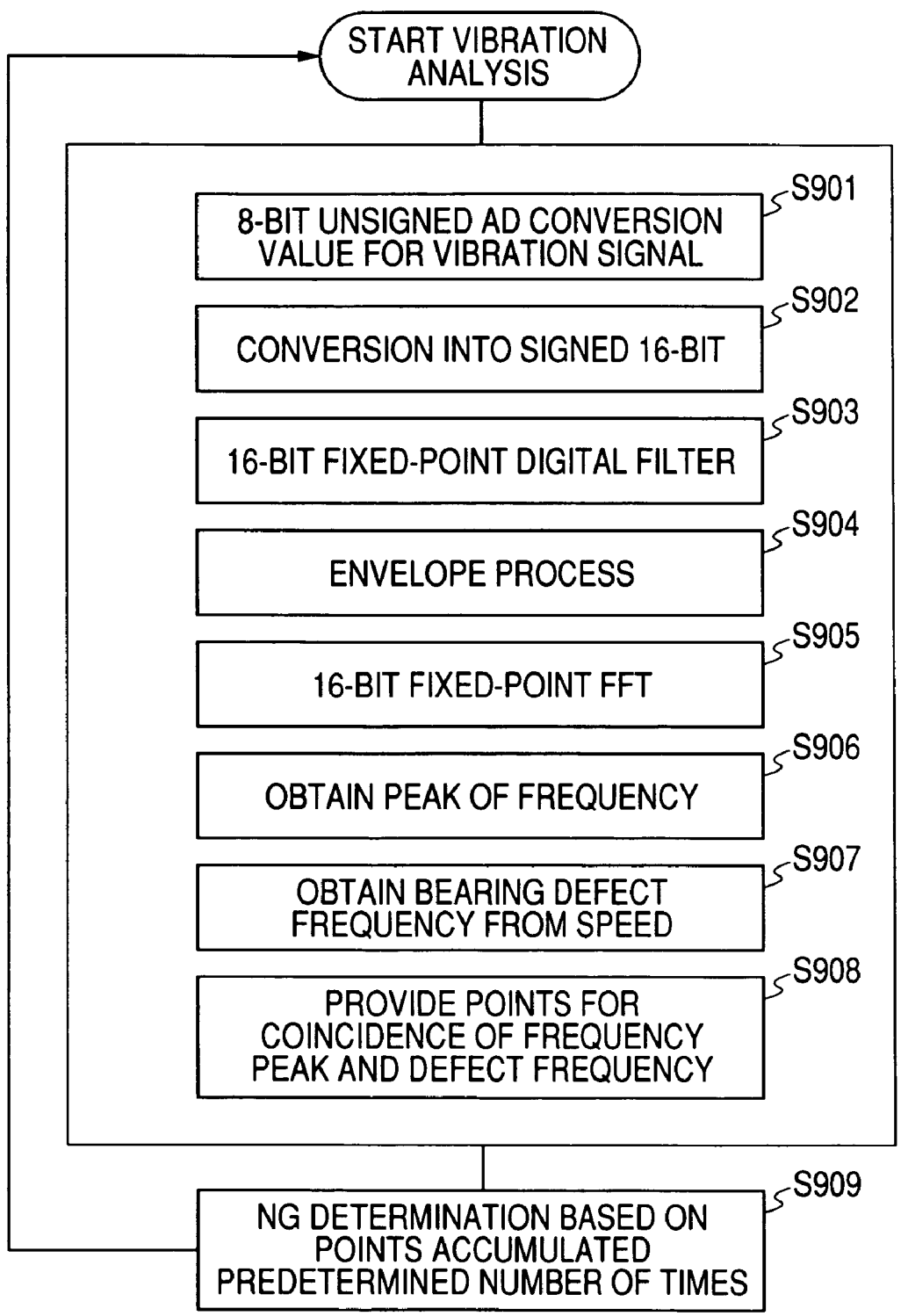
FIG. 57 is a flowchart showing the operation contents for the diagnosis processor in FIG. 51.

FIG. 57 is a flowchart showing the operation of the diagnosis processor (MPU) 550B. The diagnosis processor (MPU) 550B performs sampling for sensor signals, which are output by the four vibration sensors 511 and are passed through the amplifiers (Amp) 571 and the filters (LPF) 572, while changing the channels via the multiplexer (MUX) 552. In this manner, the AD converter (ADC) 553 performs sampling for multiple channels almost at the same time, and converts the signals into digital signals (8-bit unsigned data) (step S901).

Figure 58A:
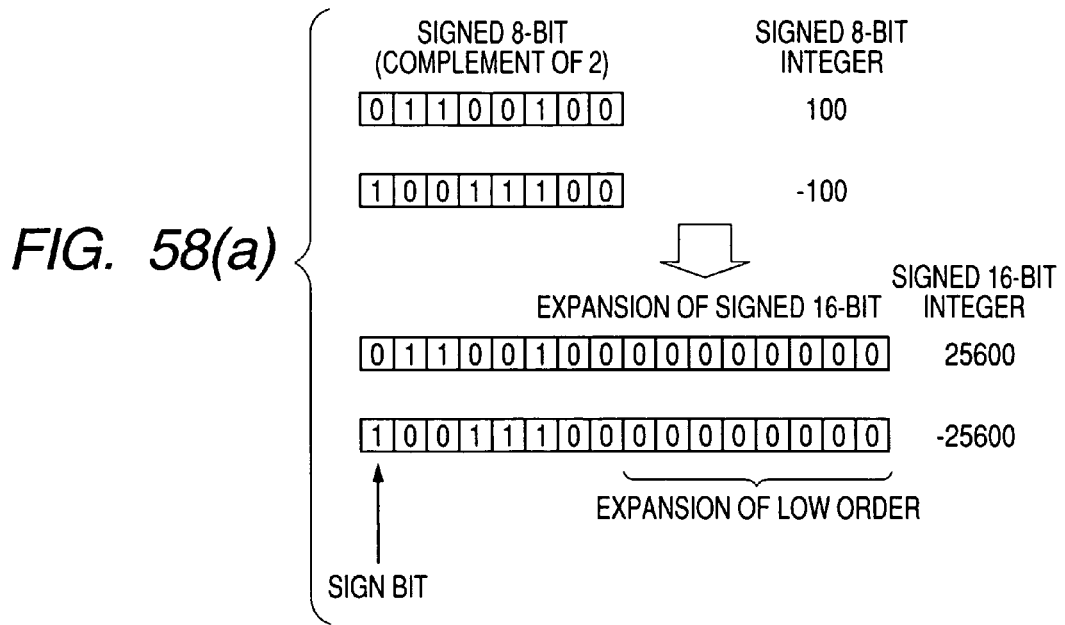
FIG. 58(a) is an explanatory diagram showing the process for expanding, to greater than the resolution of an AD converter, a digital signal obtained by the AD converter, and (b) is an explanatory diagram showing an example for a simple expansion of the sign of a digital signal obtained by the AD converter.

The 8-bit unsigned data, output by the AD converter (ADC) 553, is converted into 16 bit signed data (step S902) Specifically, as shown in FIG. 58(a), 8-bit unsigned data is converted to signed data, so that the center voltage of 1.65 V of the vibration waveform becomes 0 V. Thereafter, 8 bits are added to the lower bit of the data to obtain 16 bits of data.

Thereafter, the fixed-point digital filter process (step S903), the envelope (absolute value) process (step S904), and the 16-bit fixed-point FFT process (step S905) are performed. Then, based on the results of the FFT process (step S905), the peak of the frequency is obtained (step S906). Furthermore, the bearing defect frequency is calculated based on the axle rotation speed and bearing specifications (see FIG. 45) (step S907). Sequentially, the degree of coincidence between the frequency peak and the bearing defect frequency is changed to points (step S908), and a total value for predetermined accumulation times (accumulated points) is employed to determine an abnormality (NG) (step S909).

Figure 58B:
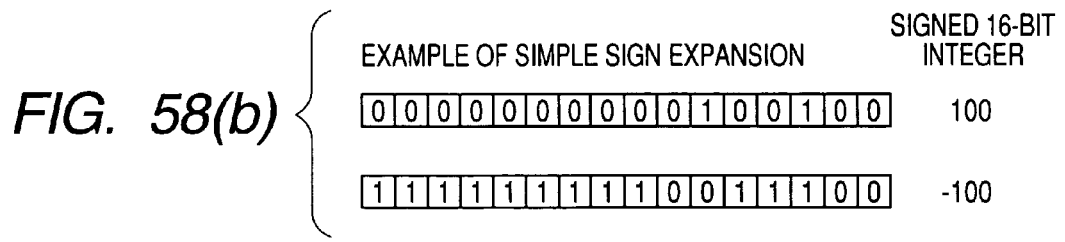

In the fixed-point calculation beginning with the 16-bit fixed-point digital filter process (step S903) and continuing to the 16-bit fixed-point FFT process (step S905), the least significant 15 bits of 16 bits are employed to express a value following the decimal point. The coefficient of the digital filter is −1.0, or greater, to less than 1.0 when it is expressed as a real number. When the fixed-point formula is employed, the coefficient of the digital filter is $-2^{15}$, or greater, to $2^{15}-1$, or smaller, in the computer. When data of 8 bits is not converted and signed, the coefficient of the digital filter is $-2^7$, or greater, to $2^7-1$, or smaller. Since the amplitude of the waveform is narrowed by the filter process, the amplitude of data having an 8-bit width becomes smaller, and the accuracy of the detection of a frequency peak is adversely affected. Therefore, the amplitude range for AD conversion is set as real numbers, −1.0 or greater to less than 1.0, in consonance with the data width of the CPU 558. In order to convert signed 8-bits data into signed 16-bits data, the most significant bit of signed 8-bits data and the seven bits following the decimal point are unchanged, as the upper eight bits, while the lower eight bits are set to 0. In short, in order to perform the operation, integers in a range of −128 to 127 are extended 256 times to integers in a range of −32768 to 32767. On the other hand, as shown in FIG. 58(b), although an extension to 16 bits is performed, merely the sign extension is performed so that no effects are provided unless expansion is not performed.

The FFT process (step S905) is performed using fixed-point calculation for 16-bit data. This is because the CPU 558 employed is a 32-bit CPU, and an overflow is prevented for a multiplication of 16 bits×16 bits. Further, since the floating-point calculation unit (FPU) is not included, it is preferable that the floating-point calculation not be employed because of the calculation speed.

In addition, during the FFT process (step S905), a scaling process is performed. That is, when the FFT is performed by using the N-th power of two as the number of operation points, an N-stage butterfly operation is performed. At this time, the amount of data is reduced in order to prevent overflow.

As described above, during the fixed-point calculation, a dynamic range tends to be reduced because the bit width is limited. Further, since input data is half width, i.e., eight bits, the abnormality signal would be hidden in the calculation error, and the probability that the peak of the vibration can not be detected is very high. Therefore, in this embodiment, data of 8 bits is extended to 16 bits in advance to prevent the disappearance of the peak to be detected.

During the abnormality diagnosis process, the frequency analysis and the peak detection are important, and sampling and accurate reproduction of the original waveform is not required. Therefore, even when the original AD conversion data are small, i.e., 8 bits, the data is extended during the operation process, so that the characteristic of the frequency can be appropriately captured.

As a test example, the results obtained by the detection of flaking for a tapered rolling bearing for a railway vehicle are shown in Table 6, together with comparison examples.

TABLE 6

| Test | 16 bit ADC | 8 bit ADC with unprocessed 8-bit integer (only sign extension) | 8 bit ADC extended to 16 bit (256 times amplitude) |
| --- | --- | --- | --- |
| Abnormal vibration 1 | Detected | Not detected | Detected |
| Abnormal vibration 2 | Detected | Not detected | Detected |
| Abnormal vibration 3 | Detected | Not detected | Detected |

Abnormal vibration 1 is a vibration signal when the bearing wherein flaking has occurred on the outer ring raceway surface is rotated at 240 rpm. Abnormal vibration 2 is a vibration signal when a bearing wherein an artificial defect is created in the outer ring raceway surface by discharge machining is rotated at 360 rpm. Abnormal vibration 3 is a vibration signal when a bearing wherein an artificial defect is created in the outer ring raceway surface by discharge machining is rotated at 990 rpm.

In any case of abnormal vibration, an abnormality detection was successful when the 16-bit integer value obtained by the 16 bit AD converter was employed for calculation. On the other hand, an abnormality could not be detected when, for calculation, only sign extension was performed by using the unprocessed 8-bit integer value obtained by the 8-bit AD converter. On the other hand, a sign was added to the 8-bit integer value obtained by the AD converter, and the resultant data was extended to 16 bits, so that the range was increased substantially 256 times to perform calculation. Then, the detection of the abnormality was successful.

As described above, as for the signal output by the AD converter (ADC) 553, which converts the analog signal output by the vibration sensor 511 into a digital signal, the data width is extended (in this case to 16 bits) more than the resolution (8 bits in this example) of the AD converter (ADC) 553, and the Fourier transform process is performed. And based on the results, the abnormality diagnosis is performed. Thus, the cost and space for the circuit is reduced by using the AD converter having the low resolution, and the abnormality diagnosis can be performed without deteriorating the accuracy.

Twenty-Third Embodiment

Figure 59:
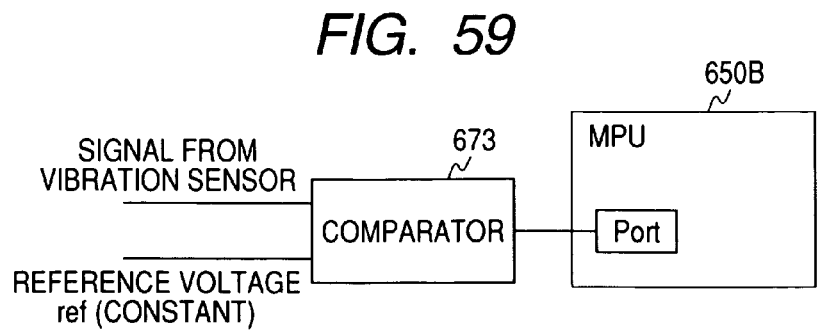
FIG. 59 is a block diagram showing the essential portion of an abnormality diagnosis apparatus according to a twenty-third embodiment of the invention.

FIG. 59 is a block diagram showing the essential portion of an abnormality diagnosis apparatus according to a twenty-third embodiment of the present invention. In this embodiment, an example wherein a micro computer system that does not include an AD converter is employed. An analog signal (waveform signal) output by a vibration sensor 511 is amplified by an amplifier (Amp) 571, and immediately after the amplified signal is passed through a filter (LPF) 572, the signal is transmitted via a comparator 673 to the port of a diagnosis processor (MPU) 650B. That is, according to this embodiment, instead of providing the AD converter 553 for the diagnosis processor (MPU) 650B, a comparator 673 is arranged in a sensor signal processor 550A. The other arrangement is the same as for the twenty-second embodiment.

Figure 60A:
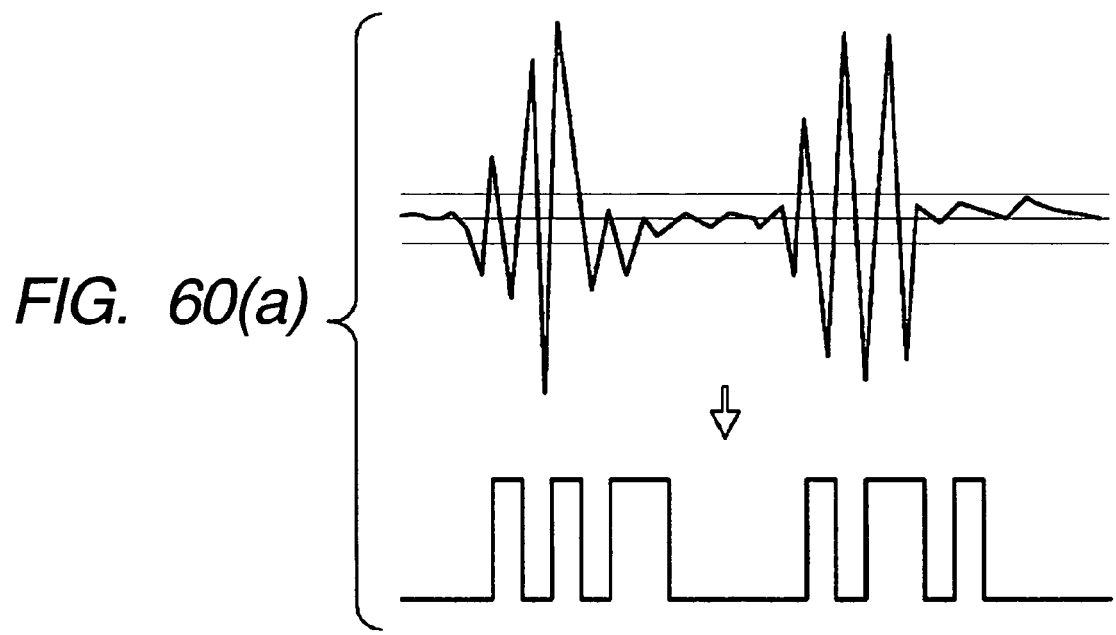
FIG. 60(a) is an explanatory diagram showing a process during which a comparator converts an analog signal received from a vibration sensor into a two-valued signal, and (b) is a waveform diagram showing the results after a micro computer in a diagnosis processor has performed the digital filter process for a signal received from the comparator.
Figure 60B:

A hysteresis comparator is employed as the comparator 673 in order to remove the affect of noise. The comparator 673 compares the voltage of the analog signal (see the waveform in the upper waveform in FIG. 60(*a*)) output by the vibration sensor 511 with a constant reference voltage ref, and outputs a signal of one bit (see the lower waveform in FIG. 60(*a*)) that indicates whether the voltage of the analog signal is higher or lower than the reference voltage ref. The reference voltage ref is, for example, the center voltage (1.65 V) of a vibration waveform. The sampling frequency of the comparator 673 is 32 kHz. Furthermore, in the diagnosis processor (MPU) 650B, the digital filter process is performed for the signal of one bit (two-valued), which is transmitted from the comparator 673 to the port of the diagnosis processor (MPU) 650B, and the resultant signal becomes a signal having a waveform shown in FIG. 60(*b*).

Figure 61:
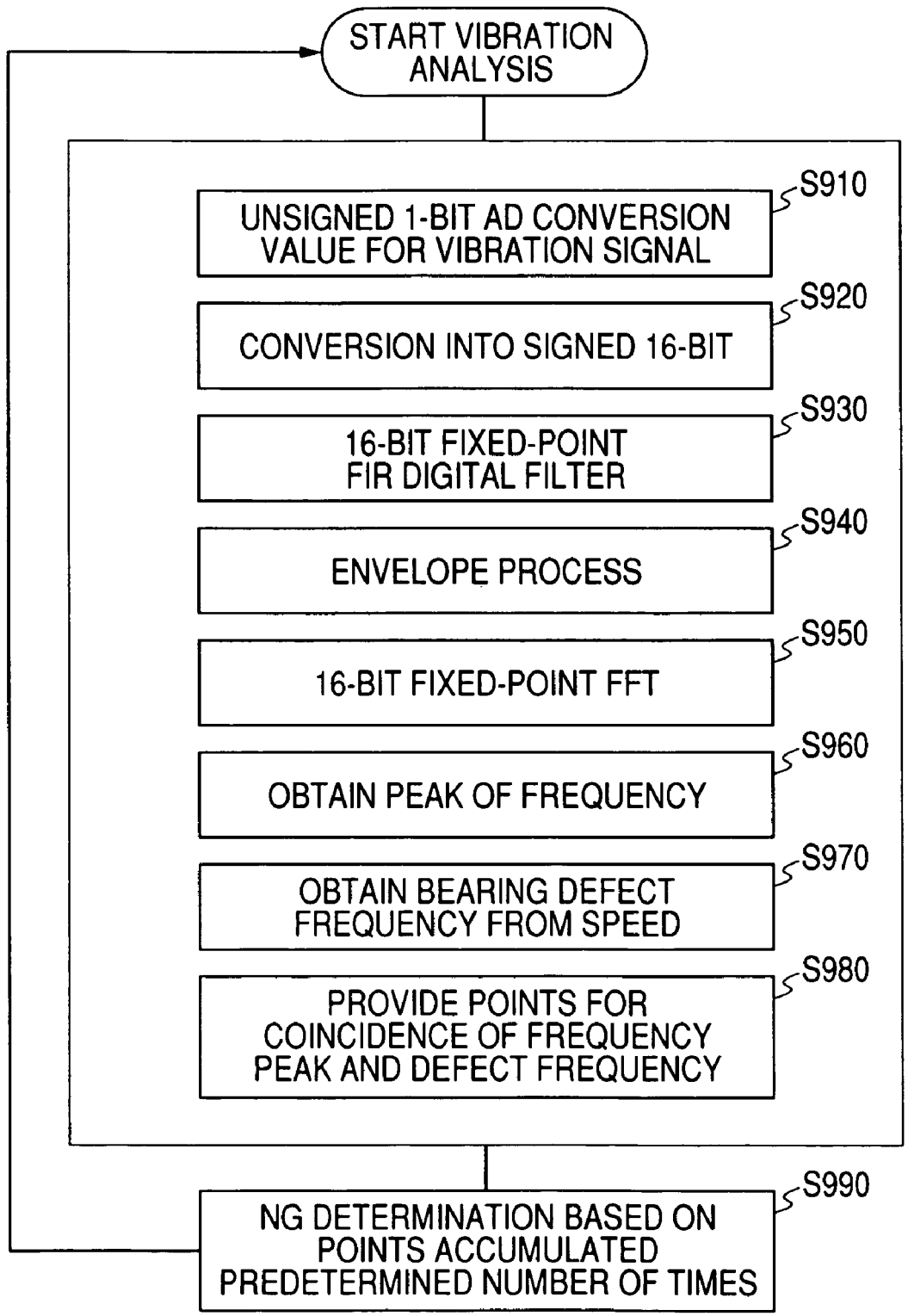
FIG. 61 is a flowchart showing the operational contents of the diagnosis processor according to the twenty third embodiment.

FIG. 61 is a flowchart showing the operation of the diagnosis processor (MPU) 650B for the twenty-third embodiment. The diagnosis processor (MPU) 650B receives a signal from the comparator 673 (step S910). The bit value of 0 or 1 is accepted at the port of the diagnosis processor (MPU) 650B. Since the value corresponds to a sign bit in the AD conversion, simply the value represents positive or negative, i.e., 0 represents −1 and 1 represents 1, and the data is converted into signed 16-bit data (step S920). The calculation is initiated with the signed 16-bit integers for two-valued −32768 and 32767.

Then, the FIR digital filter process (step S930), the envelope (absolute value) process (step S940), and the 16-bit fixed-point FFT process (step S950) are performed. Then, the peak of a frequency is calculated based on the results during the FFT process (step S950) (step S960). Further, a bearing defect frequency is calculated based on the axle rotation speed and the bearing specifications (see FIG. 45) (step S970). Sequentially, the degree of coincidence between the frequency peak and the bearing defect frequency is changed to a numerical value (step S980), and a total value of predetermined times for accumulation (accumulated points) is employed to determine an abnormality (NG) (step S990).

The target defect frequency for the axle bearing 530 is 1 kHz or lower; however, many vibrations at a frequency higher than 1 kHz are included in vibrations that are generated by a bearing member, a sensor case, etc. Transmission of vibrations detected by the vibration sensor 511 is performed via the vibrations of these members, and it can be understood that the vibration frequency at a low frequency, due to a defect, can modulate the vibrations (carrier waves) at a high frequency. Therefore, in this embodiment, a high sampling frequency of 32 kHz is designated for the comparator 673. Since the high sampling frequency is set, the low defect frequency can be recovered even by using two-valued data. The same principle as for PWM (Pulse Width Modulation) is applied. The FIR low-pass filter process (step S930) is performed in order to place a waveform signal into the narrow range for the defect frequency, except for the component of the carrier wave.

As described above, when the AD converter is not employed and a comparator 673 at a lower cost is employed, two-valued data output by the comparator 673 must merely be extended to data having a 16-bit width for calculation, so that the appropriate frequency analysis for the FFT process can be performed to detect the peak of the abnormality signal.

Twenty-Fourth Embodiment

Figure 62:
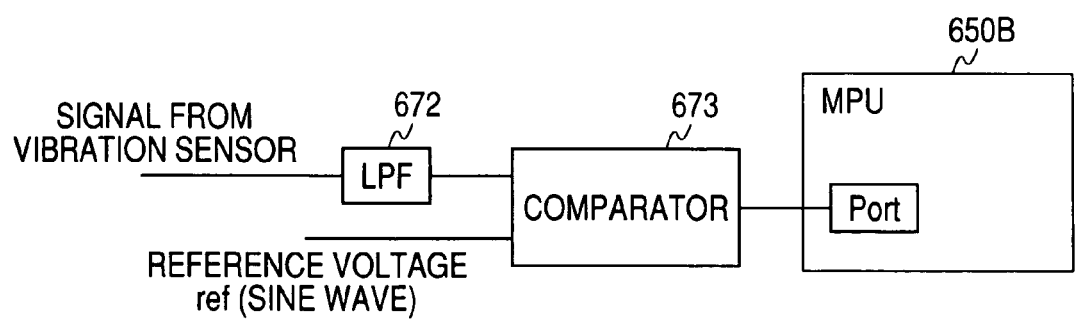
FIG. 62 is a block diagram showing the essential portion of an abnormality diagnosis apparatus according to a twenty-fourth embodiment of the invention.

FIG. 62 is a block diagram showing the essential portion of an abnormality diagnosis apparatus according to a twenty-fourth embodiment of the present invention. As well as the twenty-third embodiment, a diagnosis processor (MPU) 650B does not include an AD converter 553, and instead, a comparator 673 is provided for a sensor signal processor 550A. A reference voltage ref is fixed in the twenty-third embodiment, while in this embodiment, the sine wave of a frequency higher than an analog signal output by a vibration sensor 511 is employed as a reference voltage ref. At a frequency higher than the reference voltage ref, the comparator 673 performs sampling and digitizing (binarizing) for an analog signal received from the vibration sensor 511.

The diagnosis processor (MPU) 650B performs the low-pass filter process, in a digital manner, for the two-valued signal received from the comparator 673, so that the function of a multi-bit AD converter is provided by using software. In the twenty-third embodiment described above, the order of the characteristic frequency for bearing flaking is at most 1 kHz. However, the high frequency component due to the bearing ring or the rolling element of the bearing 530, or due to the natural vibration of the vibration sensor 511, is superimposed on the vibration waveform, and the low-pass filter process is performed for the resultant component by the software for the diagnosis processor (MPU) 650B. Therefore, as a whole, the same process as in the twenty-fourth embodiment is performed. It should be noted that the example in the twenty-third embodiment is advantageous as regards to cost, because the sine wave generation circuit is not required.

In the above embodiments, the abnormality diagnosis for the bearing 530 has been explained. However, the abnormality diagnosis apparatus of the present invention can also be effectively applied for abnormality diagnoses for wheels and other mechanical apparatuses.

INDUSTRIAL APPLICABILITY

According to the present invention, under a condition wherein the S/N ratio of the abnormality signal, or the abnormality prediction signal, to the noise signal is small, the noise signal will not be erroneously detected as the abnormality signal, or the abnormality prediction signal, and an extremely accurate and efficient abnormality diagnosis can be performed.

According to the abnormality diagnosing system of the present invention, the abnormality diagnosis can be accurately and efficiently performed for bearings or bearing related members in mechanical equipment.

According to the present invention, at an arbitrary frequency resolution, the FFT can be performed for a signal detected from a diagnosis target, and an abnormality diagnosis can be accurately performed.

According to the abnormality diagnosis apparatus of the invention, since only one vibration sensor is provided for one vehicle, an abnormality, such as flaking of a bearing or wheel flat, for the pertinent vehicle can be detected based on a waveform signal output by the vibration sensor. Thus, the abnormality diagnosing system can be constructed at a low cost.

According to the abnormality diagnosis apparatus of the invention, the cost and space for a circuit can be reduced by employing an AD converter having a low resolution and a simple comparator, and abnormality diagnoses can be enabled without a reduction in accuracy.

The invention claimed is:

1. An abnormality diagnosing system for a mechanical equipment, which detects sounds or vibrations generated by a mechanical equipment, analyzes thus detected signal and diagnoses an abnormality for a bearing or a bearing related member in the mechanical equipment, comprising:
an envelope processor that obtains an envelope for the detected signal;
a Fast Fourier Transform (FFT) unit that transforms the envelope obtained by the envelope processor into a frequency spectrum;
a peak detector that smoothes the frequency spectrum obtained by the FFT unit by performing a moving average calculation process and detects peaks in the frequency spectrum; and
a diagnosis processor that diagnoses an abnormality based on the peaks in the frequency spectrum detected by the peak detector,
wherein the peak detector comprises:
a moving average processor which weights the frequency spectrum obtained by the FFT unit with a weighting coefficient and calculates a weighted moving average.

2. The abnormality diagnosing system for the mechanical equipment according to claim 1, wherein the peak detector comprises:
a smooth differential peak extraction unit that performs a smoothing process and a differential process for the frequency spectrum obtained by the FFT unit, and extracts as peaks in the frequency spectrum, frequency points at which a sign for an obtained differential value is changed.

3. The abnormality diagnosing system for the mechanical equipment according to claim 1 or 2, wherein the weighting coefficient used in the moving average calculation process is bilaterally symmetrical.

4. The abnormality diagnosing system for a mechanical equipment according to claim 2, wherein the peak detector comprises:
a first selector that selects at least one peak which is equal to or greater than a threshold value in the peaks extracted by the smooth differential peak extraction unit.

5. The abnormality diagnosing system for a mechanical equipment according to claim 4, wherein the at least one peak comprises at least two peaks and peak detector further comprises:
a second selector that selects a predetermined number of peaks from the at least two peaks beginning with a peak having a larger amplitude level.

6. The abnormality diagnosing system for a mechanical equipment according to claim 1,
wherein the diagnosis processor calculates a degree of coincidence between: (a) a peak corresponding to a main component of the vibration in the frequency spectrum that is detected by the peak detector and a frequency indicating an abnormality of a diagnosis target, or (b) a peak corresponding to the main and a high-order component of the vibration in the frequency spectrum that is detected by the peak detector and a frequency indicating an abnormality of a diagnosis target; and
the diagnosis processor evaluates results obtained by accumulating the a degree of coincidence at multiple times.

7. An abnormality diagnosing system for a mechanical equipment, which detects sounds or vibrations generated by the mechanical equipment, analyzes thus detected signal, and diagnoses an abnormality of a bearing or of a bearing related member of the mechanical equipment, comprising:
a sampling processor that samples the detected signal at a sampling frequency that is higher than a required sampling frequency in advance;
a filter processor that extracts a signal in a frequency band required for a diagnosis from the signal obtained by the sampling processor;
a decimation processor that decimates the signal extracted by the filter processor;
an envelope processor that obtains an envelope signal of the signal obtained by the decimation processor;
a Fast Fourier Transform (FFT) operation processor that analyzes a frequency of the envelope signal obtained by the envelope processor; and
a diagnosis processor that diagnoses an abnormality based on the analysis results obtained by the FFT operation processor.

8. The abnormality diagnosing system for the mechanical equipment according to claim 7, further comprising:
a digital filter processor that lowers a frequency band of the envelope signal.

9. The abnormality diagnosing system for the mechanical equipment according to claim 7, wherein the FFT operation processor is provided as a DSP, and the number of data sets storable in a memory of the DSP is to be input to the FFT operation processor.

10. An abnormality diagnosing system for a mechanical equipment, which detects sounds or vibrations generated by mechanical equipment, analyzes thus obtained signal, and diagnoses an abnormality of a bearing or of a bearing related member of the mechanical equipment, comprising:
an Analog-to-Digital (A/D) converter that converts the obtained signal into a digital signal;
a digital filter processor that extracts a signal in a frequency band required for a diagnosis from the digital signal obtained by the A/D converter;
an envelope processor that obtains an envelope signal of the signal extracted by the digital filter processor;
an interpolation processor that performs zero-padding interpolation on the envelope obtained by the envelope processor in order to perform a fast Fourier transform at an arbitrary frequency resolution;
a Fast Fourier Transform (FFT) unit that performs a FFT on a signal obtained by the interpolation processor through the zero-padding interpolation; and
a diagnosis processor that diagnosing an abnormality based on a frequency spectrum obtained by the FFT unit.

11. The abnormality diagnosing system for the mechanical equipment according to claim 10, wherein the interpolation processor performs such a zero-padding interpolation that a sampling frequency used by the FFT unit are hertz of the Nth power of two, or hertz of a multiple of the Nth power of two.

12. The abnormality diagnosing system for the mechanical equipment according to claim 10 or 11, further comprising: a peak detector that detects peaks in the frequency spectrum obtained by the FFT unit,
wherein the diagnosis processor calculates a degree of coincidence between: (a) a peak corresponding to a main component of the vibration in the frequency spectrum that is detected by the peak detector and a frequency indicating an abnormality of a diagnosis target, or (b) a peak corresponding to the main and a high-order component of the vibration in the frequency spectrum that is detected by the peak detector and a frequency indicating an abnormality of a diagnosis target; and the diagnosis processor evaluates results obtained by accumulating the degree of coincidence at multiple times.

13. An abnormality diagnosis apparatus, which diagnoses an abnormality while a vehicle is moving, comprising:
a vibration sensor that detects vibrations of the vehicle;
a parameter value detection circuit that obtain one of dimensionless parameter values of a crest factor, a impulse factor, a shape factor and a kurtosis based on a waveform signal output by the vibration sensor; and
a comparison circuit that outputs a first voltage signal indicating that the dimensionless parameter value output by the parameter value detection circuit exceeds a predetermined reference, or a second voltage signal indicating that the dimensionless parameter value is equal to or lower than the predetermined reference,
wherein an abnormality is detected based on the output of the comparison circuit.

14. The abnormality diagnosis apparatus according to claim 13, wherein the vehicle is a railway vehicle.

15. An abnormality diagnosis apparatus, which diagnoses an abnormality while a vehicle is moving, comprising:
a vibration sensor that detects vibrations of the vehicle;
an operation circuit that employing a waveform signal output by the vibration signal obtains one of parameter values comprising either a Root Mean Square (RMS) or an absolute value average;
a peak detection circuit that obtains a peak value of the waveform signal; and
a first comparison circuit that:
compares a value which is a multiple of the parameter value with the peak value output by the peak detection circuit, and
in accordance with the comparison result, outputs a first voltage signal, which indicates that a dimensionless parameter value obtained as a ratio of the peak value to the parameter value exceeds a predetermined reference, or outputs a second voltage signal, which indicates that the dimensionless parameter is equal to or lower than the predetermined reference
wherein an abnormality is detected based on the output of the comparison circuit.

16. The abnormality diagnosis apparatus according to claim 15, further comprising:
a second comparison circuit that compares the peak value output by the peak detection circuit with a predetermined reference value,
wherein, when the peak value is greater than the reference value as a result of the comparison by the second comparison circuit, the output of the first comparison circuit is invalidated.

17. The abnormality diagnosis apparatus according to claim 15 or 16, wherein the abnormality is detected based on a duty ratio of the first voltage signal.

18. The abnormality diagnosis apparatus according to claim 15, further comprising:
a filter circuit that inputs a signal of the predetermined band among the output signal of the vibration sensor to the parameter value detection circuit and the peak detection circuit.

19. An abnormality diagnosis apparatus, for a mechanical apparatus that includes a plurality of parts having different vibration properties, comprising:
a sensor signal processor that samples a signal output by a vibration sensor which detects vibrations of the mechanical apparatus; and
a diagnosis processor that performs an abnormality diagnosis based on a sampled vibration data by the sensor signal processor,
wherein the diagnosis processor sequentially samples vibration data from the sensor signal processor and divides the vibration data into intervals for predetermined cycles; processes the divided vibration data for one interval as vibration data for a diagnosis of parts having a first vibration property; and processes data obtained by such that the data of a predetermined period of time in the preceding interval is added to a beginning of the vibration data for one interval as vibration data of the abnormality diagnosis for a member having a second vibration property.

20. The abnormality diagnosis apparatus according to claim 19 comprising a function for storing data used for detecting an abnormality.

21. An abnormality diagnosis apparatus, for axle bearings and wheels of a railway vehicle, comprising:
a sensor signal processor that samples a signal output by a vibration sensor which detects vibrations of axle bearings and wheels; and
a diagnosis processor that performs abnormality diagnoses for the axle bearings and wheels based on a sampled vibration data obtained by the sensor signal processing,
wherein the diagnosis processor sequentially samples the vibration data from the sensor signal processor and divides the vibration data into intervals for predetermined cycles; processes the divided vibration data for one interval as vibration data for a bearing diagnosis; and processes data obtained by such that data of a predetermined period of time in the preceding interval is added to a beginning of the vibration data for one interval as vibration data of the abnormality diagnosis for the wheel.

22. The abnormality diagnosis apparatus according to claim 21, wherein,
the diagnosis processor detects the abnormality of the axle bearing based on a rotation speed of the axle bearing and a frequency peak obtained by processing an envelope waveform for vibrations; detects an abnormality of wheels based on a frequency at which a level of vibrations that are generated in synchronization with rotation of the wheels exceeds a threshold value; and performs the abnormality diagnosis based on the abnormality detection results.

23. The abnormality diagnosis apparatus according to claim 21 or 22, wherein the signal processing unit performs sampling by changing signals output by a plurality of vibration sensors for each channels.

24. The abnormality diagnosis apparatus according to claim 22, wherein the abnormality diagnosis is performed for the axle bearings and the wheels based on a vibration data obtained by sampling output signal of the vibration sensor in synchronizing with rotation of the wheel and performing an adding-average process.

25. The abnormality diagnosis apparatus according to claim 22, wherein the abnormality detection is performed at multiple times for the axle bearings and the wheels, and abnormality diagnoses are statistically performed based on collected values of the multiple times of detections.

26. An abnormality diagnosis apparatus, for a mechanical apparatus comprising a plurality of parts having different vibration properties, comprising:
a sensor signal processor that samples a signal output by a vibration sensor which detects vibrations of the mechanical apparatus; and a diagnosis processor that performs an abnormality diagnosis based on a sampled vibration data by the sampled sensor signal processor, wherein the diagnosis processor sequentially samples the vibration data from the sensor signal processor, and converts the vibration data into two kind of data having two different sampling frequencies or two different sampling lengths, wherein one is for diagnosis of parts having a first vibration property, and the other is for diagnosis of parts having a second vibration property.

27. An abnormality diagnosis apparatus, for axle bearings and wheels of a railway vehicle, comprising:
a sensor signal processor that samples a signal output by a vibration sensor which detects vibrations of the axle bearing and wheels of a railway vehicle; and
a diagnosis processor that performs an abnormality diagnosis based on a sampled vibration data by the sensor signal processor,
wherein the diagnosis processor sequentially samples the vibration data from the sensor signal processor, and converts the vibration data into two kinds of data having two different sampling frequencies or two different sampling lengths, wherein one is for an axle bearing diagnosis and the other is for a wheel diagnosis.

28. An abnormality diagnosis apparatus, for a mechanical apparatus including rotary or sliding parts, comprising:
an Analog-to-Digital (AD) converter that converts an analog signal output by a vibration sensor which detects vibrations of the mechanical apparatus into a digital signal; and
a diagnosis processor that performs a Fourier transform for the digital signal obtained from the AD converter; and performs an abnormality diagnosis based on the results thereof,
wherein, during the Fourier transform process, the diagnosis processor extends a total number of data bits of the digital signal obtained from the AD converter to be more than a resolution of the AD converter by adding at least one additional bit to the digital signal obtained from the AD converter.

29. An abnormality diagnosis apparatus, for a mechanical apparatus that includes rotary or sliding parts, comprising:
a comparator that compares the voltage of an analog signal output by a vibration sensor that detects vibrations of the mechanical apparatus with a constant reference voltage and outputs a one bit signal; and
a diagnosis processor that performs a Fourier transform for the one bit signal obtained from the comparator, and performs an abnormality diagnosis based on the results thereof,
wherein, during the Fourier transform process, the diagnosis processor receives the one bit signal from the comparator and converts the one bit signal into data having two or more data bits.

30. An abnormality diagnosis apparatus, for a mechanical apparatus that includes rotary or sliding parts, comprising:
a comparator that compares a voltage of an analog signal received from a vibration sensor that detects vibrations of the mechanical apparatus with a reference voltage that is a periodic signal, and for outputting a two-valued signal indicating that the voltage of the analog signal is either higher or lower than the reference voltage; and
a diagnosis processor increases a size of data of the two-valued signal of the comparator to a predetermined number of data bits, and performs a Fourier transform process.

* * * * *